(12) United States Patent
Yahata et al.

(10) Patent No.: US 10,832,737 B2
(45) Date of Patent: Nov. 10, 2020

(54) PLAYBACK DEVICE, PLAYBACK METHOD, AND RECORDING MEDIUM

(71) Applicant: PANASONIC INTELLECTUAL PROPERTY CORPORATION OF AMERICA, Torrance, CA (US)

(72) Inventors: Hiroshi Yahata, Osaka (JP); Tadamasa Toma, Osaka (JP); Tomoki Ogawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/251,688

(22) Filed: Jan. 18, 2019

(65) Prior Publication Data

US 2019/0156864 A1    May 23, 2019

Related U.S. Application Data

(63) Continuation of application No. 15/278,582, filed on Sep. 28, 2016, now Pat. No. 10,255,951, which is a (Continued)

(30) Foreign Application Priority Data

Jun. 5, 2015 (JP) ................. 2015-115045

(51) Int. Cl.
*H04N 19/70* (2014.01)
*H04N 19/44* (2014.01)
(Continued)

(52) U.S. Cl.
CPC .............. *G11B 27/28* (2013.01); *G11B 20/10* (2013.01); *G11B 27/105* (2013.01);
(Continued)

(58) Field of Classification Search
USPC ......................... 386/353, 326, 332, 334, 336
See application file for complete search history.

(56) References Cited

U.S. PATENT DOCUMENTS

| 6,088,506 A | 7/2000 | Yoshio et al. |
| 2013/0170540 A1 | 7/2013 | Damkat et al. |

(Continued)

FOREIGN PATENT DOCUMENTS

| CN | 103582911 | 2/2014 |
| EP | 3013040 | 4/2016 |

(Continued)

OTHER PUBLICATIONS

International Search Report, dated Oct. 6, 2015, in International Application No. PCT/JP2015/003547.
(Continued)

*Primary Examiner* — Daquan Zhao
(74) *Attorney, Agent, or Firm* — Greenblum & Bernstein, P.L.C.

(57) ABSTRACT

A non-transitory recording medium is provided that is reproduced by a playback device having an attribute reader, a decoder, and an outputter. The recording medium has recorded therein a video stream that is encoded video information, and a management information file correlated with the video stream. The management information file includes first attribute information, indicating whether a dynamic range of luminance of the video stream is a first dynamic range or a second dynamic range that is wider than the first dynamic range. In a case where the first attribute information indicates the second dynamic range, the first attribute information also indicates a type of the second dynamic range.

6 Claims, 41 Drawing Sheets

Related U.S. Application Data continuation of application No. PCT/JP2015/003547, filed on Jul. 14, 2015.

(60) Provisional application No. 62/034,389, filed on Aug. 7, 2014.

(51) Int. Cl.

| | | |
|---|---|---|
| *H04N 19/46* | (2014.01) | |
| *G11B 27/28* | (2006.01) | |
| *G11B 20/10* | (2006.01) | |
| *H04N 5/84* | (2006.01) | |
| *H04N 9/804* | (2006.01) | |
| *H04N 9/82* | (2006.01) | |
| *G11B 27/10* | (2006.01) | |
| *G11B 27/32* | (2006.01) | |
| *H04N 5/85* | (2006.01) | |
| *H04N 7/015* | (2006.01) | |
| *H04N 9/87* | (2006.01) | |

(52) U.S. Cl.
CPC ............ *G11B 27/329* (2013.01); *H04N 5/84* (2013.01); *H04N 5/85* (2013.01); *H04N 7/015* (2013.01); *H04N 9/8042* (2013.01); *H04N 9/8205* (2013.01); *H04N 9/8233* (2013.01); *G11B 2220/2541* (2013.01); *G11B 2220/2562* (2013.01)

(56) References Cited

U.S. PATENT DOCUMENTS

| | | | |
|---|---|---|---|
| 2014/0079113 A1 | 3/2014 | Newton et al. | |
| 2015/0010059 A1 | 1/2015 | Hattori et al. | |
| 2015/0341675 A1* | 11/2015 | Su | H04N 19/117 |
| | | | 375/240.15 |
| 2016/0134832 A1* | 5/2016 | Yamamoto | H04N 19/70 |
| | | | 386/248 |

FOREIGN PATENT DOCUMENTS

| | | |
|---|---|---|
| EP | 3016378 | 5/2016 |
| JP | 9-282848 | 10/1997 |
| JP | 2013-541895 | 11/2013 |
| WO | 2014/002901 | 1/2014 |
| WO | 2014/203746 | 12/2014 |
| WO | 2014/208345 | 12/2014 |

OTHER PUBLICATIONS

Chinese Search Report, dated Jan. 16, 2019, for the related Chinese Patent Application No. 201580001920.8, (including English language translation).

Extended European Search Report, dated May 4, 2017, from the European Patent Office (EPO) for the related European Patent Application No. 15829514.7.

* cited by examiner

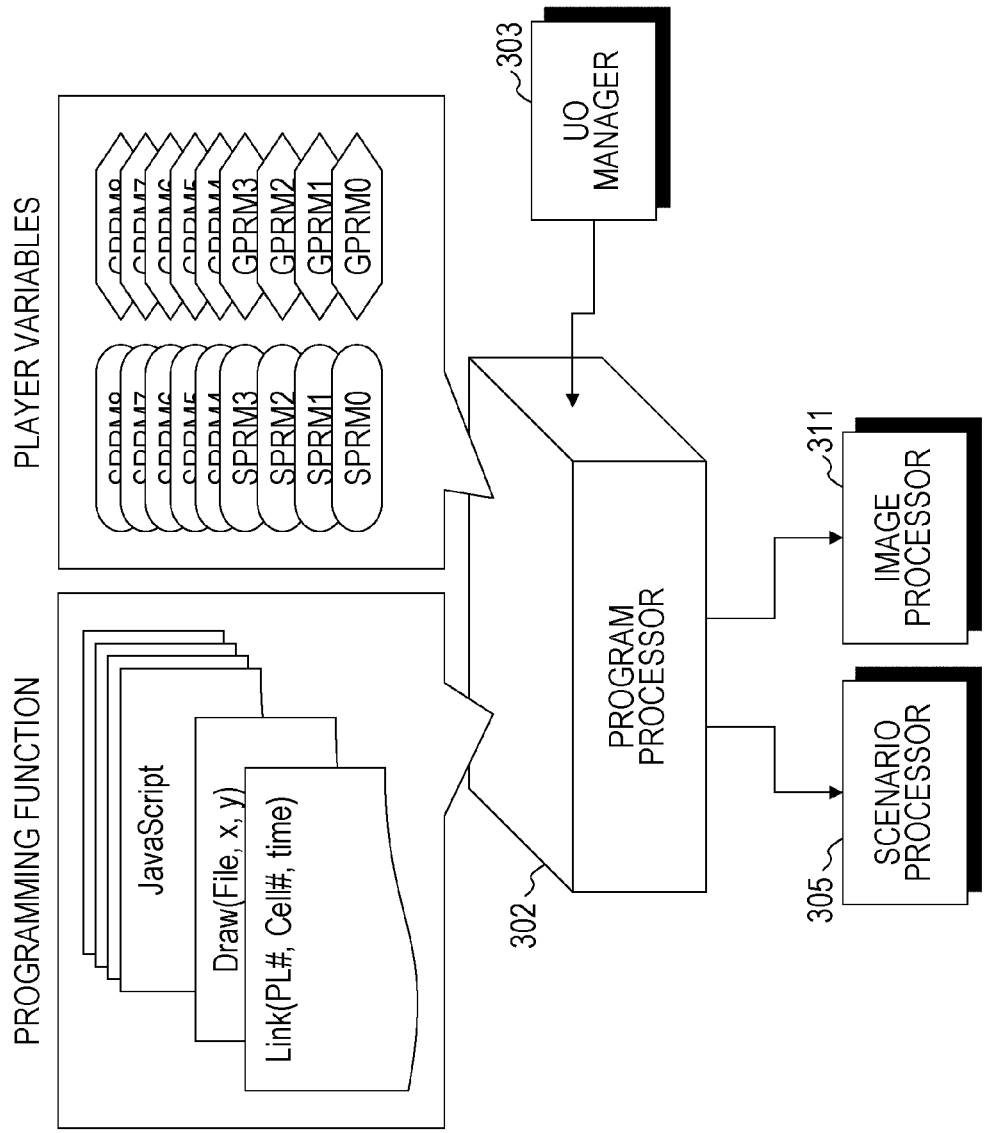

FIG. 24

PLAYER VARIABLES (SYSTEM PARAMETERS)

| | | | | | | |
|---|---|---|---|---|---|---|
| 0 | Language Code | 11 | Player audio mixing mode for Karaoke | 22 | reserved |
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language code ext. for STST | 30 | reserved |
| 9 | Navigation timer | 20 | Player region code | 31 | reserved |
| 10 | Current playback time | 21 | reserved | 32 | reserved |

PLAYBACK DEVICE, PLAYBACK METHOD, AND RECORDING MEDIUM

This is a continuation of pending U.S. application Ser. No. 15/278,582 filed on Sep. 28, 2016, which is a continuation of U.S. National Stage of International Application No. PCT/JP2015/003547 filed Jul. 14, 2015, which claims the benefit of U.S. Provisional Patent Application No. 62/034,389 filed Aug. 7, 2014 and Japanese Application No. 2015-115045 filed Jun. 5, 2015. The entire disclosure of each of the above-identified applications, including the specification, drawings, and claims, is incorporated herein by reference in its entirety.

BACKGROUND

1. Technical Field

The present disclosure relates to a playback device that plays encoded video streams, a playback method, and a recording medium.

2. Description of the Related Art

Technology relating to digital versatile discs (DVD) has conventionally been disclosed (e.g., Japanese Unexamined Patent Application Publication No. 9-282848).

SUMMARY

In one general aspect, the techniques disclosed here feature A playback device that reads out a video stream, which is encoded video information, from a recording medium, and plays the video stream. The playback device includes: an attribute reader that reads out first attribute information, indicating whether a dynamic range of luminance of the video stream is a first dynamic range or a second dynamic range that is wider than the first dynamic range, from a management information file recorded in the recording medium in a manner correlated with the video stream; a decoder that generates decoded video information by reading the video stream out from the recording medium and decode the video stream; and an outputter that, in a case where the first attribute information that has been read out indicates the second dynamic range, outputs the decoded video information, along with maximum luminance information indicating a maximum luminance of the video stream in accordance with the second dynamic range.

According to the above form, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 23 is a diagram for describing the functional configuration of a program processor;

FIG. 24 is a diagram illustrating a list of system parameters (SPRM);

DETAILED DESCRIPTION

Underlying Knowledge Forming Basis of the Present Disclosure

However, further improvement was needed with the aforementioned Japanese Unexamined Patent Application Publication No. 9-282848. The present Inventors found that a problem occurs relating to the technology mentioned in the "Related Art". This problem will be described below in detail.

Most representative of information recording media recording video data is the DVD (hereinafter, may also be referred to as "Standard Definition" (SD-DVD). A conventional DVD will be described below.

Figure 1:
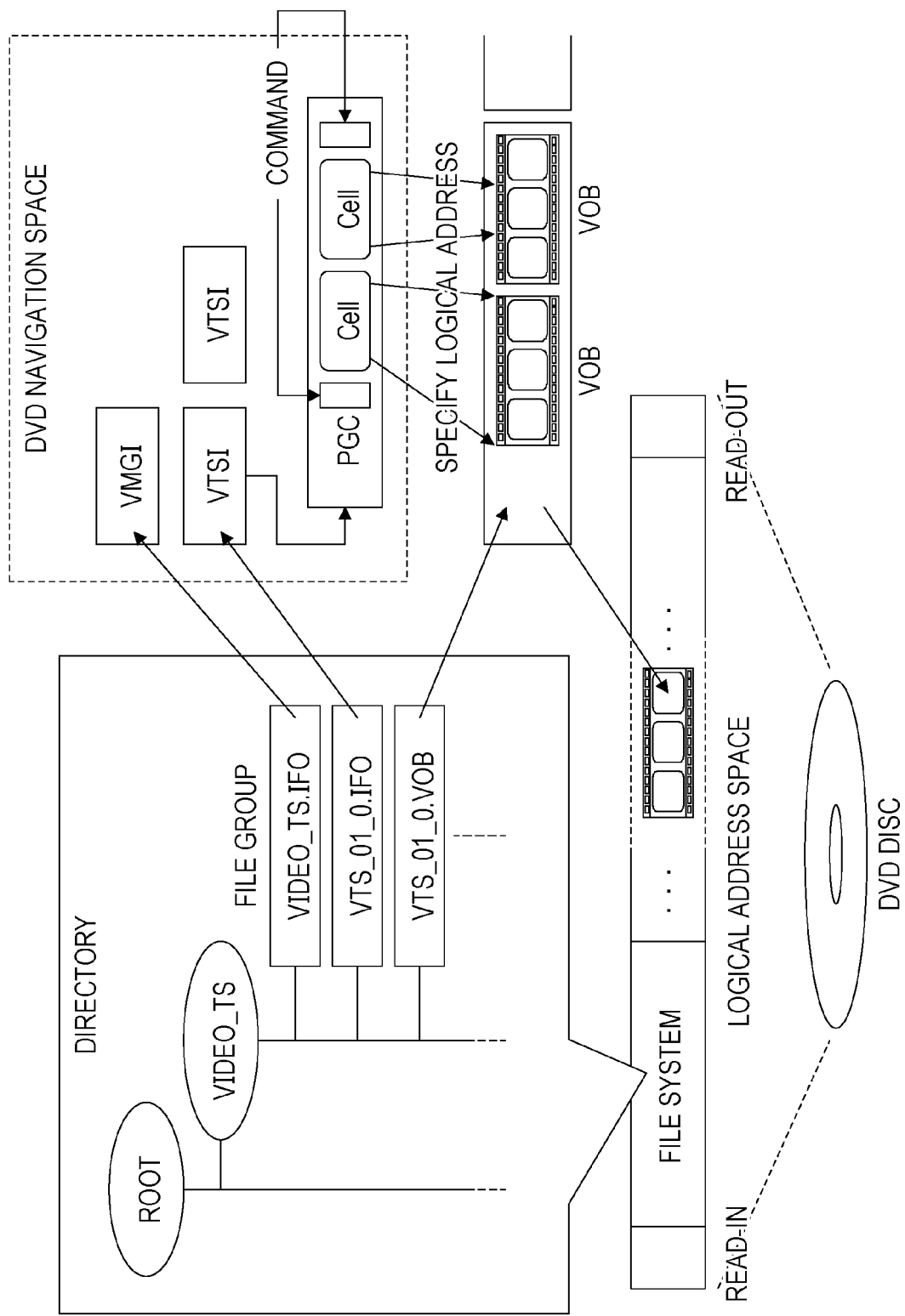
FIG. 1 is a diagram illustrating an SD-DVD structure.

FIG. 1 is a diagram illustrating the structure of an SD-DVD. As illustrated to the lower side of FIG. 1, the DVD disc has a logical address space provided between a read-in and a read-out. Volume information of a file system is recorded from the beginning of the logical address space, and after that is recorded application data such as video, audio, and so forth.

The file system is an arrangement for managing data, that is stipulated by Standards such as ISO9660, Universal Disc Format (UDF), and so forth, and is an arrangement to express data on the disc in increments called directories or files. There are file systems called File Allocation Tables (FAT) and NT File System (NTFS) in everyday-use personal computers (PC) as well, whereby data recorded in a hard disk are expressed on the computer as structures called directories or files, thereby improving usability.

In the case of an SD-DVD, both UDF and ISO9660 file systems are used. The two together are also referred to as "UDF bridge". The recorded data is arranged so that the data can be read out by a file system driver according to either UDF or ISO9660. Note that the DVD used here is a ROM disc for packaged media, to which writing is physically impossible.

Data recorded in the DVD can be viewed through the UDF bridge as directories or files such as illustrated to the upper left in FIG. 1. Immediately below the root directory ("ROOT" in FIG. 1) is placed a directory called "VIDEO_TS", and it is here that DVD application data is recorded. Application data is recorded as multiple files, primary files being the following types of files.

VIDEO_TS.IFO Disc play control information file

VTS_01_0.IFO Video title set #1 play control information file

VTS_01_0.VOB Video title set #1 stream file

As shown in the above example, two suffixes are stipulated. "IFO" is a suffix indicating that the file has play control information recorded therein, and "VOB" is a suffix indicating that the file has an MPEG stream, which is audiovisual (AV) data, recorded therein.

Play control information is information attached to the AV data, such as information to realize interactivity employed with the DVD (technology to dynamically change playing in response to user operations), metadata. and so forth. Play control information is commonly referred to as navigation information regarding DVDs.

The play control information files include the "VIDEO_TS.IFO" that manages the entire disc, and the "VTS_01_0.IFO" that is play control information for individual video title sets. Note that multiple titles, in other words, multiple different movies and tunes, can be recorded in a single disc in the case of DVD. Now, "01" in the file name body indicates the No. of the video title set, and in the case of the video title set #2, for example, this is "VTS_02_0.IFO".

The upper right portion in FIG. 1 is DVD navigation space in the application layer of the DVD, and is the logical structure space where the aforementioned play control information is loaded. Information within the "VIDEO_TS.IFO" is loaded in the DVD navigation space as VIDEO Manager Information (VMGI), as well as are "VTS_01_0.IFO" and play control information existing for each of other video title sets as Video Title Set Information (VTSI).

Described in the VTSI is Program Chain Information (PGCI) which is information of a play sequence called Program Chain (PGC). PGCI is made up of a set of Cells and a type of programming information called commands.

A Cell itself is information indicating a partial section or a whole section of a VOB (short for Video Object, and indicates an MPEG stream), and playing a Cell means to play the section of this VOB instructed by the Cell.

Commands are processed by a virtual machine of the DVD, and are close to JavaScript (a registered trademark) and so forth executed in browsers to display Web pages, for example. However, while JavaScript (registered trademark) performs window or browser control (e.g., opening a new browser window, etc.) besides logical operations, DVD command differ in that they only execute playback control of AV titles, e.g., instructing a chapter to play or the like, for example, besides logical operations.

A Cell has the start and end addresses (logical addresses) of a VOB recorded in the disc as internal information thereof. A player reads out data using the start and end address information of the VOB described in the Cell, and executes playback.

Figure 2:
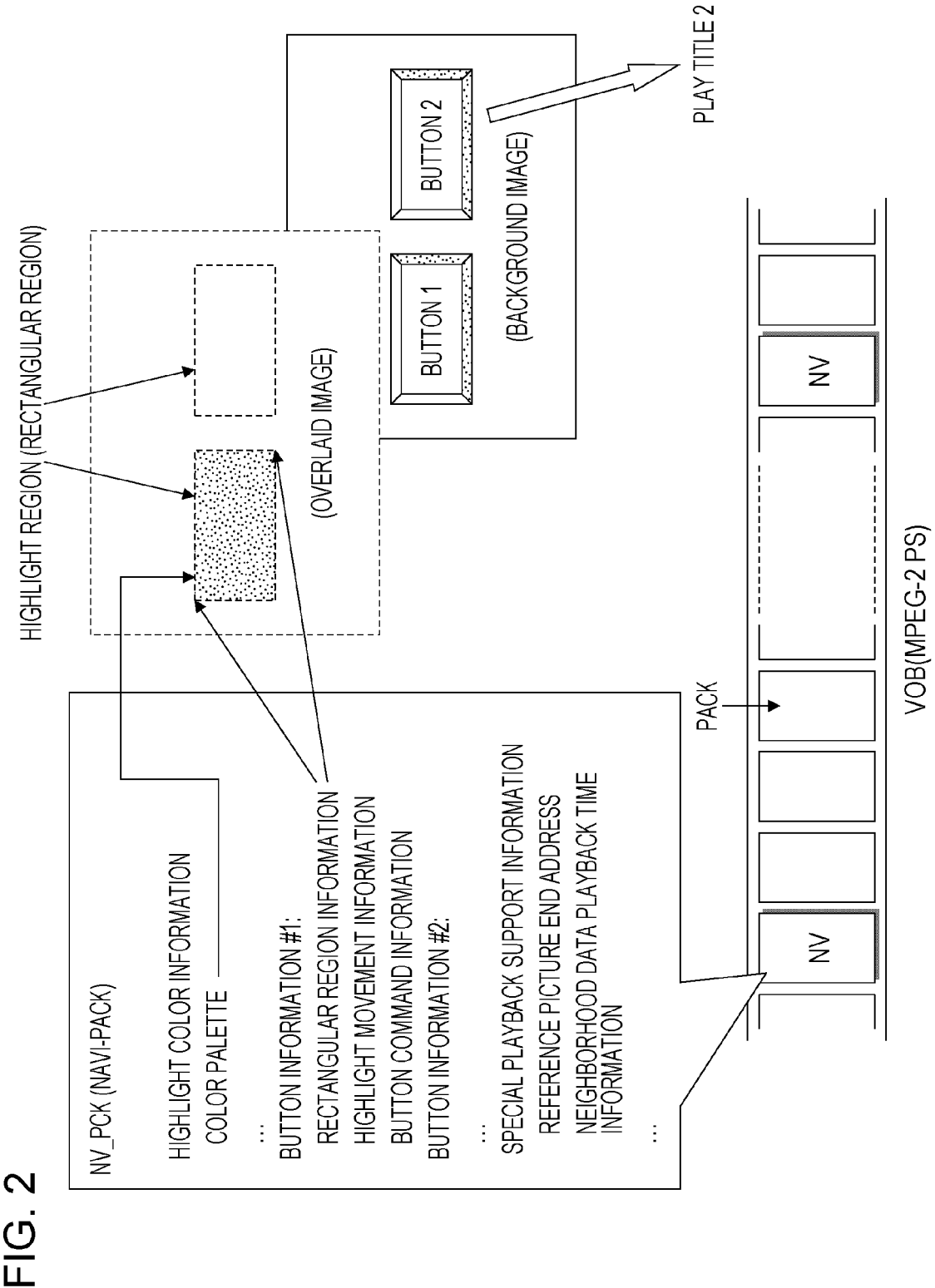
FIG. 2 is a schematic diagram for describing navigation information embedded in an MPEG stream, which is AV data.

FIG. 2 is an overview for describing navigation information embedded in an MPEG stream, which is AV data. Interactivity, which is a feature of the SD-DVD, is realized not only by the navigation information recorded in the aforementioned "VIDEO_TS.IFO" and "VTS_01_0.IFO" and so forth. Several important sets of information are multiplexed in the VOB along with video and audio data, using a dedicated carrier called navigation packs (called navi-pack or NV_PCK).

A menu screen will be described here as a simple example of interactivity. Several buttons are shown on the menu screen, with processing to be executed defined for each button when that button is selected.

One button is selected on the menu screen (a translucent color is overlaid on the selected button in highlight that button, indicating to the user that button is in a selected state), and the user can move the button in the selected state to any of the buttons above or below, to the left or to the right, using arrow keys on a remote controller.

Using the arrow keys of the remote controller to move the highlight to the button to be selected and executed, and okaying (pressing an OK key) executes the program of the corresponding command. Generally, playback of a corresponding title or chapter is executed by the command.

The upper left portion in FIG. 2 shows an overview of information stored in an NV_PCK. Highlight color information, information of individual buttons, and so forth, are included in the NV_PCK. Color palette information is described in the highlight color information, specifying the highlight translucent color to be displayed overlaid.

Described in the button information are rectangular region information which is the position information of each button, moving information from that button to other buttons (specification of destination buttons corresponding to each operation of the arrow keys by the user), and button command information (a command to be executed when that button is okayed).

The highlight on the menu screen is created as an overlaid image, as illustrated to the upper right portion in FIG. 2. The overlaid image is an object where rectangular region information of button information has been given color in color palette information. This overlaid image is composited with the background image illustrated at the right portion in FIG. 2, and displayed on the screen.

The menu screen of a DVD is realized as described above. The reason why part of the navigation data is embedded in the stream using an NV_PCK is as follows. That is, to realize without problem processing where synchronization timing readily becomes problematic, such as dynamically updating menu information synchronously with the stream, for example, displaying a menu screen for just five to ten minutes partway through playing a movie.

Another major reason is to improve user operability, such as to store information for supporting special playback in an NV_PCK, so that AV data can be decoded and played smoothly during non-normal playback, such as fast-forward and fast-rewind while playing the DVD.

Figure 3:
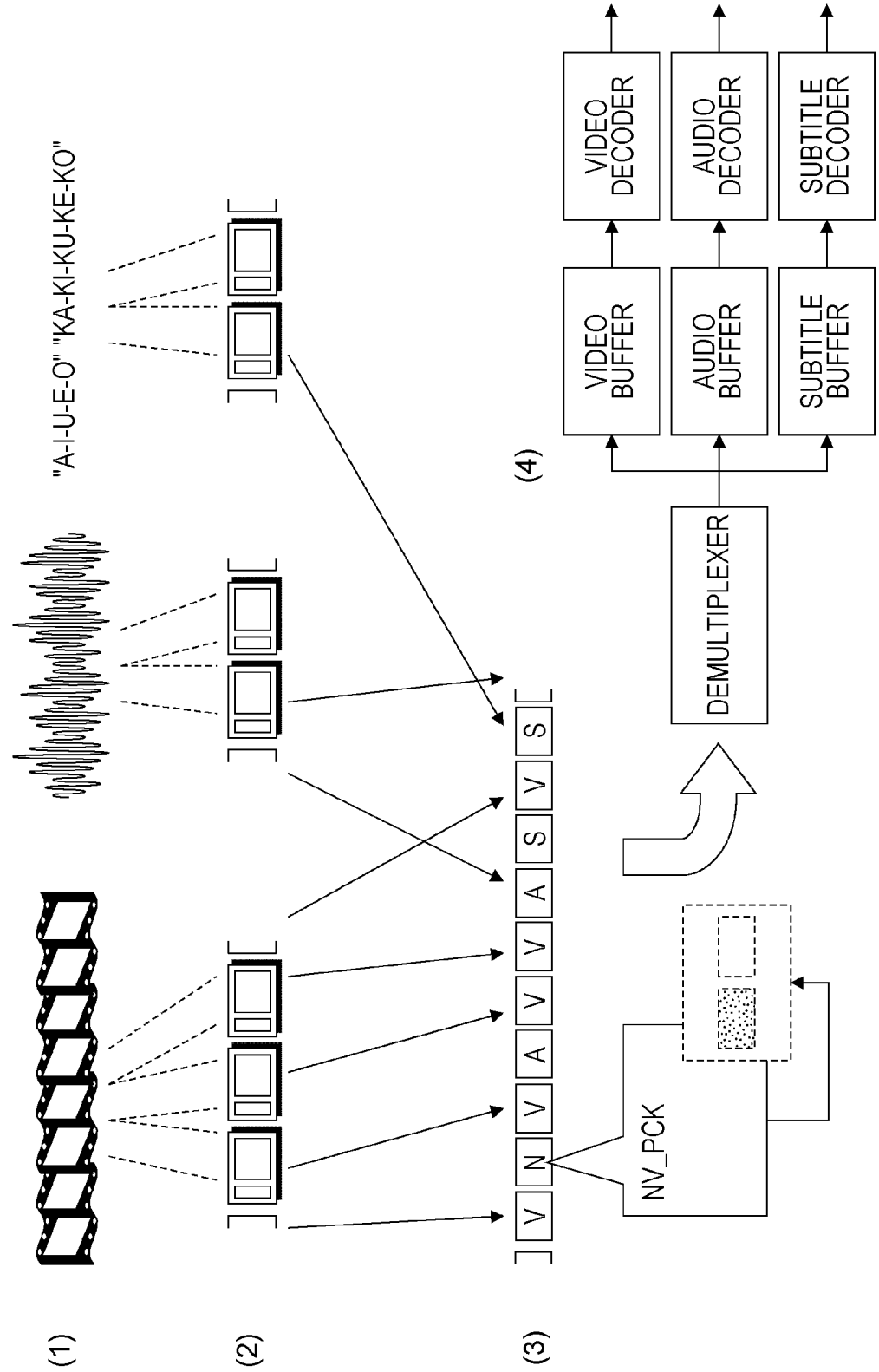
FIG. 3 is a schematic diagram illustrating a VOB structure in a DVD.

FIG. 3 is a schematic diagram illustrating the configuration of a VOB in a DVD. Data such as video, audio, and subtitles ((1) in FIG. 3) are packetized and packed according to the MPEG system (ISO/IEC13818-1) Standard ((2) in FIG. 3), and these are multiplexed to form a single MPEG program stream ((3) in FIG. 3), as illustrated in FIG. 3. The NV_PCKs including button commands for realizing interactivity are also multiplexed along with these, as described above.

A feature of multiplexing in the MPEG system is that the individual pixels of data that are multiplexed are in a bit string based on decoding order, but the bit string is not necessarily formed in playback order, that is to say decoding order, among the multiplexed data, i.e., among the video, audio, and subtitles.

This is due to a decoder model of the MPEG system stream ((4) in FIG. 3, generally referred to as System Target Decoder or STD) has decoder buffers corresponding to each elementary stream after demultiplexing, that temporarily stored the data until the decoding timing.

These decoder buffers have different sized according to each of the individual elementary streams, having 232 kB for video, 4 kB for audio, and 52 kB for subtitles. Accordingly, the data input timing to each decoder buffer differs among the individual elementary streams, so there is discrepancy between the order of forming the bit string as the MPEG system stream, and the timing of displaying (decoding). That is to say, the subtitle data multiplexed along with the video data is not necessarily decoded at the same time.

Now, in a large-capacity recording media such as a Blu-ray (registered trademark) disc, there is a possibility that extremely high-definition video information can be stored. Note that Blu-ray (registered trademark) disc, is also called BD or BD-ROM.

For example, it is conceivable that video information such as 4K (video information having resolution of 3840×2160 pixels) or HDR (high-luminosity video information, generally called High Dynamic Range) may be stored in a BD. However, there are various methods to express luminosity including HDR, and there has been no format that can record and manage video information of these realization methods efficiently as a video stream. Accordingly, there is a problem that the playback device cannot suitably express luminosity according to the type of video stream recorded in the recording medium such as the BD (the above-described realization method). The Present Inventors studied the following improvement measures to solve the above problem.

A playback device according to one form of the present disclosure reads out a video stream, which is encoded video information, from a recording medium, and plays the video stream. The playback device includes: an attribute reader that reads out first attribute information, indicating whether a dynamic range of luminance of the video stream is a first dynamic range or a second dynamic range that is wider than the first dynamic range, from a management information file recorded in the recording medium in a manner correlated with the video stream; a decoder that generates decoded video information by reading the video stream out from the recording medium and decoding the video stream; and an outputter that, in a case where the first attribute information that has been read out indicates the second dynamic range, outputs the decoded video information, along with maximum luminance information indicating a maximum luminance of the video stream in accordance with the second dynamic range.

Accordingly, luminance according to the type of video stream recorded in the recording medium (particularly, the dynamic range) can be appropriately expressed.

Also, in a case where the first attribute information indicates the second dynamic range, the first attribute information may also indicate the type of the second dynamic range, and wherein the outputter may output the maximum luminance information and the decoded video information in accordance with the type of the second dynamic range. For example, in a case where the type indicated by the first attribute information is a type where the luminance range of the video stream is statically expressed, the outputter outputs the maximum luminance information where the maximum luminance is statically indicated, and the decoded video information. Alternatively, in a case where the type indicated by the first attribute information is a type where the luminance range of the video stream is statically and dynamically expressed, the outputter outputs the maximum luminance information where the maximum luminance is statically and dynamically indicated, and the decoded video information. Note that the maximum luminance information statically indicates the luminance range by indicating a luminance range defined by the maximum luminance of all pictures in the video stream, and dynamically indicates the luminance range by indicating a luminance range for each of groups made up of one or a plurality of pictures included in the video stream, the luminance range being defined by the maximum luminance of the group. Alternatively, in a case where the type indicated by the first attribute information is a type where luminance is expressed by a base video stream, and an enhanced video stream to enhance luminance of the base video stream, the decoder generates the decoded video information by decoding the video stream as the enhanced video stream, and further reads out the base video stream from the recording medium and decodes the base video stream to generate the base video Information, and the outputter outputs the maximum luminance information and the decoded video information subjected to image processing using the base video information Accordingly, luminance can be suitably expressed in accordance with the type of the video stream, regardless of what type of video stream is recorded in the recording medium. In other words, regardless of the realization method of the HDR video stream recorded in the recording medium, luminance can be suitably expressed in accordance with that realization method.

The attribute reader may further read out second attribute information indicating the maximum luminance of the video stream from the management information file, and the outputter may further output the maximum luminance information including the second attribute information. Accordingly, the luminance of the video stream can be expressed even more appropriately.

Also, a recording medium according to one form of the present disclosure has recorded therein a video stream that is encoded video information, and a management information file correlated with the video stream. The management information file includes first attribute information, indicating whether a dynamic range of luminance of the video stream is a first dynamic range or a second dynamic range that is wider than the first dynamic range.

Accordingly, the playback device can be made to appropriately express luminance in accordance with the type of the video stream. Also, HDR video streams of different realization methods can be efficiently recorded and managed in the same recording medium.

In a case where the first attribute information indicates the second dynamic range, the first attribute information may also indicate the type of the second dynamic range. For example, The first attribute information indicates a first type where the luminance range of the video stream is statically expressed, as the type of the second dynamic range. Alternatively, The first attribute information indicates a second type where the luminance range of the video stream is statically and dynamically expressed, as the type of the second dynamic range. Note that in the second type, the luminance range of the video stream is statically expressed by including in the video stream first supplemental extension information indicating the maximum luminance of all pictures in the video stream, and the luminance range of the video stream is dynamically expressed by including in the video stream second supplemental extension information indicating, for each of groups made up of one or a plurality of pictures included in the video stream, the luminance range being defined by the maximum luminance of the group. Alternatively, the first attribute information indicates a third type, where luminance is expressed by a base video stream, and an enhanced video stream which is a video stream to enhance luminance of the base video stream, as the type of the second dynamic range, and the recording medium further has recorded therein the base video stream.

Accordingly, the playback device can be made to appropriately express luminance in accordance with the type of the video stream, regardless of what type of video stream is recorded in the recording medium. In other words, regardless of the realization method of the HDR video stream recorded in the recording medium, the playback device can be made to appropriately express luminance in accordance with that realization method.

Also, the management information file may further include second attribute information indicating the maximum luminance of the video stream. Accordingly, the playback device can be made to appropriately express luminance in accordance with the type of the video stream.

These general or specific aspects may be realized by a device, method, system, integrated circuit, computer program, or computer-readable recording medium such as a CD-ROM, and may be realized by any combination of a system, method, integrated circuit, computer program, and recording medium.

Preferred embodiments to carry out the present disclosure will be described below with reference to the attached drawings. It should be noted that the second embodiment is the closest to the disclosure in a first aspect of the present application, the basic configuration of the information recording medium and so forth in the second embedment will be described first by way of the first embodiment, to facilitate understanding.

First Embodiment

First, the basic structure and operations of a BD-ROM and a BD-ROM player that plays BD-ROMs will be described with reference to FIGS. 1 through 30.

Logical Data Structure on Disc

Figure 4:
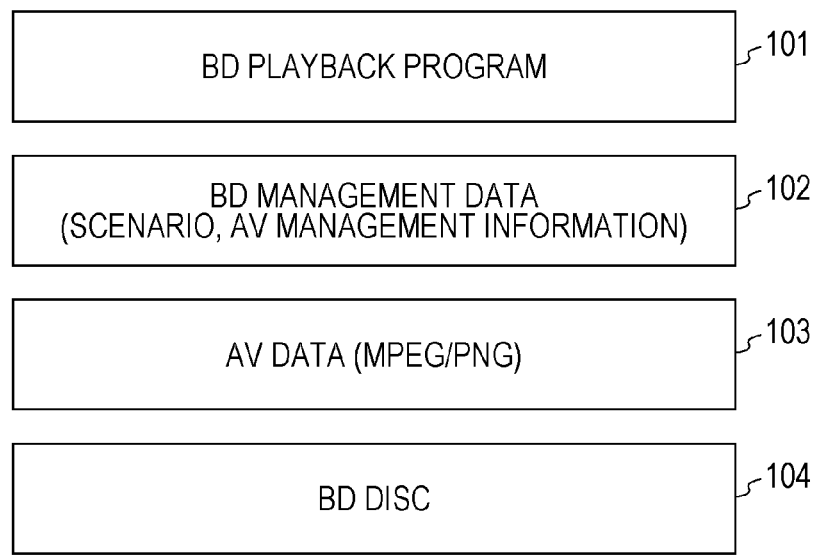
FIG. 4 is a diagram illustrating a data hierarchy of a BD-ROM.

FIG. 4 is a diagram illustrating data hierarchy on a BD-ROM. As illustrated in FIG. 4, there are recorded in a BD-ROM 104 that is a disc medium, AV data 103, BD management information 102 such as management information relating to the AV data, AV playback sequence, and so forth, and a BD playback program 101 that realizes interactivity.

Note that in the present embodiment, description of BD-ROM will be made primarily with regard to an AV application that plays AV contents such as movies, but a BD-ROM can be used as a recording medium for computer use, in the same way as with CR-ROMs and DVD-ROMs, as a matter of course.

Figure 5:
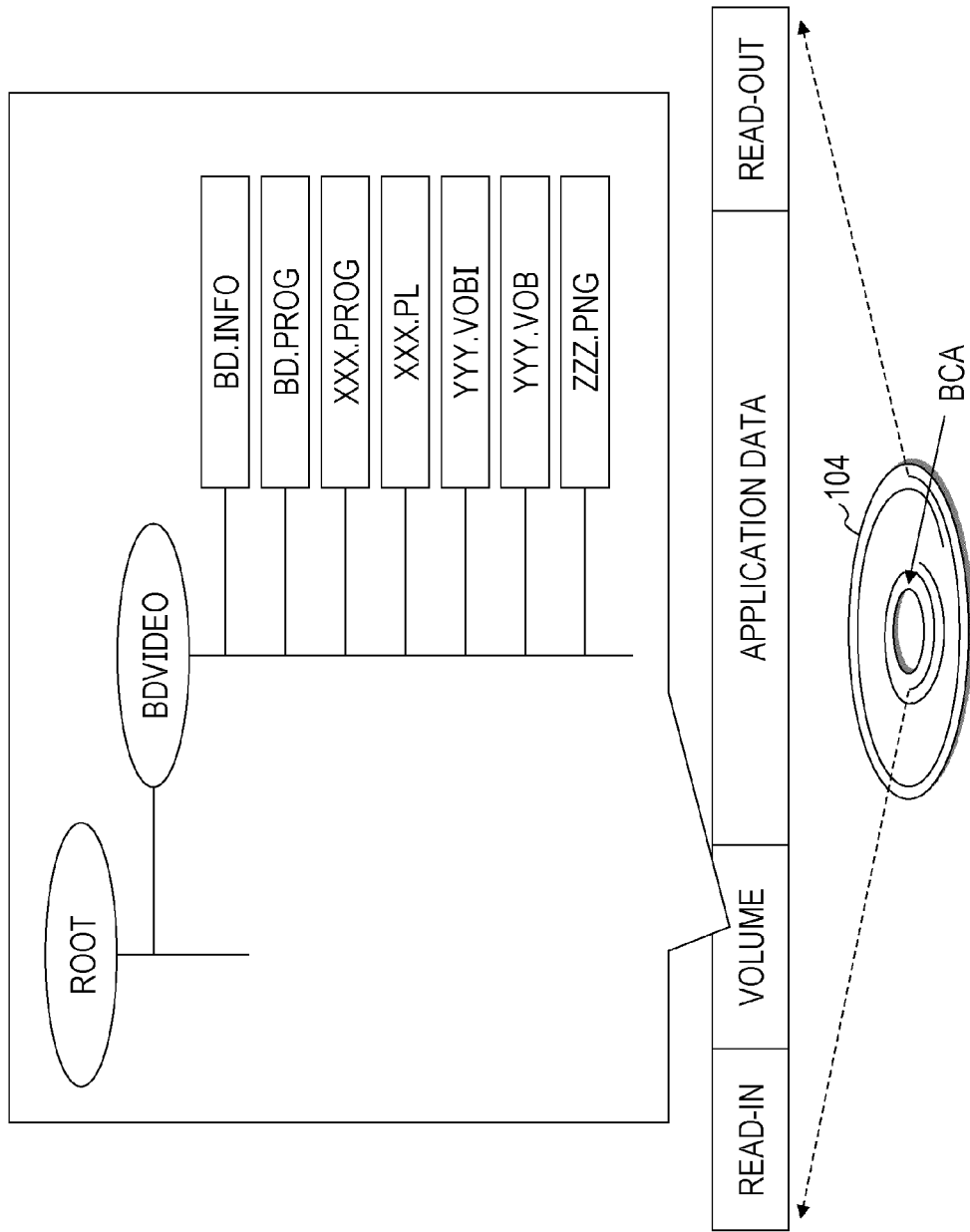
FIG. 5 is a diagram illustrating a structure of logical data recorded in a BD-ROM.

FIG. 5 is a diagram illustrating the structure of logical data recorded on the above BD-ROM 104. The BD-ROM 104 has a recording region in the form of a spiral from the inner perimeter thereof toward the outer perimeter, and has a logical address space where logical data can be recorded, between a read-in at the inner perimeter and a read-out at the outer perimeter, in the same way as with other optical discs, such as DVDs and CDs, for example.

On the inner side of the read-in there is a special region called a Burst Cutting Area (BOA), that can only be read out by the drive. This region is unreadable by applications, and accordingly is often used in copyright protection technology and so forth, for example.

Application data such as video data and the like is recorded the logical address space, with file system information (volume) at the beginning thereof. The file system is the arrangement for managing data stipulated by a standard such as UDF or ISO9660 or the like, as described above in the conventional art. Logical data recorded therein can be read out using the directory and file structure, in the same way as with a normal PC.

In the case of the present embodiment, the directory and file structure on the BD-ROM 104 has a BDVIDEO directory immediately below the root directory (ROOT). This directory is a directory in which data, such as AV data and management information handled by the BD-ROM (the BD playback program 101, BD management information 102, and AV data 103 illustrated in FIG. 4) is recorded.

The following seven types of files are recorded beneath the BDVIDEO directory.

BD.INFO (fixed filename)

This is one of "BD management information", and is a file in which is recorded information relating to the entire BD-ROM. The BD-ROM player reads out this file first.

BD.PROG (fixed filename)

This is one of "BD playback programs", and is a file in which is recorded a program relating to the entire BD-ROM.

XXX.PL ("XXX" is variable, suffix "PL" is fixed)

This is one of "BD management information", and is a file in which is recorded playlist (Play List) information that records a scenario. Each playlist has one file.

XXX.PROG ("XXX" is variable, suffix "PROG" is fixed)

This is one of "BD playback programs", and is a file in which is recorded a program for each aforementioned playlist. The correlation to the playlist is identified by the file body name ("XXX" matches).

YYY.VOB ("YYY" is variable, suffix "VOB" is fixed)

This is one of "AV data", and is a file in which is recorded a VOB (the same as the VOB described in the example of the conventional art). One VOB corresponds to one file.

YYY.VOB ("YYY" is variable, suffix "VOBI" is fixed)

This is one of "BD management information", and is a file in which is recorded management information relating to the VOB which is AV data. The correlation to the VOB is identified by the file body name ("YYY" matches).

ZZZ.PNG ("ZZZ" is variable, suffix "PNG" is fixed)

This is one of "AV data", and is a file in PNG (an image format standardized by the World Wide Web Consortium (W3C) and is pronounced "ping") which is image data for configuring subtitles and menu screens. One PNG image corresponds to one file.

Player Configuration

Figure 6:
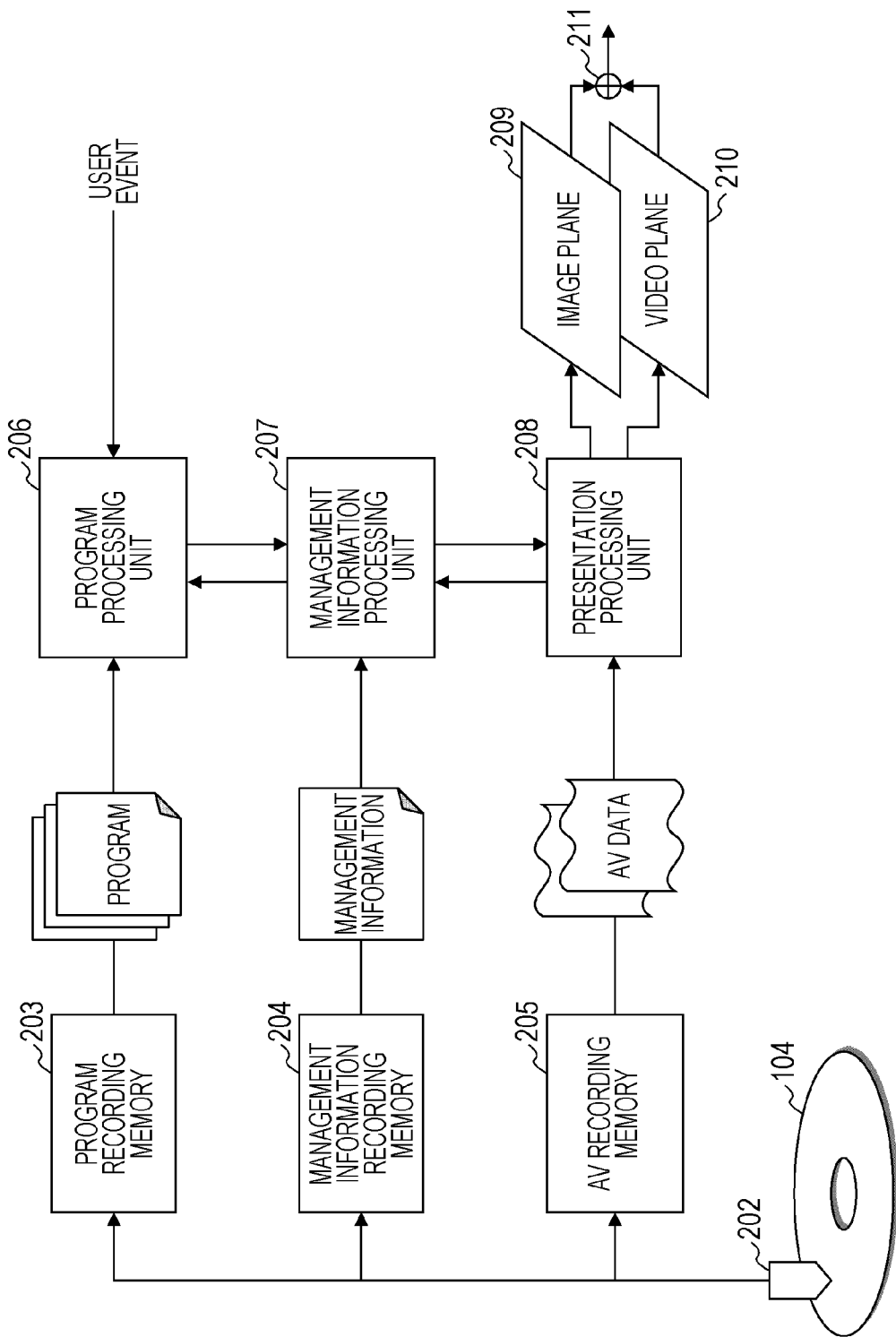
FIG. 6 is a diagram illustrating an overview of a basic configuration of a BD-ROM player that plays BD-ROMs.

Next, the configuration of a player that plays the BD-ROM 104 will be described with reference to FIGS. 6 and 7. FIG. 6 is a schematic diagram illustrating the basic configuration of a BD-ROM player that plays the BD-ROM 104. The BD-ROM player illustrated in FIG. 6 reads out data on the BD-ROM 104 via an optical pickup 202. The data that is read out is stored in dedicated memory in accordance with the type of each data.

The BD playback program ("BD.PROG" or "XXX.PROG" file) is recorded in program recording memory 203, the BD management information ("BD.INFO", "XXX.PL", or "YYY.VOBI" file) in management information recording memory 204, and AV data ("YYY.VOB" or "ZZZ.PNG" file) in AV recording memory 205, respectively.

The BD playback program recorded in the program recording memory 203 is processed by a program processing unit 206. The BD management information recorded in the management information recording memory 204 is processed by a management information processing unit 207. Also, the AV data recorded in the AV recording memory 205 is processed by a presentation processing unit 208.

The program processing unit 206 receives information of a playlist to be played from and event information such as the timing to execute a program from the management information processing unit 207, and performs processing of the program. The playlist to play can be dynamically changed at the program, and this can be realized by sending a play command of the playlist after changing to the management information processing unit 207.

The program processing unit 206 further accepts events from the user, such as requests from a remote controller that the user operates for example, and in a case where there is a program corresponding to the user event, executes the processing.

The management information processing unit 207 receives instructions from the program processing unit 206 and analyzes a playlist corresponding to that instruction and the management information of a VOB corresponding to that playlist. Further, instructions of AV data to be played are given to the presentation processing unit 208.

The management information processing unit 207 also receives reference time information from the presentation processing unit 208, and performs stopping instruction of the AV data playback to the presentation processing unit 208 based on the time information. Further, an event is generated indicating the program executing timing as to the program processing unit 206.

The presentation processing unit 208 has decoders corresponding to each data of video, audio, and subtitles, and decodes and outputs AV data in accordance with instructions from the management information processing unit 207. The video data and subtitle data is drawn on respective dedicated planes after decoding.

Specifically, the video data is drawn on a video plane 210, and image data such as subtitle data is drawn on an image plane 209, further, compositing processing of the video drawn on the two planes is performed by a compositing processing unit 211 and output to a display device such as a television (TV) or the like.

The BD-ROM player has a configuration based on the data structure recorded in the BD-ROM 104 illustrated in FIG. 4, as illustrated in FIG. 6. FIG. 7 is a block diagram detailing the configuration of the player illustrated in FIG. 6. The correlation of the components illustrated in FIG. 6 and the components illustrated in FIG. 7 is as follows.

The AV recording memory 205 corresponds to image memory 308 and a track buffer 309. The program processing unit 206 corresponds to a program processor 302 and a UO (User Operation) manager 303.

The management information processing unit 207 corresponds to a scenario processor 305 and a presentation controller 306. The presentation processing unit 208 corresponds to a clock 307, a demultiplexer 310, an image processor 311, a video processor 312, and a sound processor 313.

The VOB data (MPEG stream) read out from the BD-ROM 104 is recorded in the track buffer 309, and the image data (PNG) in the image memory 308.

The demultiplexer 310 extracts VOB data recorded in the track buffer 309, based on the time obtained from the clock 307. Further, video data included in the VOB data is sent to the video processor 312, and the audio data to the sound processor 313.

The video processor 312 and sound processor 313 each are configured including a decoder buffer and a decoder, as stipulated by the MPEG system standard. That is to say, the data of each of the video and audio sent from the demultiplexer 310 is temporarily recorded in the respective decoder buffers, and subjected to decoding processing at the respective decoders following the clock 307.

There are the following two processing methods for the PNG data recorded in the image memory 308. In a case where the PNG data is for subtitles, the decoding timing is instructed by the presentation controller 306. The scenario processor 305 first receives the time information from the clock 307, and instructs the presentation controller 306 to display or not display subtitles when the subtitle display time (starting and ending) arrives, so that appropriate subtitle display can be performed.

The image processor 311 which has received a decode/display instruction from the presentation controller 306 extracts the corresponding PNG data from the image memory 308, decodes, and draws on the image plane 209.

Also, in a case where the PNG data is for a menu screen, the decoding timing is instructed by the program processor 302. When the program processor 302 instructs decoding of the image is dependent on the BD program that the program processor 302 is processing, and accordingly is not always the same.

The image data and video data is drawn on the image plane 209 and video plane 210 after the respective decoding described in FIG. 6, and composited and output by the compositing processing unit 211.

The management information read out from the BD-ROM 104 (scenario and AV management information) is recorded in the management information recording memory 204, but the scenario information ("BD.INFO" and "XXX.PL") is read out and processed by the scenario processor 305. Also, the AV management information ("YYY.VOBI") is read out and processed by the presentation controller 306.

The scenario processor 305 analyzes the playlist information, instructs the presentation controller 306 of the VOB referenced by the playlist and the playback position thereof. The presentation controller 306 analyzes the management information ("YYY.VOBI") of the VOB to be handled, and instructs a drive controller 317 to read out the VOB to be handled.

The drive controller 317 follows the instructions of the presentation controller 306 to move the optical pickup 202, and read out the AV data to be handled. The AV data that has been read out is recorded in the image memory 308 or track buffer 309, as described earlier.

The scenario processor 305 monitors the time of the clock 307, and hands the event to the program processor 302 at the timing set in the management information.

The BD program recorded in the program recording memory 203 ("BD.PROG" or "XXX.PROG") is executed by the program processor 302. The program processor 302 processes a BD program in a case where an event has been sent from the scenario processor 305 or a case where an event has been sent from the UO manager 303. In a case where a request has been sent from the user by a remote controller key, the UO manager 303 generates an event corresponding to this request, and sends to the program processor 302. Playback of a BD-ROM is performed by the operations of the components as described above.

Application Space

Figure 8:
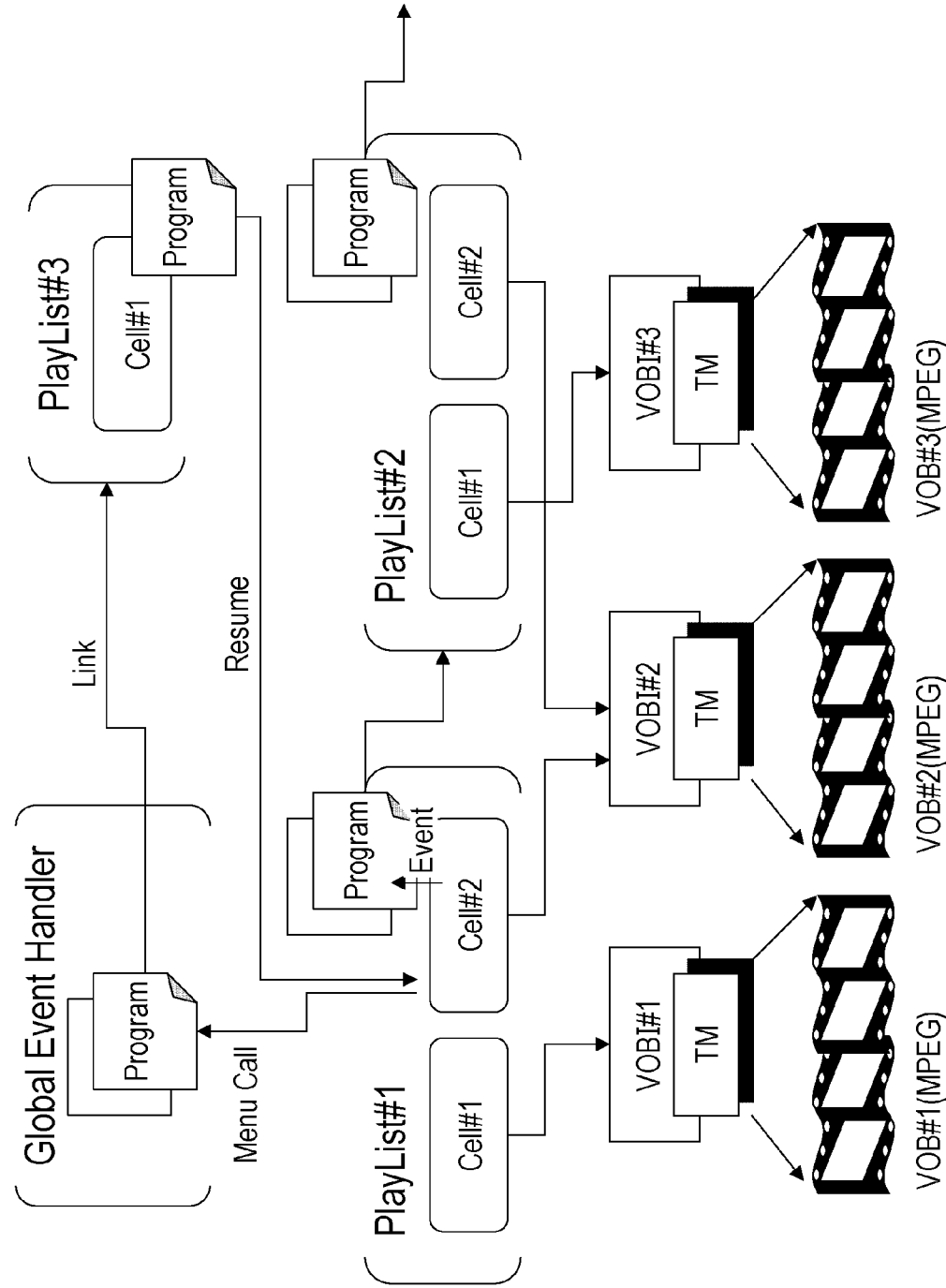
FIG. 8 is a diagram illustrating application space of a BD-ROM.

FIG. 8 is a diagram illustrating application space of a BD-ROM. In the application space of a BD-ROM, a playlist (PlayList) is one playback unit. A playlist has a static scenario that is made up of a playback sequence of cells (Cell), and a dynamic scenario described by a program. As long as there is no dynamic scenario according to a program, the playlist is simply playing the individual cells in order, and playback of the playlist ends at the point that playback of all cells has ended.

On the other hand, a program is capable of describing playback beyond the playlist, and dynamically changing the object of playback in accordion with user selections or the state of the player. A typical example is dynamic change of the object of playback made via the menus screen. In the case of a BD-ROM, a menu is a scenario played by user selection, i.e., one component of a function to dynamically select a playlist.

The term program as used here means an event handler executed by a time-based event or a user event. A time-based event is an event generated based on time information embedded in the playlist. An event sent from the scenario processor 305 to the program processor 302 as described in FIG. 7 corresponds to this. Upon a time-based event being issued, the program processor 302 process execution of an event handler correlated by ID.

As described earlier, a program to be executed may instruct playback of another playlist, and in this case, the playback of the playlist currently being played is canceled, and transitions to playback of the specified playlist.

A user event is an event generated by operations of remote controller keys by the user. There are two general types of user events. A first is an event of selecting a menu generated by operations of cursor keys ("up", "down", "left", and "right" keys) and an "OK" key that the remote controller has.

The event handler corresponding to the event of menu selection is only valid for restricted time within the playlist. That is to say, validity periods are set for each of the event handles, as playlist information. The program processor 302 searches for a valid event handler when an "up", "down", "left", "right", or "OK" key has been pressed, and in a case where there is a valid event handler, the event handler is executed. Otherwise, the event of menu selection is ignored.

The second user event is an event for calling up a menu screen generated by operation of a "menu" key. Upon a menu screen call-up event being generated, a global event handler is called.

A global event handler is an event handler that is not dependent on any playlist, and is constantly valid. Using this function enables a DVD menu call to be implemented. Implementing a menu call enables audio and subtitle menus and so forth to be called up during playback of a title, and to execute playback of the title from the paused point where the audio or subtitles was changed.

A cell (Cell), which is a unit making up a static scenario in the playlist, is a reference to all or part of a playback section of a VOB (MPEG stream). A cell has information of starting and ending time of the playback section within the VOB. VOB management information (VOBI), that is paired with each VOB, has a time map (Time Map or TM) therein, and can find the readout start address and end address for the playback and end time of the VOB within the VOB (i.e., within the object file "YYY.VOB") described by this time map. Details of the time map will be described later with reference to FIG. 14.

Details of VOB

Figure 9:
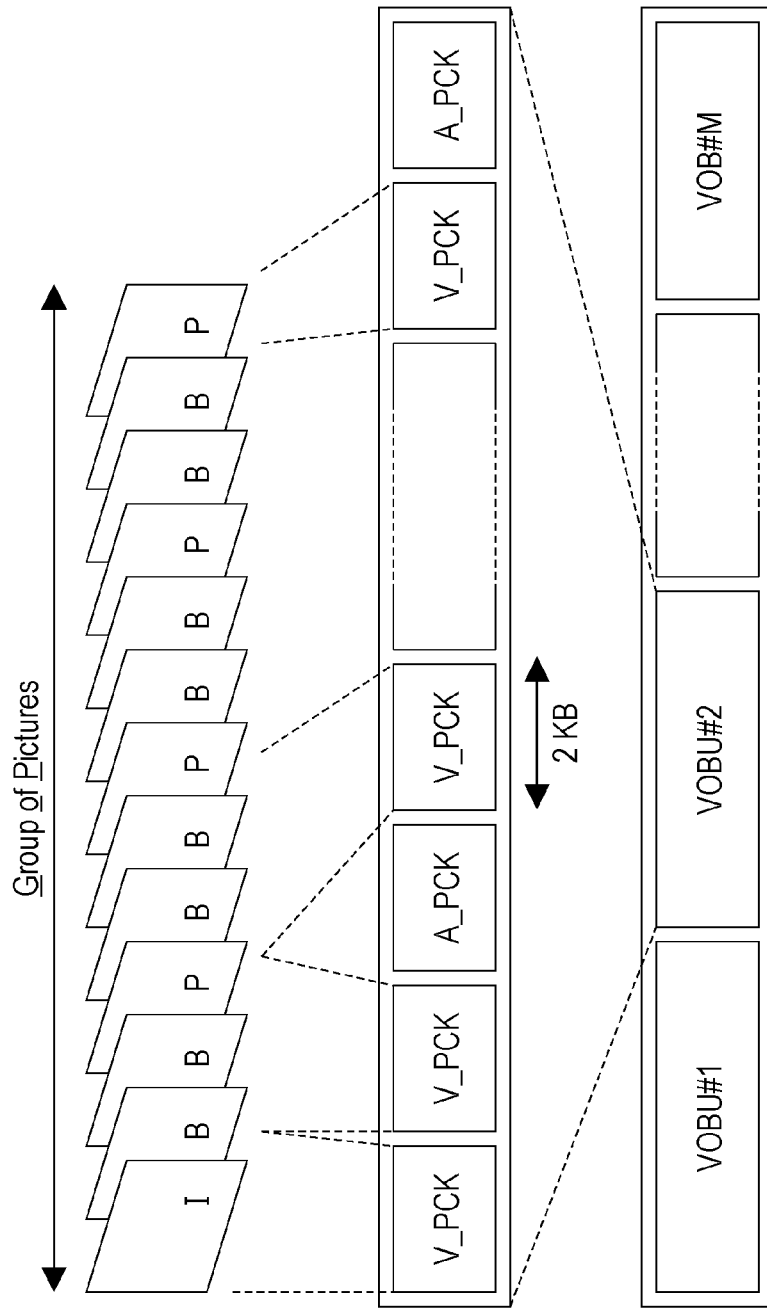
FIG. 9 is a diagram illustrating the configuration of an MPEG stream (VOB)

FIG. 9 is a diagram illustrating the configuration of an MPEG stream (VOB) used in the present embodiment. As illustrated in FIG. 9, a VOB is made up of multiple Video Object Units (VOBU). A VOBU is a unit based on a Group Of Pictures (GOP) in a MPEG video stream, and is one playback unit in a multiplexed stream including audio data.

A VOBU has playback time of 0.4 seconds to 1.0 seconds, and normally has playback time of 0.5 seconds. This is due to the MPEG GOP structure normally being 15 frames/second (in the case of NTSC).

A VOBU has a video pack (V_PCK) that is video data and an audio pack (A_PCK) that is audio data therein. Each pack is configured of 1 sector, and in the case of the present embodiment is configured in 2 kB units.

Figure 10:
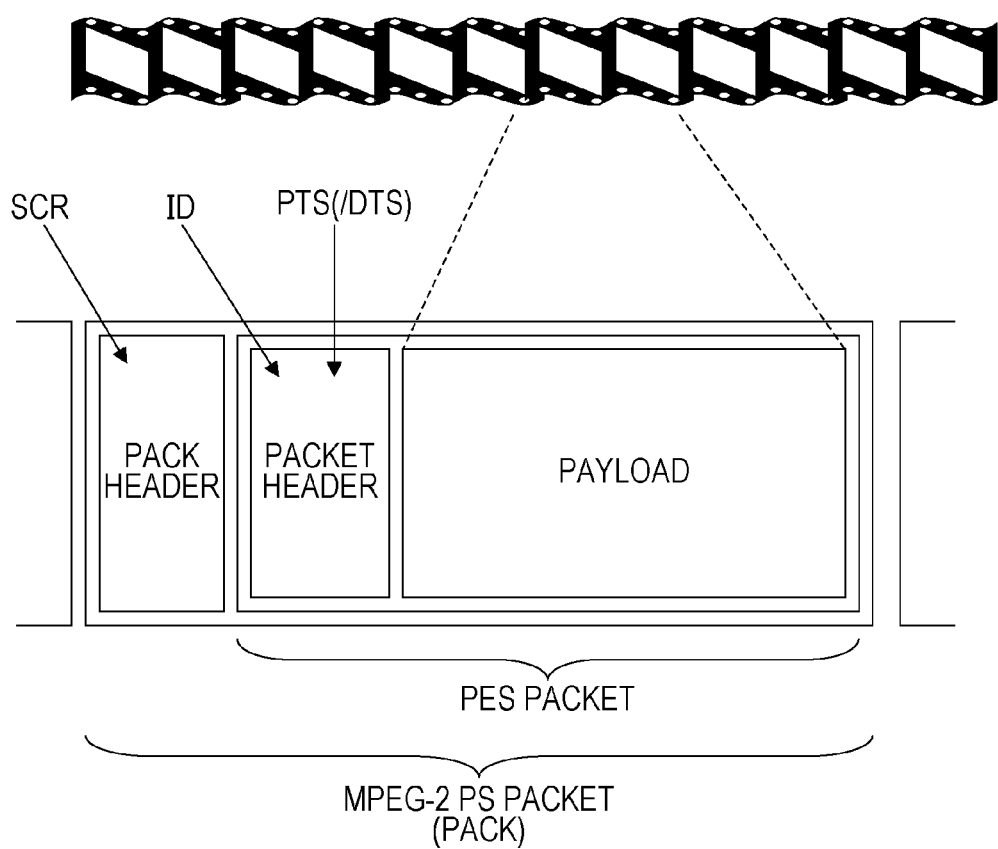
FIG. 10 is a diagram illustrating the configuration of packs in an MPEG stream.

FIG. 10 is a diagram illustrating the configuration of a pack in an MPEG stream. Elementary data such as video data and audio data are sequentially input from the beginning of a data storage region in a packet, called a payload, as illustrated in FIG. 10. A packet header is attached to a payload, making up one packet.

Recorded in the packet header is an ID (stream_id) for identifying which stream the data stored the payload belongs to, whether video data or audio data, and in a case there are multiple streams worth of video data or audio data, which stream the data belongs to, and a Decode Time Stamp (DTS) and Presentation Time Stamp (PTS) that are timestamps for the decoding and displaying time information of this payload.

Not all packet headers necessarily have a DTS and PTS recorded; rules for recording are stipulated in MPEG. Details of the rules are laid forth in the MPEG system (ISO/IEC13818-1) Standard, and accordingly will be omitted here.

A header (pack header) is further added to the packet, thereby making up a pack. The pack header has recorded therein a System Clock Reference (SCR) that is a timestamp indicating when this pack passes through the demultiplexer 310 and is to be input to decoder buffers of the individual elementary streams.

Interleaved Recording of VOB

Figure 11:
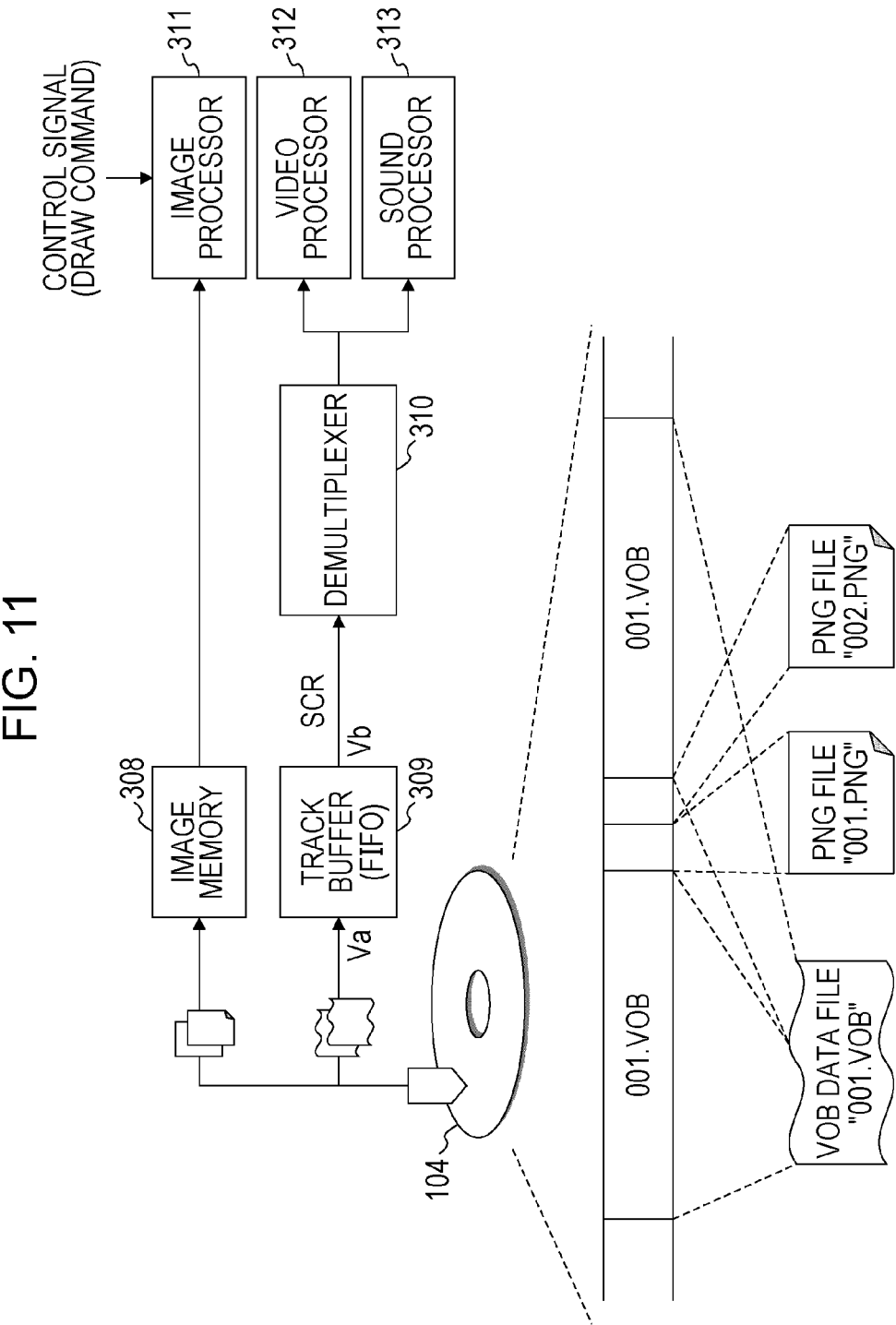
FIG. 11 is a diagram for describing the relationship between AV data and player configuration.

Interleaved recorded of VOB files will be described with reference to FIGS. 11 and 12. FIG. 11 is a diagram for describing the relationship between the AV data and the configuration of a BD-ROM player. Illustrated to the upper side of FIG. 11 is part of the player configuration diagram described above with reference to FIG. 7. The data in the BD-ROM is passes through the optical pickup 202 and is input to the track buffer 309 if a VOB, i.e., an MPEG stream, and input to the image memory 308 if a PNG, i.e., image data.

The track buffer 309 is a First-In First-Out (FIFO), with input VOB data being sent to the demultiplexer 310 in the order in which it was input. At this time, the individual packs are extracted from the track buffer 309 according to the aforementioned SCR, and data is delivered to the video processor 312 or sound processor 313 via the demultiplexer 310.

Figure 7:
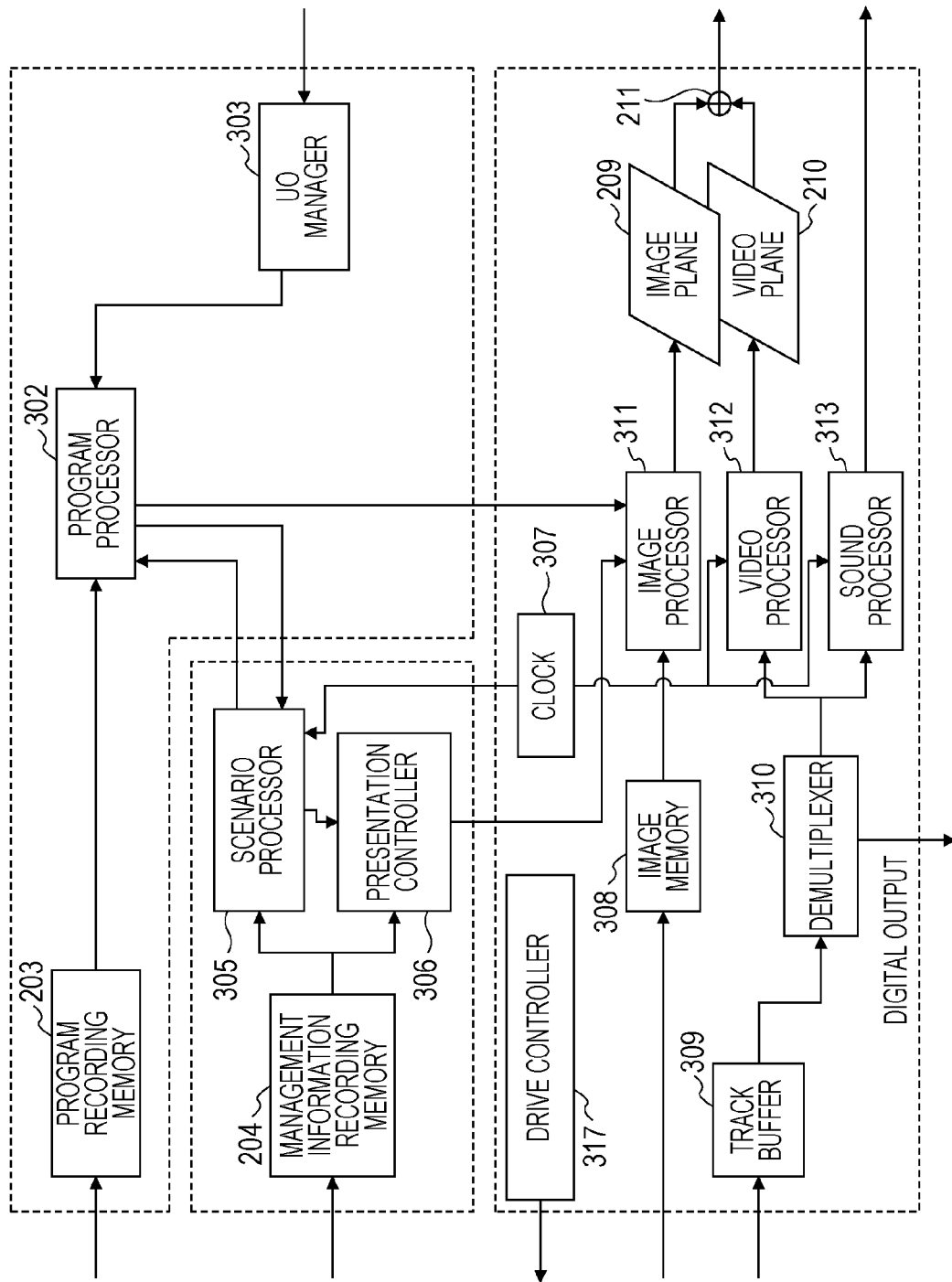
FIG. 7 is a block diagram where the configuration of the player illustrated in FIG. 6 is detailed.

On the other hand, In a case of image data, which image to draw is instructed by the presentation controller 306 (see FIG. 7). The image data used for drawing is deleted from the image memory 308 at the same time if image data for subtitles, but is retained in the image memory 308 if image data for a menu. This is because drawing of the menu is dependent on user operations, so there is the possibility that the same image will be drawn multiple times.

Illustrated to the lower side of FIG. 11 is interleaved recording of a VOB file and PNG files on the BD-ROM. Generally, in the case of a CD-ROM or DVD-ROM for example, AV data that is a series of continuous playing units is recorded continuously. As long as the data is recorded continuously, all the drive has to do is to sequentially read out the data and deliver it to the player side.

However, in a case where the AV data to be continuously play is fragmented and dispersed across the disc, seek operations are interposed between the individual continuous sections, and data readout stops during this time. That is to say, supply of data may stop.

In the same way, recording of a VOB file in a continuous region is desirable for BD-ROMs as well, but there is data such as subtitle data for example, that is to be played synchronously with the video data in the VOB, so the subtitle data needs to be read out from the BD-ROM in one way or another.

One way of reading out subtitle data is to read out all subtitle image data (PNG file) before starting playback of the VOB. However in this case, a great amount of memory is necessary to use for temporary recording, so this is not realistic. Accordingly, a method where a VOB file is divided into several blocks, and the VOB file and image are subjected to interleaved recording is employed with the present embodiment.

Illustrated to the lower side of FIG. 11 is interleaved recording. By suitably performing interleaved placement of the VOB file and image data, image data can be stored in the image memory 308 at a necessary timing, without the great amount of temporary recording memory described above. However, while the image data is being read out, readout of VOB data stops, as a matter of course.

Figure 12:
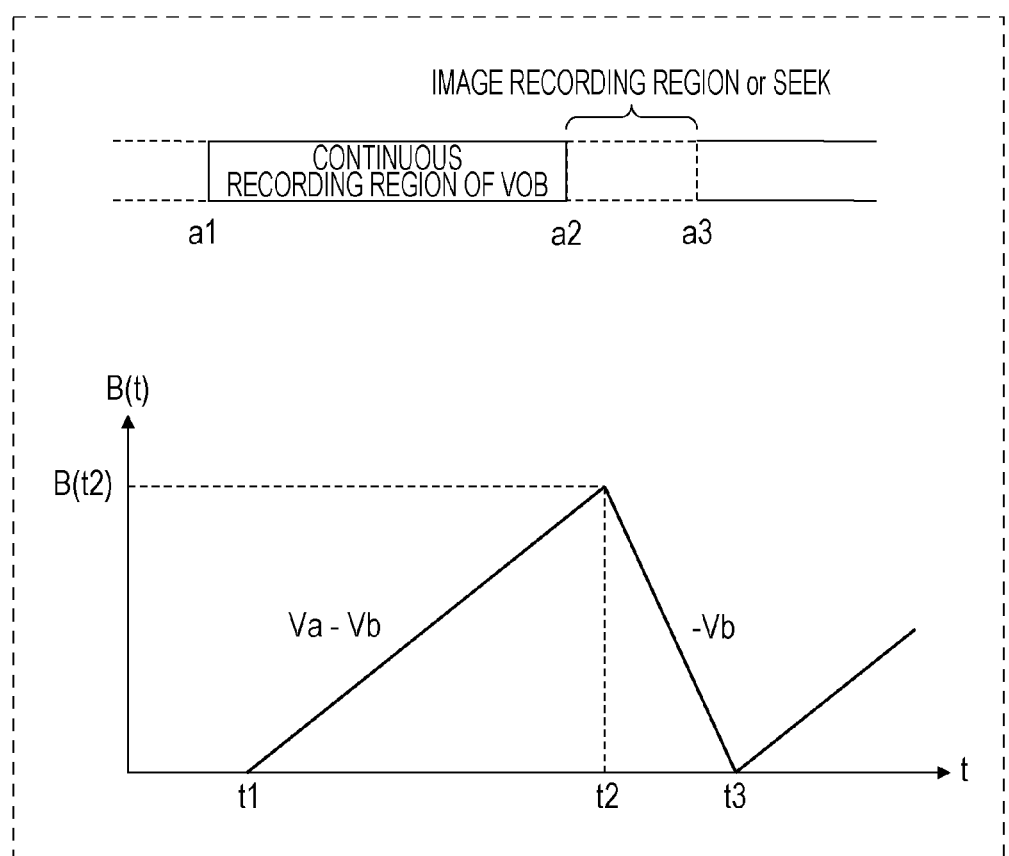
FIG. 12 is a diagram for describing a VOB data continuous supply model using a track buffer.

FIG. 12 is a diagram for describing a VOB data continuous supply model using the track buffer 309, to solve the above problem in interleaved recording. As described earlier, VOB data is temporarily stored in the track buffer 309. Setting the data input rate to the track buffer 309 to be higher than the data output rate from the track buffer 309 means that the amount of data sorted in the track buffer 309 continues to increase, as long as data is being read out from the BD-ROM.

Now, the input rate to the track buffer 309 is denoted by Va, and the output rate from the track buffer 309 is denoted by Vb. The continuous recording region of the VOB continues from "a1" to "a2" as illustrated to the upper side of FIG. 12. From "a2" to "a3" is a section where image data is recorded, so VOB data cannot be read out.

Illustrated to the lower side of in FIG. 12 is the stored amount in the track buffer 309. The horizontal axis represents time, and the vertical axis represents the amount of data sorted inside the track buffer 309. The time "t1" indicates the time at which readout of the continuous recording region of the VOB "a1" has started.

After this time, data will be accumulated in the track buffer 309 at a rate of Va−Vb. It is needless to say that this is the difference in the input/output rates of the track buffer 309. Time "t2" is the time to read in data at "a2", and is the end point of one continuous recording region.

That is to say, the amount of data in the track buffer 309 increases at the rate of Va−Vb from "t1" to "t2", and the data accumulation amount B(t2) at the time "t2" can be calculated by the following Expression (1).

$$B(t2)=(Va-Vb)\times(t2-t1) \qquad \text{Expression (1)}$$

Thereafter, image data continues until the address "a3" on the BD-ROM, so input to the track buffer 309 is 0, and the amount of data within the track buffer 309 decreases at an output rate "−Vb". This reduction in data amount continues until the readout position "a3", i.e., until the time "t3".

What is important here is that once the data amount stored in the track buffer 309 before time "t3" reaches 0, there is no more VOB data to supply to the decoder, so playback of the VOB will stop. However, in a case where the is data remaining in the track buffer 309 at time "t3", this means that playback of the VOB can be continued without stopping.

The conditions for the VOB playback to be continuously performed without stopping can be expressed by the following Expression (2).

$$B(t2) \geq -Vb \times (t3-t2) \quad \text{Expression (2)}$$

That is to say, the array of image data should be decided so as to satisfy Expression (2).

Navigation Data Structure

Figure 13:
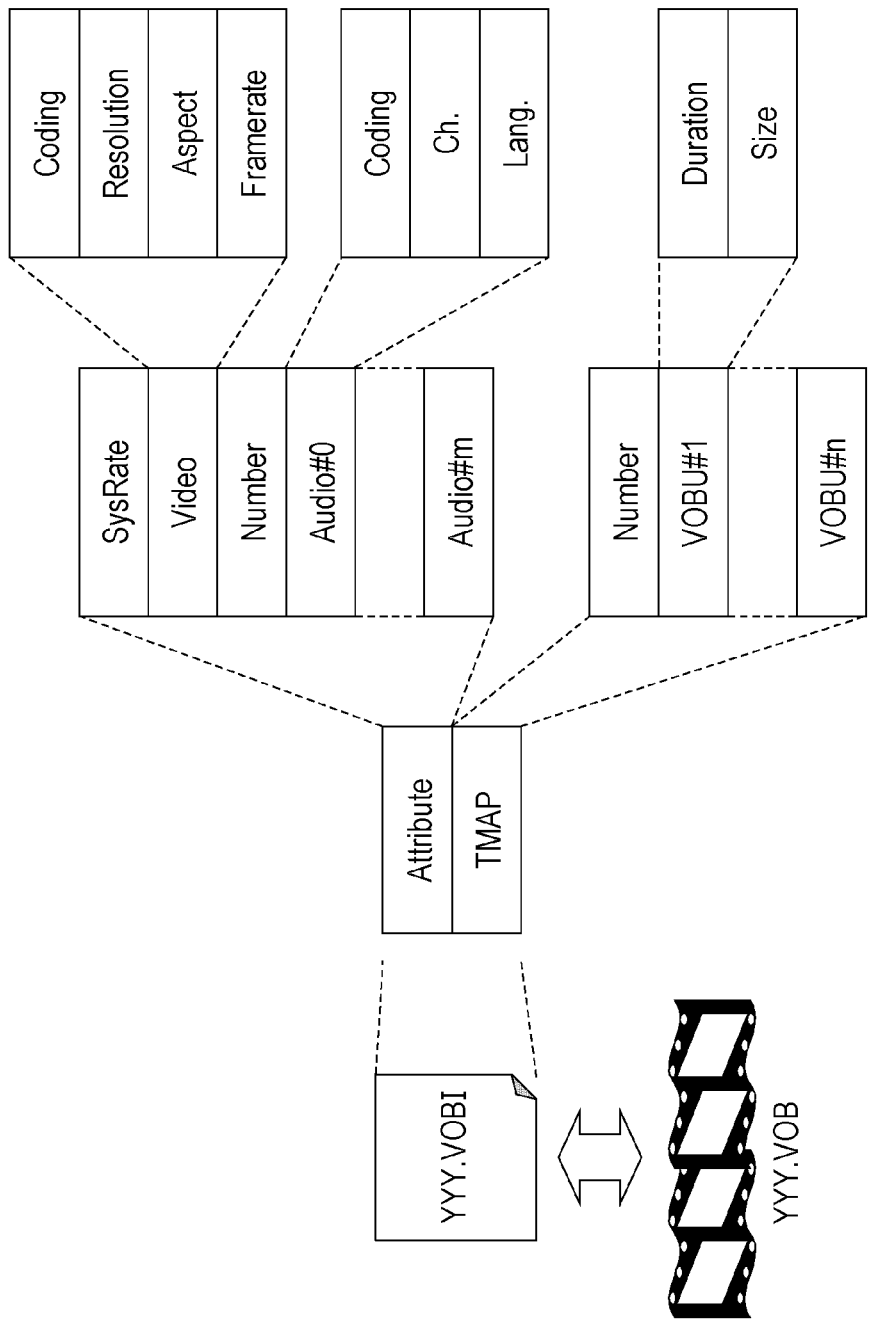
FIG. 13 is a diagram illustrating the internal structure of a VOB management information file.

The structure of navigation data (BD management information) recorded in the BD-ROM will be described with reference to FIGS. 13 through 19. FIG. 13 is a diagram illustrating the internal structure of a VOB management information file ("YYY.VOBI").

The VOB management information has stream attribute information (Attribute) and a time map (TMAP) of this VOB, The stream attribute information is of a configuration having video attributes (Video) and audio attributes (Audio#0 through Audio#m) individually. Particularly, in the case of an audio stream, the VOB can have multiple audio streams at the same time, so the number of data fields of the audio attributes is identified by the number of audio streams (Number).

The following is an example of fields that the video attributes (Video) have, and values which each can have.
 Compression format (Coding):
  MPEG1
  MPEG2
  MPEG4
 Resolution (Resolution):
  1920×1080
  1280×720
  720×480
  720×565
 Aspect ratio (Aspect):
  4:3
  16:9
 Frame rate (Framerate):
  60
  59.94
  50
  30
  29.97
  25
  24

The following are example of fields that the audio attributes (Audio) have, and values which each can have.
 Compression format (Coding):
  AC3
  MPEG1
  MPEG2
  LPCM
 Number of channels (Ch):
  1 to 8
 Language attributes (Language):
  JPN, ENG, . . .

The time map (TMAP) is a table having information for each VOBU, and holds the number of VOBUs (Number) that the VOB has, and each VOBU information (VOBU#1 through VOBU#n). Each VOBU information has a playtime length (Duration) of the VOBU and data size (Size) of the VOBU.

Figure 14:
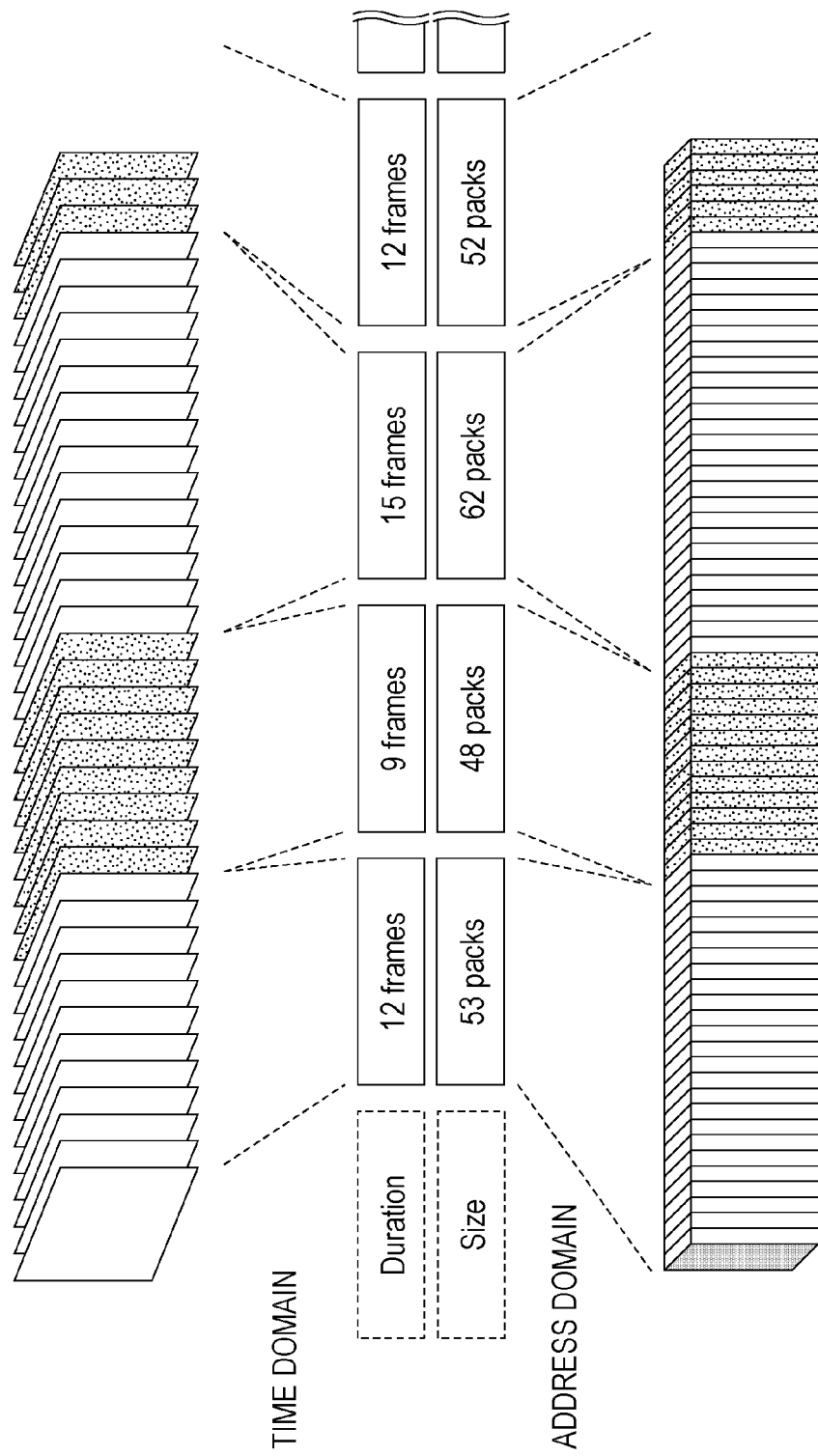
FIG. 14 is a diagram for describing the details of VOBU information.

FIG. 14 is a diagram for describing the details of VOBU information. It is widely known that the MPEG stream has aspects regarding two physical amounts, a temporal aspect and a data-size aspect. For example, Audio Code number 3 (AC3) that is an audio compression standard performs compression at a fixed bitrate, so the relationship between time and address can be obtained by a primary expression.

However, in the case of MPEG video data, each frame has a fixed display time such as 1/29.97 seconds in the case of NTSC for example, but the data size of each frame after compression will vary greatly depending on the picture properties and the picture type used in compression, which are the so-called I/P/B pictures.

Accordingly, it is impossible to express the relationship between time and address by a common expression in the case of MPEG video. As a matter of course, it is impossible to express the relationship between time and address by a common expression, with regard to an MPEG stream where MPEG video data has been multiplexed, i.e., a VOB, as well.

Instead, the relationship between time and address within the VOB is associated by a time map (TMAP). A table which has the number of frames in each VOBU and the number of packs in the VOBU as entries is the time map (TMAP), as illustrated in FIG. 14.

Figure 15:
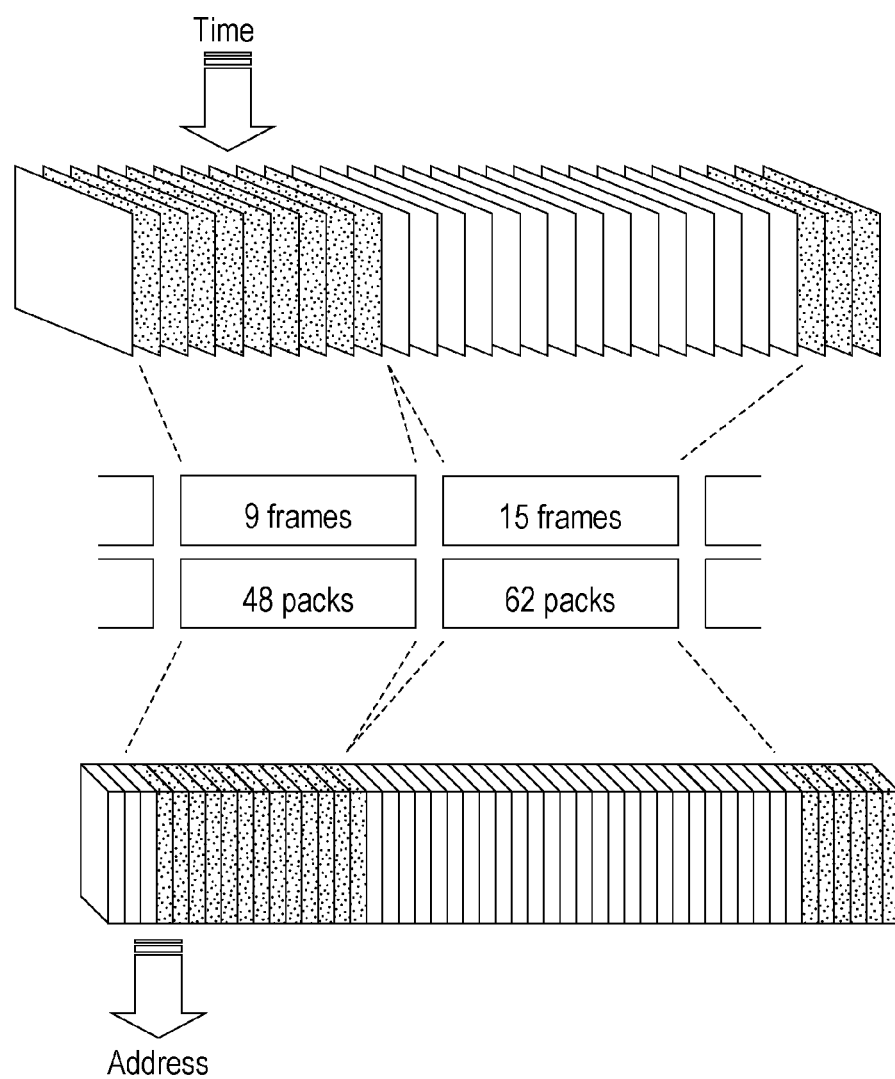
FIG. 15 is a diagram for describing an address information acquisition method using a time map.

How to use a time map (TMAP) will be described with reference to FIG. 15. FIG. 15 is a diagram for describing an address acquisition method using a time map. In a case where time information (Time) is provided, as illustrated in FIG. 15, first, to which VOBU that time belongs is searched for. Specifically, the number of frames is added for each VOBU in the time map, and the VOBU where the sum of the number of frames exceeds or matches the value obtained by converting this time into the number of frames is the VOBU that corresponds to this time.

Next, the size for each VOBU in the time map are added up to the VOBU immediately preceding this VOBU, and that values is the beginning address (Address) of the pack to be read out to play the frame including the time that has been given. Accordingly, an address corresponding to given time information can be obtained in an MPEG stream.

Figure 16:
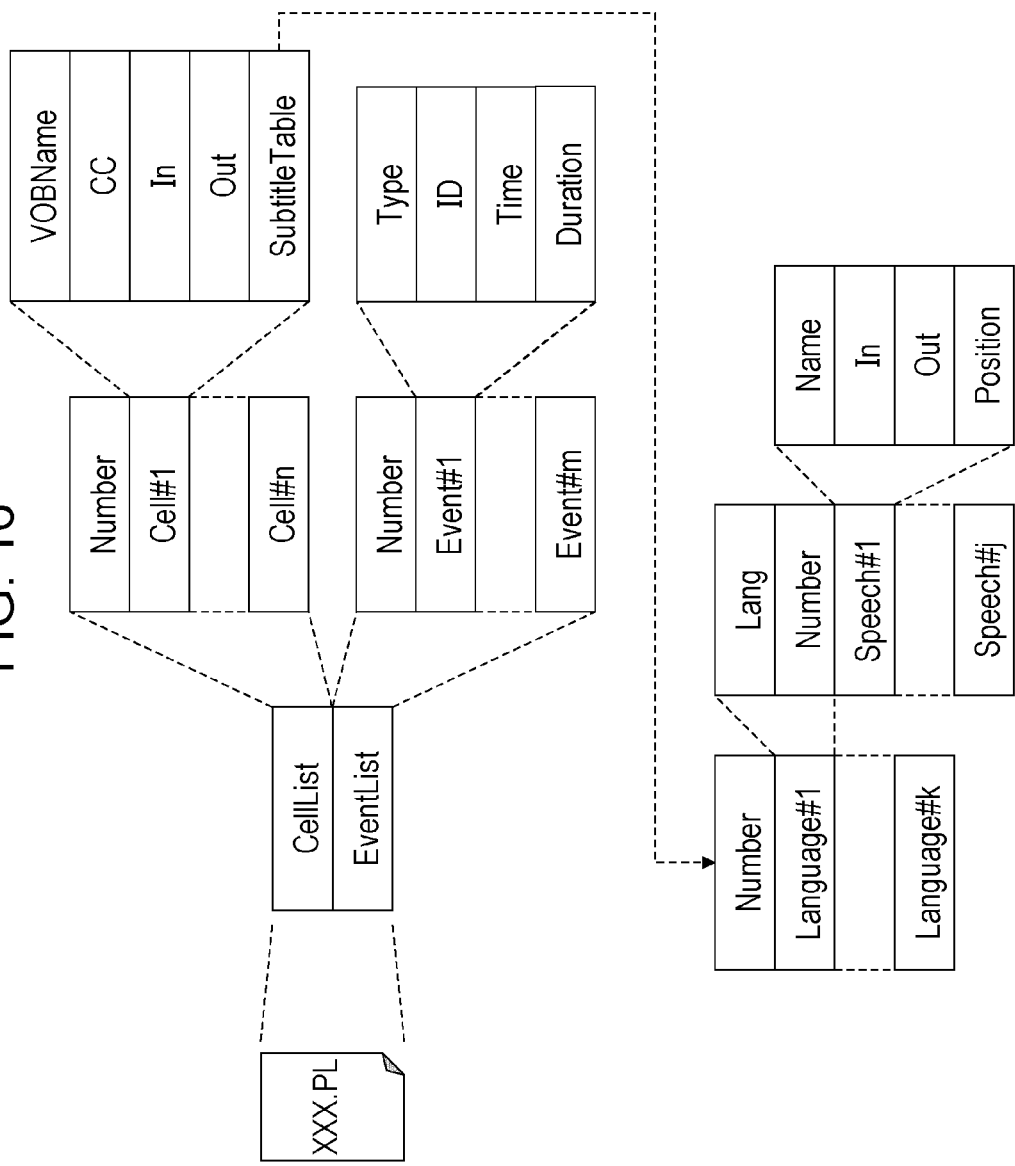
FIG. 16 is a diagram illustrating the configuration of a playlist.

Next, the internal structure of the playlist ("XXX.PL") will be described with reference to FIG. 16. FIG. 16 is a diagram illustrating the configuration of a playlist. A playlist is made up of a cell list (CellList) and event list (EventList).

A cell list (CellList) is information indicating the playback cell sequence within the playlist, and cells are played in the order of description in this list. The content of a cell list (CellList) is the number of cells (Number) and information of each cell (Cell#1 through Cell#n).

The information of each cell (Cell#1 through Cell#n) has the VOB filename (VOBName), the valid section start time (In) and valid section end time (Out) in this VOB, and a subtitle table (SubtitleTable). The valid section start time (In) and valid section end time (Out) are each expressed by frame No. within this VOB, and the address for VOB data necessary for playback can be obtained by using the above-described time map (TMAP).

The subtitle table (SubtitleTable) is a table having subtitle information that is synchronously played with this VOB. The subtitles may have multiple languages, in the same way as with the audio. The subtitle table (SubtitleTable) is made up of the number of languages (Number) and a subsequent table for each language (Language#1 through Language#k).

The table for each language (Language#1 through Language#k) is made up of language information (Language), the number of pieces of subtitle information of the subtitles to be displayed (Number) The subtitle information of the subtitles to be displayed (Speech#1 through Speech#j). Each subtitle information (Speech#1 through Speech#j) is made up of a corresponding image data filename (Name), subtitle display start time (In) and subtitle display end time (Out), and subtitle display position (Position).

The event list (EventList) is a table defining events occurring within this playlist. The event list is made up of the number of events (Number), and following this the individual events (Event#1 through Event#m), each event (Event#1 through Event#m) being made up of event type (Type), event ID (ID), event generation time (Time), and valid period (Duration).

Figure 17:
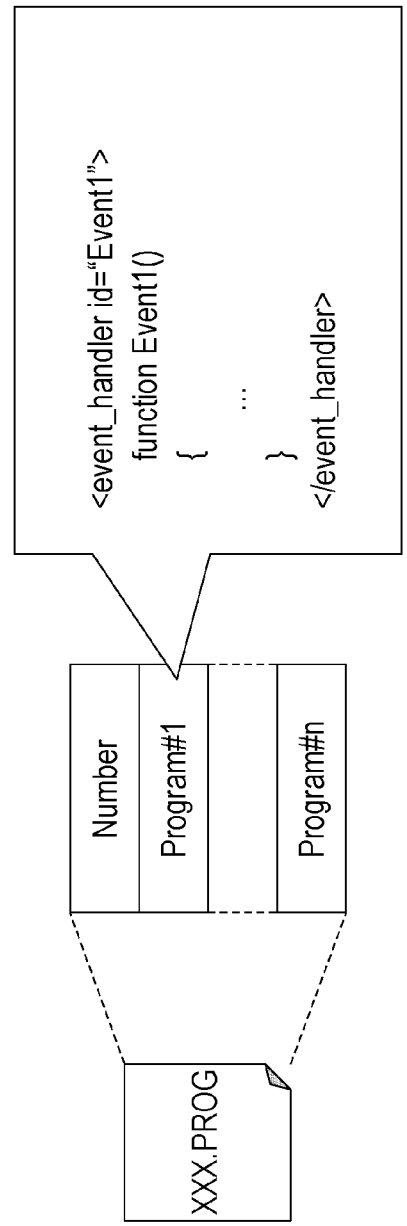
FIG. 17 is a diagram illustrating the configuration of an event handler table.

FIG. 17 is a diagram illustrating the configuration of an event handler table ("XXX.PROG") that has an event handler (time-based events, and user events for menu selection), for each playlist. The event handler table contains the number of event handlers/programs that are defined (Number), and individual event handlers/programs (Program#1 through Program#n).

The description within each of the event handlers/programs (Program#1 through Program#n) contains a definition of the start the event handler (an <event_handlers> tag) and an event handler ID (event_handler id) that is paired with the aforementioned event ID. Following this, the program is described between brackets { } after "function".

Figure 18:
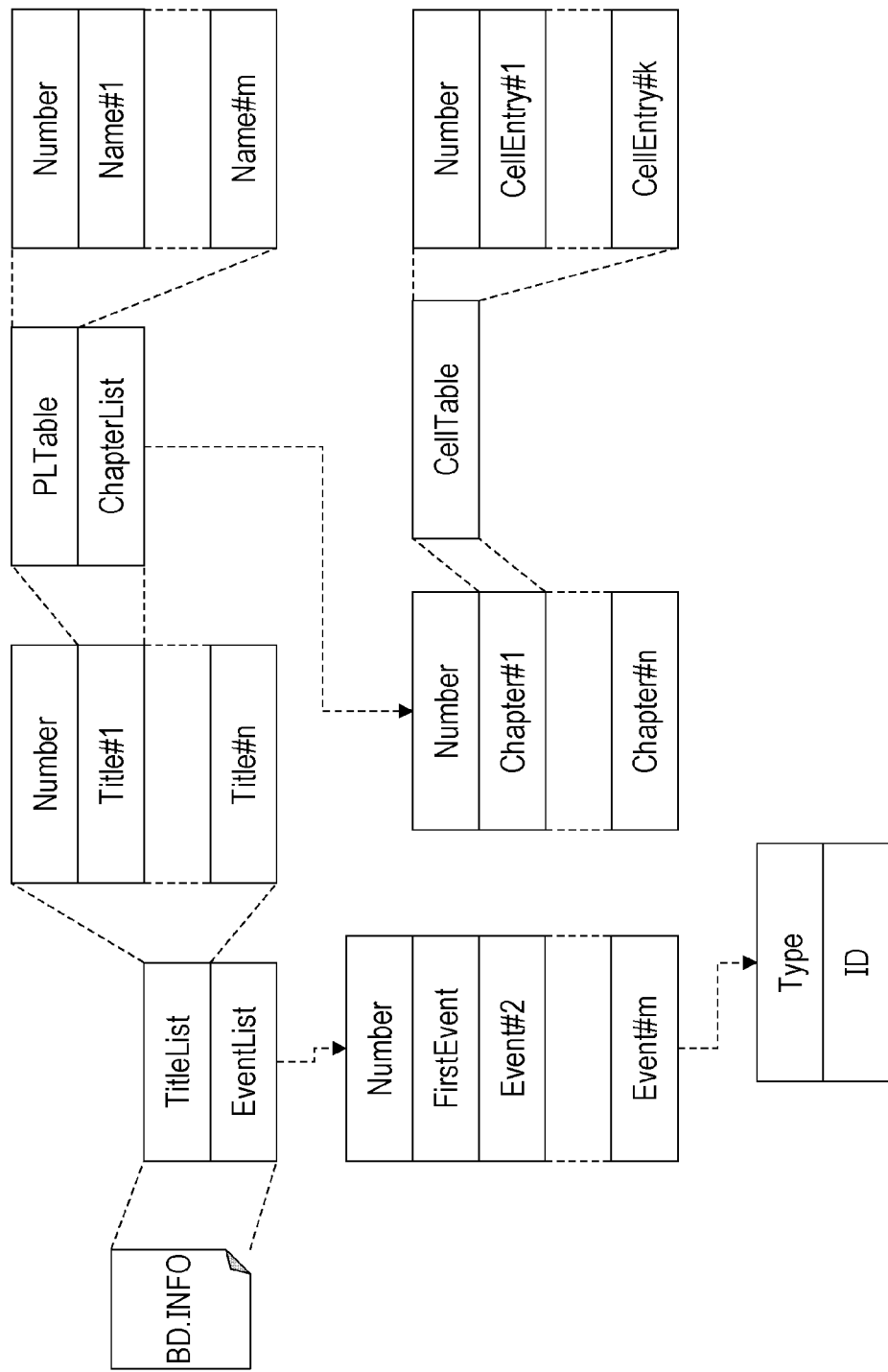
FIG. 18 is a diagram illustrating the configuration of BD.INFO which is overall BD-ROM information.

Next, the information relating to the entire BD-ROM ("BD.INFO") will be described with reference to FIG. 18. FIG. 18 is a diagram illustrating the configuration of BD.INFO which is overall BD-ROM information. The overall BD-ROM information is made up of a title list (TitleList) and event list (EventList) for global events.

The title list (TitleList) is made up of the number of titles in the disc (Number), and subsequently each title information (Title#1 through Title#n).

Each title information (Title#1 through Title#n) includes a playlist table (PLTable) and a chapter list within the title (ChapterList). The playlist table (PLTable) includes the number of playlist in the title (Number) and the playlist names (Name), i.e., the filenames of the playlists.

The chapter list (ChapterList) is made up of the number of chapters included in this title (Number), and each chapter information (Chapter#1 through Chapter#n). Each chapter information (Chapter#1 through Chapter#n) has a table of cells that this chapter includes (CellTable), the cell table (CellTable) being made up of the number of cells (Number) and entry information of each cell (CellEntry#1 through CellEntry#k).

Cell entry information (CellEntry#1 through CellEntry#k) is described as the playlist name containing this cell and the cell No. Within the playlist.

The event list (EventList) has the number of global events (Number) and information of each global event (Event#1 through Event#m). What is noteworthy here is that the global event that is defined first is called a first event (FirstEvent), and is the event that is executed first when the BD-ROM is inserted into the player.

Each global event information (Event#1 through Event#m) has only the event type (Type) and ID of the event (ID).

Figure 19:
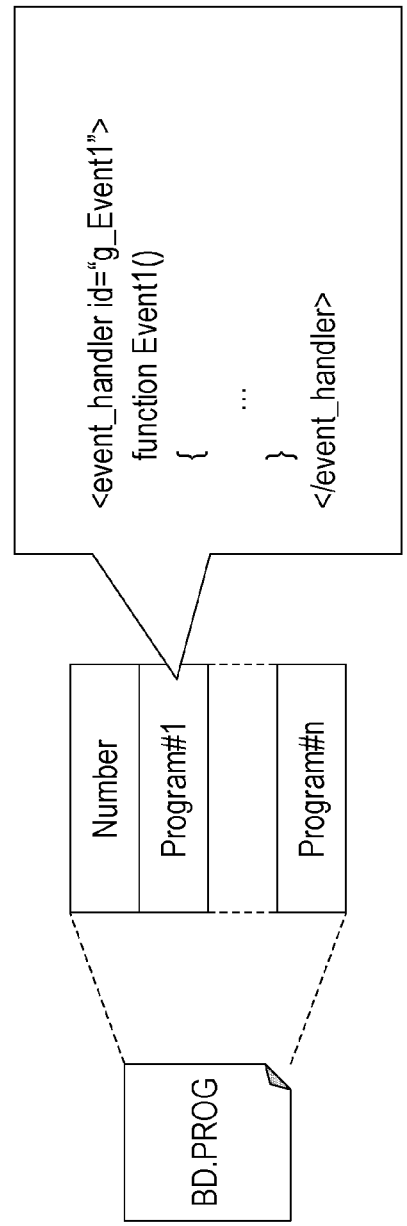
FIG. 19 is a diagram illustrating the structure of a global event handler table.

FIG. 19 is a diagram illustrating the structure of the global event handler table ("BD.PROG"). This table is the same in content as the event handler table described in FIG. 17, so description thereof will be omitted.

Mechanism of Event Occurrence

Figure 20:
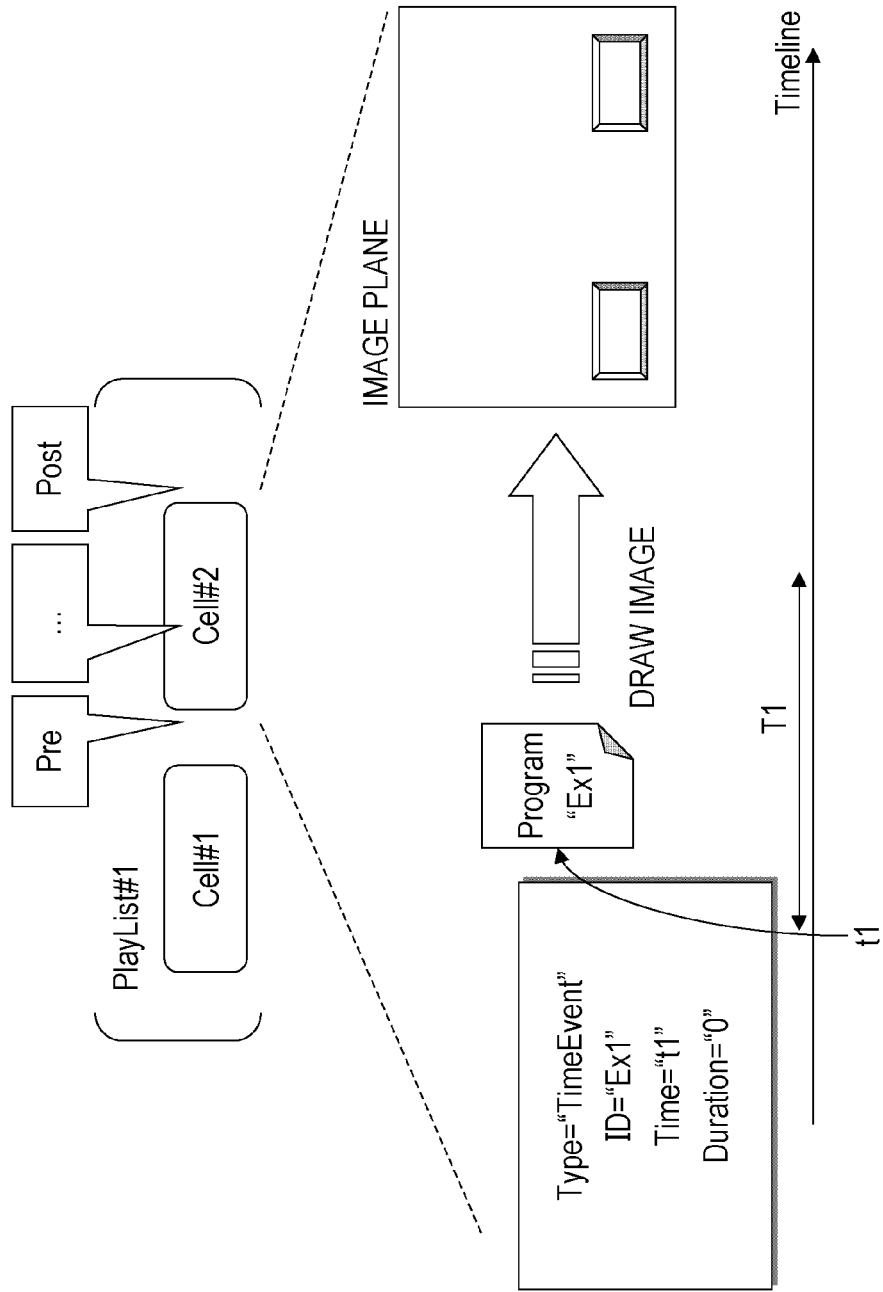
FIG. 20 is a diagram illustrating an example of a time event.

The mechanism of event occurrence will be described with reference to FIGS. 20 through 22. FIG. 20 is a diagram illustrating an example of a time event. As described above, a time event is defined by the event list (EventList) in the playlist ("XXX.PL").

In a case of an event defined as a time event, i.e., event type (Type) is "TimeEvent", at the point of the event generation time ("t1"), a time event having the ID "Ex1" is output from the scenario processor 305 to the program processor 302. The program processor 302 searches for the handler that has the ID "Ex1", and executes the relevant event handler. For example, in the case of the present embodiment, a two-button image can be drawn, or the like.

Figure 21:
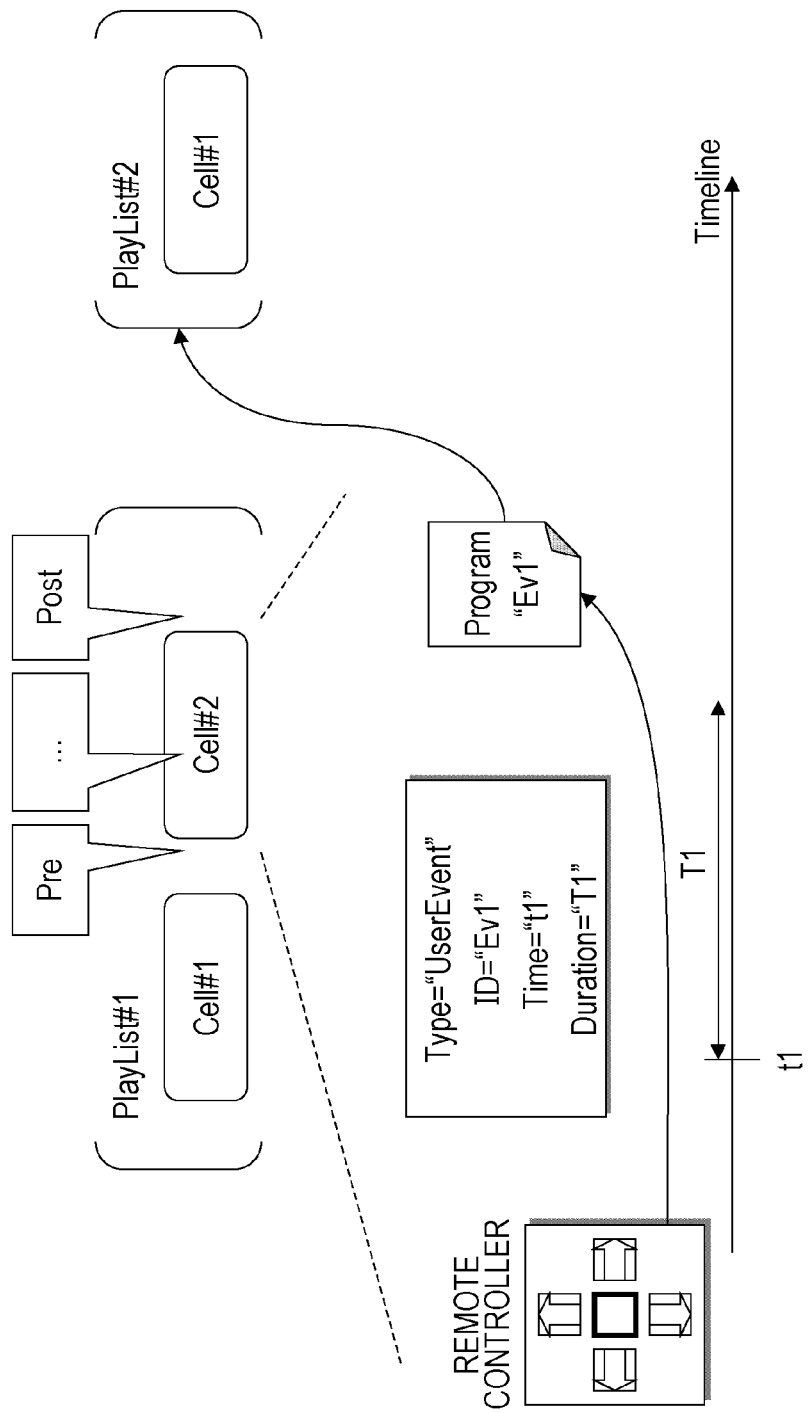
FIG. 21 is a diagram illustrating an example of a user event due to a user having operated a menu.

FIG. 21 is a diagram illustrating an example of a user event due to a user having operated a menu. As described above, a user event due to menu operations is also defined by the event list (EventList) in the playlist ("XXX.PL").

In the case of an event defined as a user event, i.e., in a case where the event type (type) is "UserEvent", this user event is ready at the point that of reaching the event generation time ("t1"). At this time, the event itself is not generated yet. This event is in a ready state during the period ("T1") described in the valid period information (Duration).

When a remote controller key "up", "down", "left", or "right", has been pressed by the user, or when the "OK" key has been pressed, first, a UO event is generated by the UO manager 303 and output to the program processor 302, as illustrated in FIG. 21.

The program processor 302 hands a UO event to the scenario processor 305, and upon receiving the UO event, the scenario processor 305 searches for whether or not a valid user event exists. In a case where there is a relevant user event as the result of the search, the scenario processor 305 generates a user event, and outputs to the program processor 302.

The program processor 302 searches for an event handler having the event ID, in the case of the example illustrated in FIG. 21 for example, "Ev1", and executes the relevant event handler. In the case of this example, playback of playlist#2 is started.

The generated user event does not include information regarding which remote controller key has been pressed by the user. The information of the remote controller key that has been selected is notified to the program processor 302 by the UO event, and is recorded and held in a register that the virtual player has. The program of the event handler can check the value of this register and execute branching processing.

Figure 22:
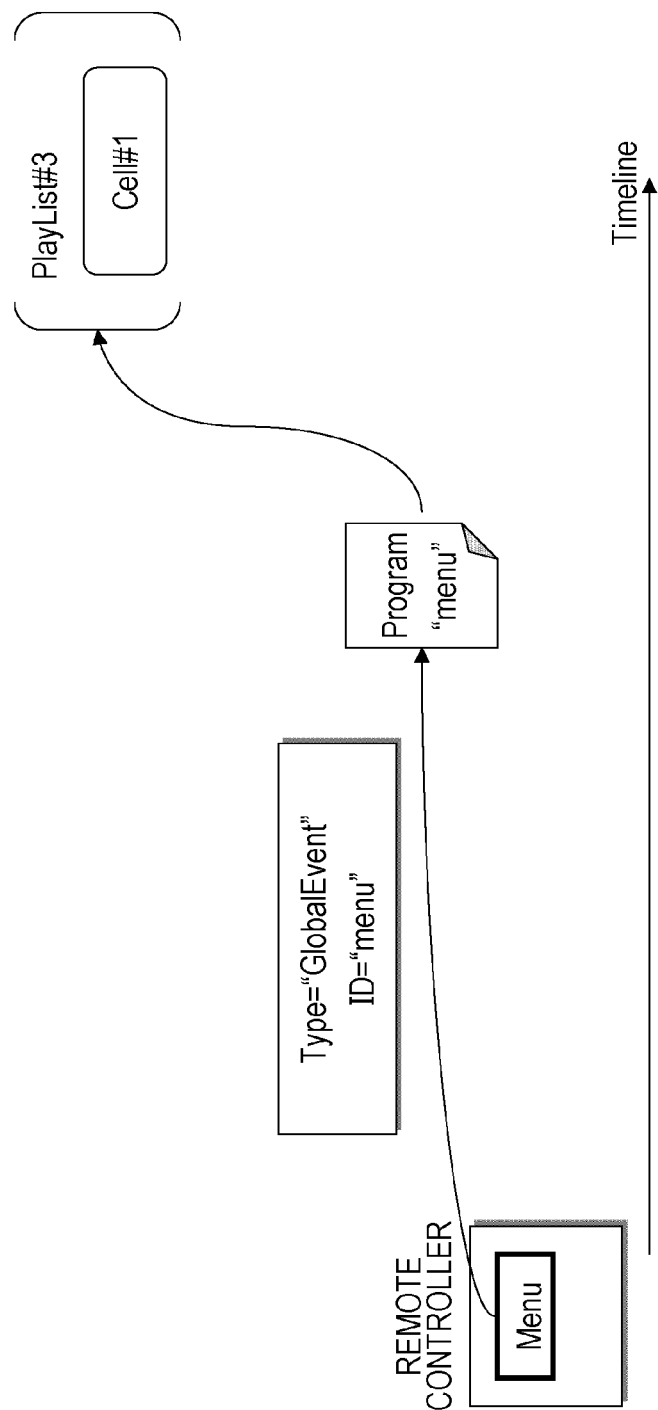
FIG. 22 is a diagram illustrating an example of a global event.

FIG. 22 is a diagram illustrating an example of a global event. As described earlier, a global event is defined in the event list (EventList) in the overall BD-ROM information ("BD.INFO"). An event defined as a global event, i.e., an event of which the event type (Type) is "GlobalEvent", is generated only in a case where the user has operated a remote controller key.

In a case where the user has pressed the menu key, first, a UO event is generated by the UO manager 303 and output to the program processor 302. The program processor 302 hands the UO event to the scenario processor 305.

The scenario processor 305 generates the relevant global event, and sends it to the program processor 302. The program processor 302 searches for an event handler having the event ID "menu", and executes this event handler. For example, in the case of the example illustrated in FIG. 22, playback of playlist#3 is started.

In the present embodiment, this is referred to simply as menu key, but there may be multiple menu keys such as on the remote controller of a player that plays DVDs. Defining an ID corresponding to each menu key enables appropriate processing to be performed as to each menu key.

Virtual Player Machine

FIG. 23 is a diagram for describing the functional configuration of the program processor 302. The functional configuration of the program processor 302 will be described with reference to FIG. 23. The program processor 302 is a processing module that has a virtual player machine inside. A virtual player machine is a function model defined as a BD-ROM, and is not dependent on the implementation of each BD-ROM player. That is to say, this guarantees that the same function can be executed in every BD-ROM player.

A virtual player machine has two major functions; programing functions and player variables. The player variables are stored and held in a register. The programming functions are based on JavaScript (registered trademark), and the following three functions are defined as BD-ROM-unique functions.

Link function: Stops the current playback, and starts playback from specified playlist, cell, and time.
    Link (PL#, Cell#, time)
    PL#: playlist name
    Cell#: cell No,
    Time: time in cell to start playback
PNG drawing function: Draws specified PNG data on image plane 209.
    Draw (File, X, Y)
    File: PNG filename
    X: X coordinate position
    Y: Y coordinate position
Image plane clear function: Clears specified region of image plane 209.
    Clear (X, Y, W, H)
    X: X coordinate position
    Y: Y coordinate position
    W: width in X direction
    H: width in Y direction The player variables include system parameters (SPRM) indicating setting values and so forth of the player, and general parameters (GPRM) usable in general uses.

FIG. 24 is a diagram illustrating a list of system parameters (SPRM).
    SPRM(0): Language code
    SPRM(1): Audio stream No,
    SPRM(2): Subtitle stream No.
    SPRM(3): Angle No.
    SPRM(4): Title No.
    SPRM(5): Chapter No,
    SPRM(6): Program No.
    SPRM(7): Cell No.
    SPRM(8): Selected key information
    SPRM(9): Navigation timer
    SPRM(10): playback time information
    SPRM(11): Mixing mode for karaoke
    SPRM(12): Country information for parental
    SPRM(13): Parental level
    SPRM(14): Player setting value (video)
    SPRM(15): Player setting value (audio)
    SPRM(16): Language code for audio stream
    SPRM(17): Language code for audio stream (extended)
    SPRM(18): Language code for subtitle stream
    SPRM(19): Language code for subtitle stream (extended)
    SPRM(20): Player region code
    SPRM(21): reserved
    SPRM(22): reserved
    SPRM(23): Playback state
    SPRM(24): reserved
    SPRM(25): reserved
    SPRM(26): reserved
    SPRM(27): reserved
    SPRM(28): reserved
    SPRM(29): reserved
    SPRM(30): reserved
    SPRM(31): reserved Note that in the present embodiment, the programing functions of the virtual player have been described as being based on JavaScript (registered trademark), Other programing functions may be used, such as B-Shell used in UNIX (registered trademark) OS or the like, Perl Script, and so forth, instead of JavaScript (registered trademark). In other words, the programing language in the present disclosure is not restricted to JavaScript (registered trademark).

Example of Program

Figure 25:
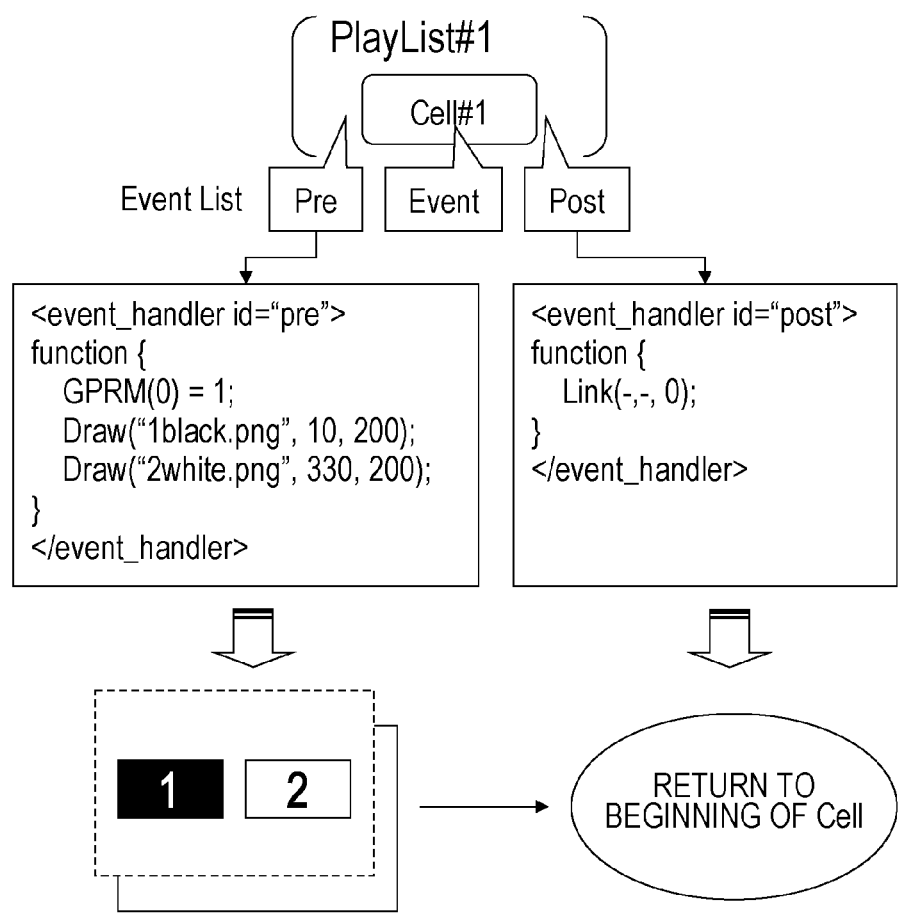
FIG. 25 is a diagram illustrating an example of a program in an event handler according to control of a menu screen having two selection buttons.
Figure 26:
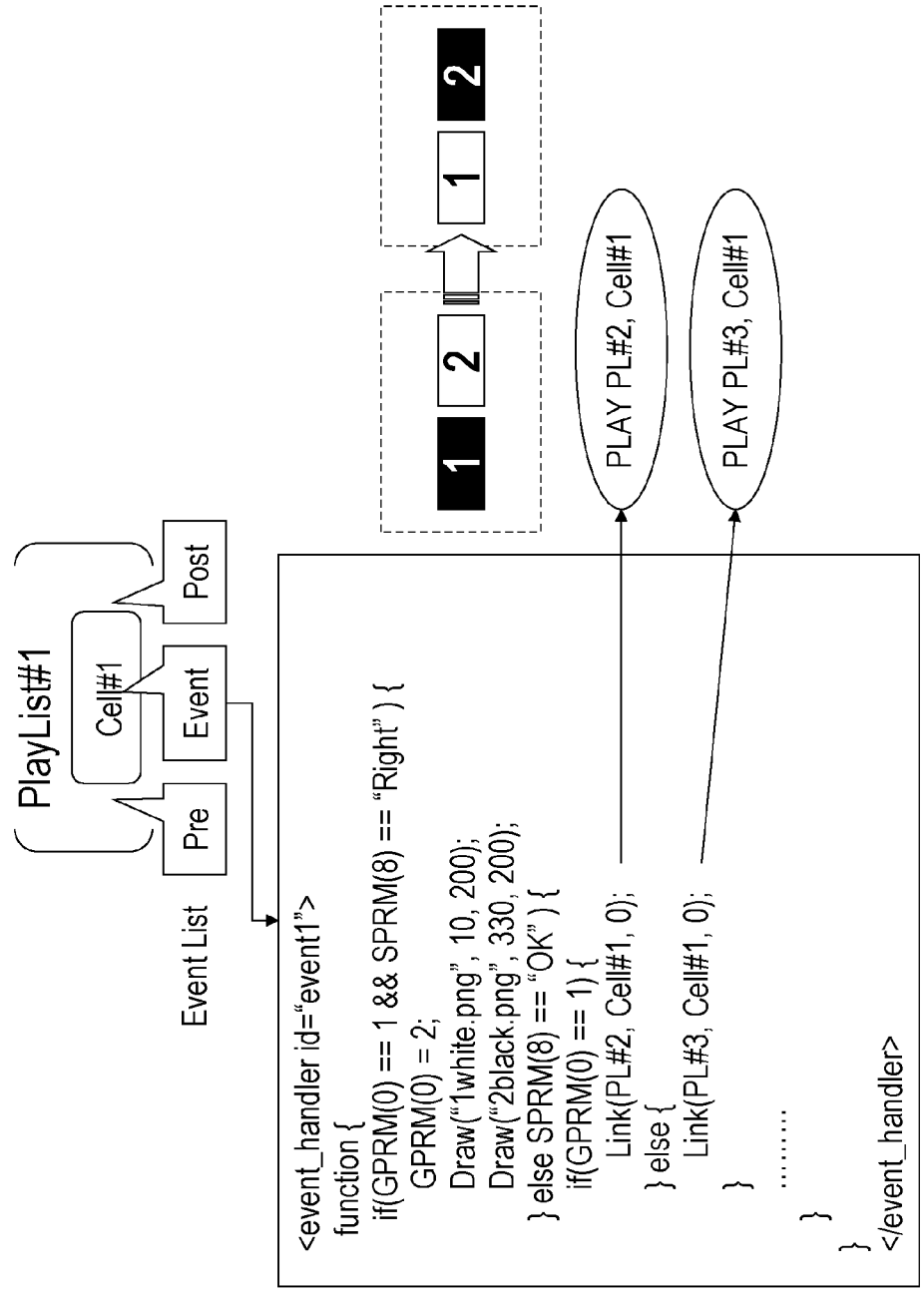
FIG. 26 is a diagram illustrating an example of a program in an event handler relating to a menu selection user event.

FIGS. 25 and 26 are diagrams illustrating an example of a program in the event handler. FIG. 25 is a diagram illustrating an example of a program in an event handler according to control of a menu screen having two selection buttons.

The program to the left side in FIG. 25 is executed using a time event at the beginning of cell (PlayList#1.Cell#1). "1" is set to GPRM(0) here first, which is one of the general parameters. GPRM(0) is used in this program to identify a button that is selected. A state where the button [1] situated on the left side has been selected is held as the initial state.

Next, drawing of a PNG is performed for each of button [1] and button [2] using "Draw", which is a drawing function. The button [1] is drawn as a PNG image "1black.png" with coordinates (10, 200) as the origin (upper left end). The button [2] is drawn as a PNG image "2white.png" with coordinates (330, 200) as the origin (upper left end).

At the end of this cell, the program to the right side in FIG. 25 is executed using a time event. A Link function is used here to instruct playing again from the beginning of this cell.

FIG. 26 is a diagram illustrating an example of a program in an event handler according to a user event for selection of a menu. In a case where any one of the remote controller keys of the "left" key, "right" key, or "OK" key has been pressed, the corresponding program is written in the event handler. In a case where the user has pressed a remote controller key, a user event is generated as described with reference to FIG. 21, and the event handler illustrated in FIG. 26 is activated.

The following branching processing is performed by this event handler, using the value of GPRM(0) identifying the selected button, and SPRM(8) identifying the selected remote controller key.

Condition 1) Case where button[1] is selected, and the selected key is "right" key
    GPRM(0) is reset to 2, and the button in the selected state is changed to the button[2] at the right. The images of each of button[1] and button[2] are rewritten.
Condition 2) Case where the selected key is "OK" key, and button[1] is selected
    Playback of playlist#2 is started.
Condition 3) Case where the selected key is "OK" key, and button[2] is selected
    Playback of playlist#3 is started.

The program illustrated in FIG. 26 is interpreted and executed as described above.

Player Processing Flow

Figure 27:
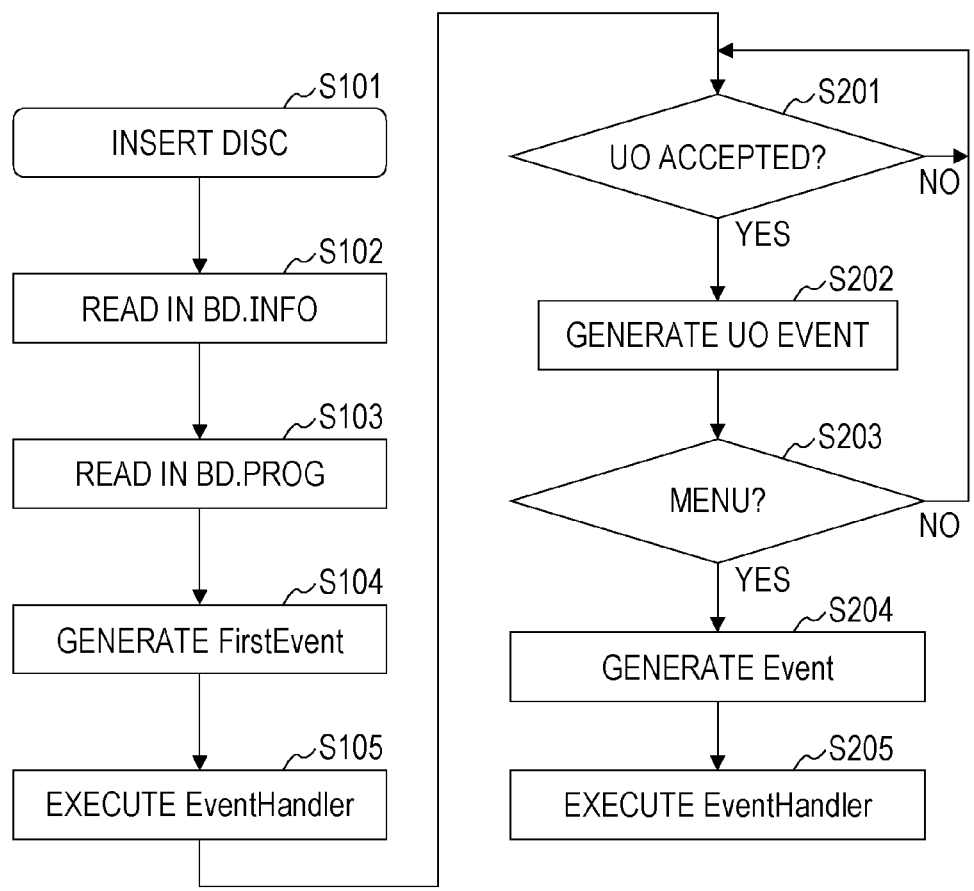
FIG. 27 is a flowchart illustrating the flow of basic processing for playback of AV data in a BD-ROM player.

The flow of processing at the player will be described with reference to FIGS. 27 through 30. FIG. 27 is a flowchart illustrating the basic flow of playback of AV data in a BD-ROM player. Upon a BD-ROM being inserted (S101), the BD-ROM player reads in and analyzes "BD.INFO" (S102), and reads in "BD.PROG" (S103). "BD.INFO" and "BD.PROG" are both temporarily stored in the management information recording memory 204, and analyzed by the scenario processor 305.

Next, the scenario processor 305 generates the first event, in accordance with the first event (FirstEvent) information in the "BD.INFO" file (S104). The generated first event is received by the program processor 302, which executes the event handler corresponding to this event (3105).

It is expected that the event handler corresponding to the first event will have recorded therein information specifying a playlist to play first. If no playlist to play first is instructed, the player has nothing to play, and simply awaits a user event to accept (No in S201).

Upon receiving a remote controller operation from the user (Yes in S201), the UO manager 303 generates a UO event for the program processor 302 (S202).

The program processor 302 determines whether or not the UO event is due to the menu key (S203), and in the case of the menu key (Yes in S203), hands the UO event to the scenario processor 305, and the scenario processor 305 generates a user event (S204). The program processor 302 executes the event handler corresponding to the generated user event (S205).

Figure 28:
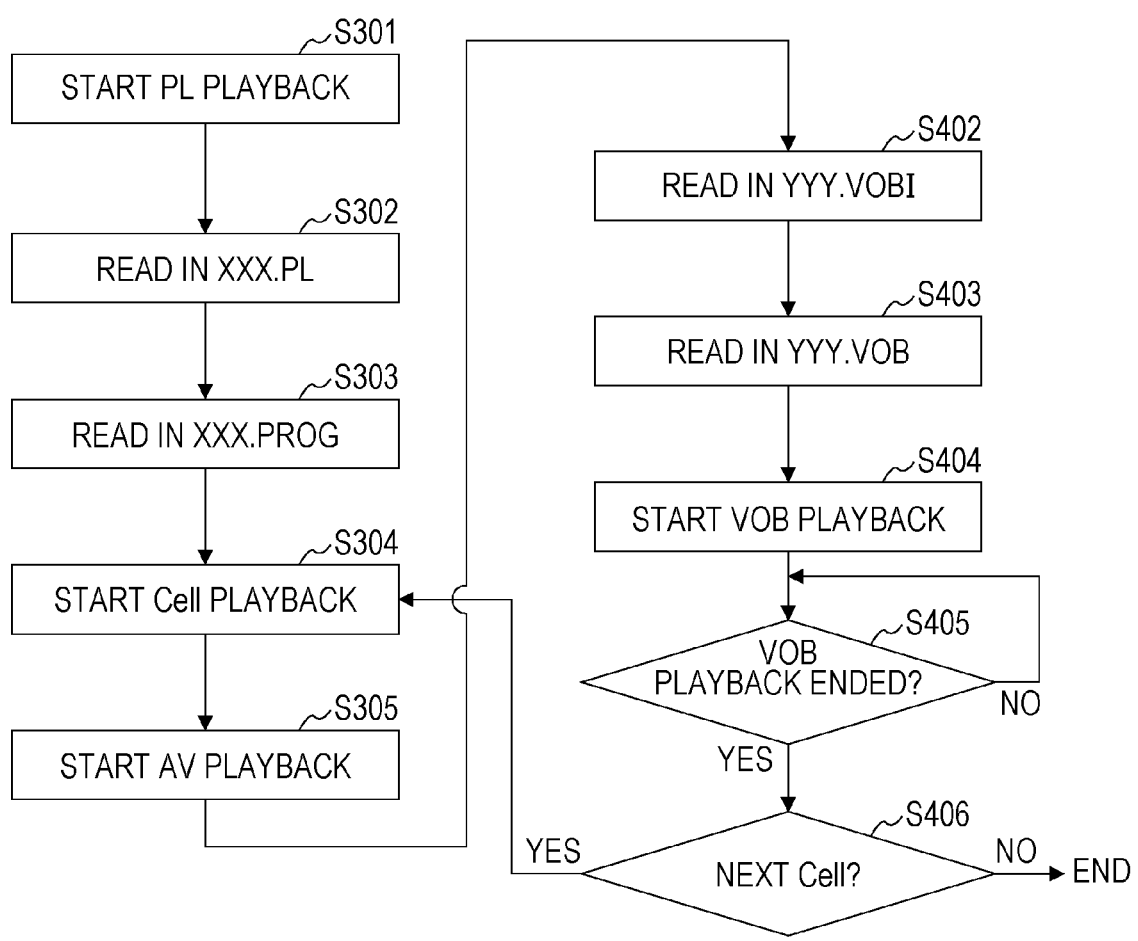
FIG. 28 is a flowchart illustrating the flow of processing in a BD-ROM player from starting to play a playlist until ending playing of the VOB.

FIG. 28 is a flowchart illustrating the flow of processing in a BD-ROM player from starting to play a playlist until ending the VOB. As described earlier, playback of a playlist is started by the first event handler or global event handler (S301). The scenario processor 305 reads in and analyzes the playlist "XXX.PL" as necessary information to play a playlist that is the object of playback (S302), and reads in the program information "XXX.PROG" corresponding to the playlist (S303).

Next, the scenario processor 305 starts playback of the cell, based on the cell information registered in the playlist (S304). Cell playback means that a request is issued from the scenario processor to the presentation controller 306, and the presentation controller 306 starts AV data playback (S305).

Once playback of AV data is started, the presentation controller 306 reads in the VOB information file "YYY.VOBI" corresponding to the cell being played (S402) and analyzes it. The presentation controller 306 identifies the VOBU for which to start playback and the address thereof, using the time map, and instructs the drive controller 317 of the readout address. The drive controller 317 reads out the relevant VOB data "YYY.VOB" (S403).

The VOB data that has been read out is sent to the decoder, and playback is started (S404). VOB playback is continued until the playback section of this VOB ends (S405), and upon ending, if there is a next cell (Yes in S406), transitions to playback of Cell (S304). In a case where there is no next cell (No in S406), the processing relating to playback ends.

Figure 29A:
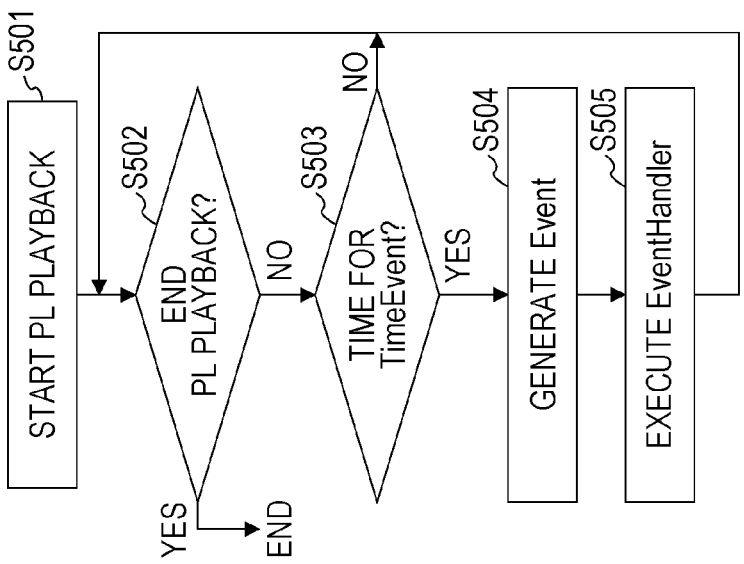
FIGS. 29A and 29B are flowcharts, FIG. 29A illustrating the flow of processing relating to a time event in a BD-ROM player, and FIG. 29B illustrating the flow of processing relating to a user event in a BD-ROM player.
Figure 29B:
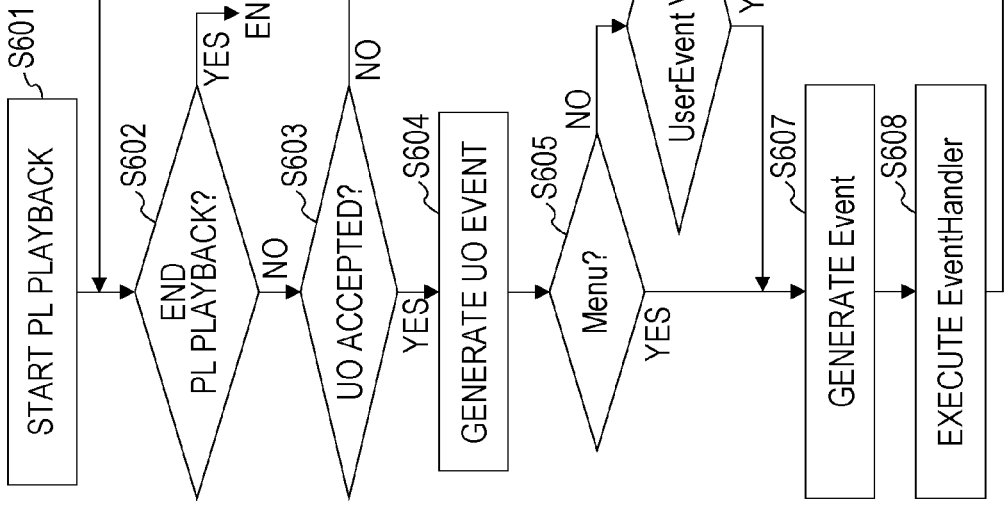

FIGS. 29A and 29B are flowcharts illustrating the flow of event processing from after having started AV data playback. FIG. 29A is a flowchart illustrating the flow of processing relating to a time event in a BD-ROM player.

Note that the BD-ROM player is an event-driven player model. When playback of a playlist is started, the time event related, user event related, and subtitle display related event processing processes are each activated, and event processing is executed in parallel.

When playback of playlist playback is started at the BD-ROM player (S501), confirmation is made that playlist playback has not ended (S502), and the scenario processor 305 confirms whether the time event generation time has arrived (S503).

In a case where the time event generation time has arrived (Yes in S503), the scenario processor 305 generates a time event (S504). The program processor 302 receives the time event, and executes the event handler (S505).

In a case where the time event generation time has not arrived (No in S503), and in a case where execution of the event handler has ended, the processing after confirmation of end of the playlist playback (S502) is repeated.

In a case where confirmation is made that the playlist playback has ended (Yes in S502), the time event related processing is force-quit.

FIG. 29B is a flowchart illustrating the flow of processing relating to a user event in a BD-ROM player. When playback of playlist playback is started at the BD-ROM player (S601), confirmation is made that playlist playback has not ended (No in S602), and the UO manager 303 confirms whether a UO has been accepted.

In a case where there has been a UO accepted (Yes in S603), the UO manager 303 generates a UO event (S604). The program processor 302 accepts the UO event, and confirms whether the UO event is a menu call or not.

In the case of a menu call (Yes in S605), the program processor 302 causes the scenario processor 305 to generate an event (S607), and the program processor 302 executes the event handler (S608).

On the other hand, in a case where determination is made that the UO event is not a menu call (No in S605), this means that the UO event is an event due to a cursor key or the "OK" key. In this case, the scenario processor 305 determines whether or not the current time is within the valid period of the user event. If within the valid period (Yes in S606) the scenario processor 305 generates a user event (S607), and the program processor 302 executes the relevant event handler (S608).

In a case where there is no UO accepted (No in S603), the current time is not within the valid period of the user event (No in S606), or the execution of the event handler has ended, the processing following confirmation of the end of the playlist playback (S602) is repeated.

Upon confirmation of the end of the playlist playback (Yes in S602), the user event related processing is force-quit.

Figure 30:
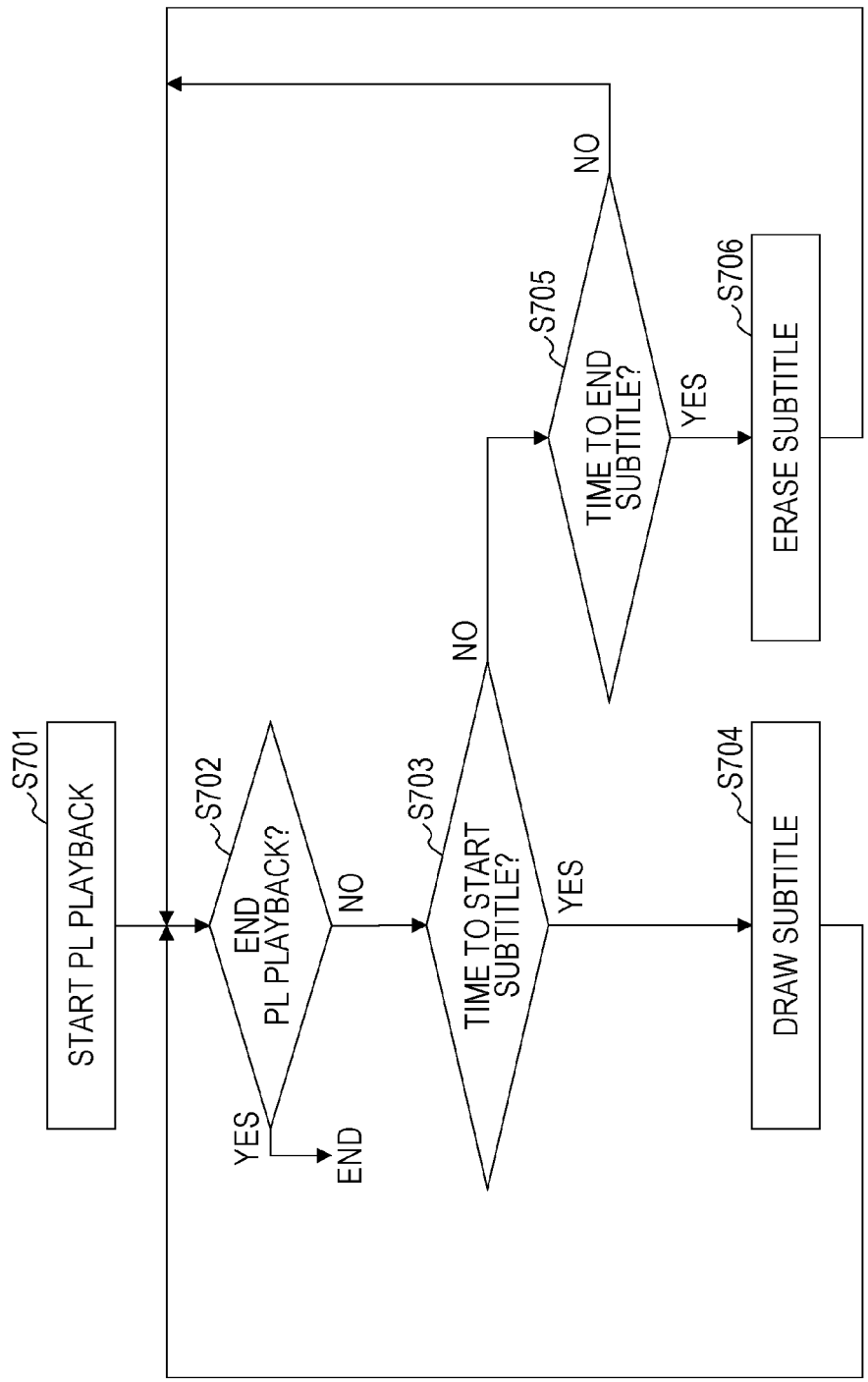
FIG. 30 is a flowchart illustrating the flow of processing subtitle data in a BD-ROM player.

FIG. 30 is a flowchart illustrating the flow of processing of subtitle data in the BD-ROM player. When playback of playlist playback is started at the BD-ROM player (S701), confirmation is made that playlist playback has not ended (No in S702), and the scenario processor 305 confirms whether the subtitle display start time has arrived or not. In a case where the subtitle display start time has arrived (Yes in S703), the scenario processor 305 instructs the presentation controller 306 to draw the subtitle, and the presentation controller 306 instructs the image processor 311 to draw the subtitle. The image processor 311 follows the instruction to draw the subtitle on the image plane 209 (S704).

Also, in a case where the subtitle display start time has not arrived (No in S703), confirmation is made whether the subtitle display end time has arrived. In a case where the subtitle display end time has arrived (Yes in S705), the presentation controller 306 instructs the image processor 311 to erase the subtitle.

The image processor 311 erases the subtitle that has been drawn, in accordance with the instruction (S706).

In a case where the subtitle drawing by the image processor 311 (S704) has ended, a case where erasing of the subtitle by the image processor 311 (S706) has ended, and a case where determination is made that the subtitle display end time has not arrived (No in S705), the processing following configuration of end of the playlist playback (S702) is repeated.

Also, upon confirmation of the end of the playlist playback (Yes in S702), the subtitle related processing is force-quit.

According to the above operations, the BD-ROM player performs basic processing relating to BD-ROM playback based on user instructions or the BD management information recorded in the BD-ROM, and so forth.

Second Embodiment

Next, a second embodiment of the present disclosure will be described. The second embodiment is content relating to recording or playing high-luminance (HDR: High Dynamic Range) video information with a BD. The second embodiment is basically based on the first embodiment, so the following description will be made primarily with regard to portions that are expanded in the second embodiment or portions that are different.

Figure 31A:
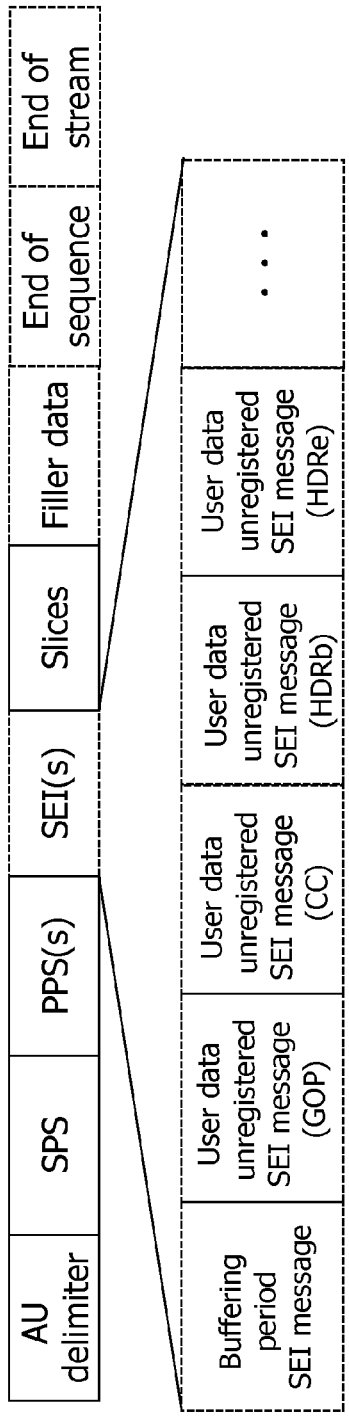
FIGS. 31A and 31B are diagrams describing the arrays of NAL units.
Figure 31B:
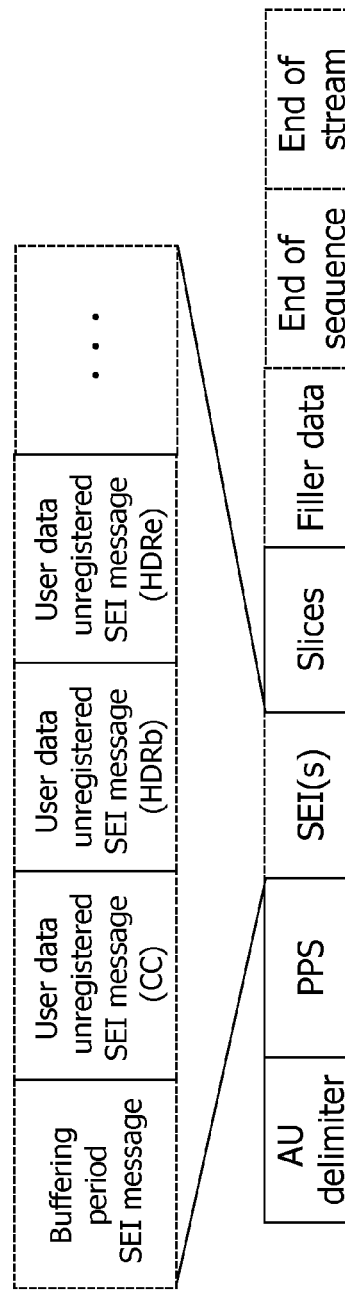

FIGS. 31A and 31B illustrate a method of sending high-luminance metadata using a video encoding format such as MPEG-4 AVC (also known as H264) or HEVC (also known as H265). Here, a unit made up of a picture reference configuration equivalent to a Group Of Pictures (GOP) used to improve random accessibility in MPEG-2 Video is used as a GOP in MPEG-4 AVC or HEVC, thereby encoding multiple pictures that have been grouped.

FIG. 31A indicates the encoding order of multiple Network Abstraction Layer (NAL) units in the first picture (first access unit) in the GOP. In the first picture in the GOP, there is a run of NALs of each of one AU delimiter, one SPS, one or more PPS, 0 or multiple SEI messages, and one or more Slices making up the picture, followed if necessary by the NALs of Filler data, End of sequence, and End of stream.

In the SEI message (SEI(s)), Buffering period SEI message is followed by several other SEI messages if necessary. For example, several SEI messages including (1) a User data unregistered SEI message (GOP) indicating the reference relationship of pictures within this GOP, (2) a User data unregistered SEI message (CC) indicating the Closed Captioning information of this picture, (3) a User data unregistered SEI message (HDRb) including standard and static high-luminance metadata indicating the luminesce range such as the maximum luminance or minimum luminance in all of the pictures in this video sequence (VOB), (4) a User data unregistered SEI message (HDRe) including dynamic high-luminance metadata that is more detailed than the SEI message (HDRb), so as to indicate the luminesce range such as the maximum luminance or minimum luminance in all of the pictures in this picture or GOP, and so forth, are encoded in this order.

The aforementioned SEI message (HDRb) or SEI message (HDRe) is transmitted along with the video information. This is to transmit information relating to luminesce used at the time of mastering, and to give information regarding actually what level of brightness ($cd/m^2$) the luminesce value (Y) for each pixel obtained after the video information is decoded.

For example, the SEI message (HDRb) or SEI message (HDRe) include correlation information between luminance that the pixels have and luminesce at the time of mastering, such as, upon having decoded the video, the luminance of a pixel having a luminesce value (Y) or 1000 was 5000 $cd/m^2$ when mastering. In a case where the maximum luminance ($cd/m^2$) that can be expressed by a TV connected to the player is acquired, information for changing the dynamic range of the entire picture in the luminesce direction may be carried by the aforementioned SEI message (HDRb) or SEI message (HDRe).

The SEI message (HDRb) is an SEI message transmitted in increments of pictures or increments of GOPs to indicate an HDR video sequence, and transmits information relating to static luminance information of the overall video sequence (VOB). An HDR video sequence as used here means a video sequence where a SEI message (HDRb) is recorded.

The SEI message (HDRe) that transmits information relating to dynamic luminesce that is more detailed does not have to be recorded in the HDR video sequence, and an HDR video sequence does not have to have even one therein. In a case where an SEI message (HDRe) exists, it is always an SEI message encoded immediately after an SEI message (HDRb), transmitting information relating to luminance in increments of pictures or increments of GOPs.

FIG. 31B illustrates the encoding order of multiple NAL units in a picture other than the first picture in the GOP (non-first access unit). In a picture that is not the first picture in the GOP, There is a run of NALs of each of one AU delimiter, 0 or one PPS, 0 or multiple SEI messages, and one or more Slices making up the picture, followed if necessary by the NALs of Filler data, End of sequence, and End of stream.

The SEI message (HDRb) or SEI message (HDRe) each store the above information, and is given to each picture according to the method illustrated in this FIGS. 31A and 31B. In a case of transmitting information relating to luminesce in increments of GOPs, the SEI message (HDRb) and SEI message (HDRe) are both only given to the first picture in the GOP, and are not given to pictures that are not the first in the GOP at all.

Figure 32:
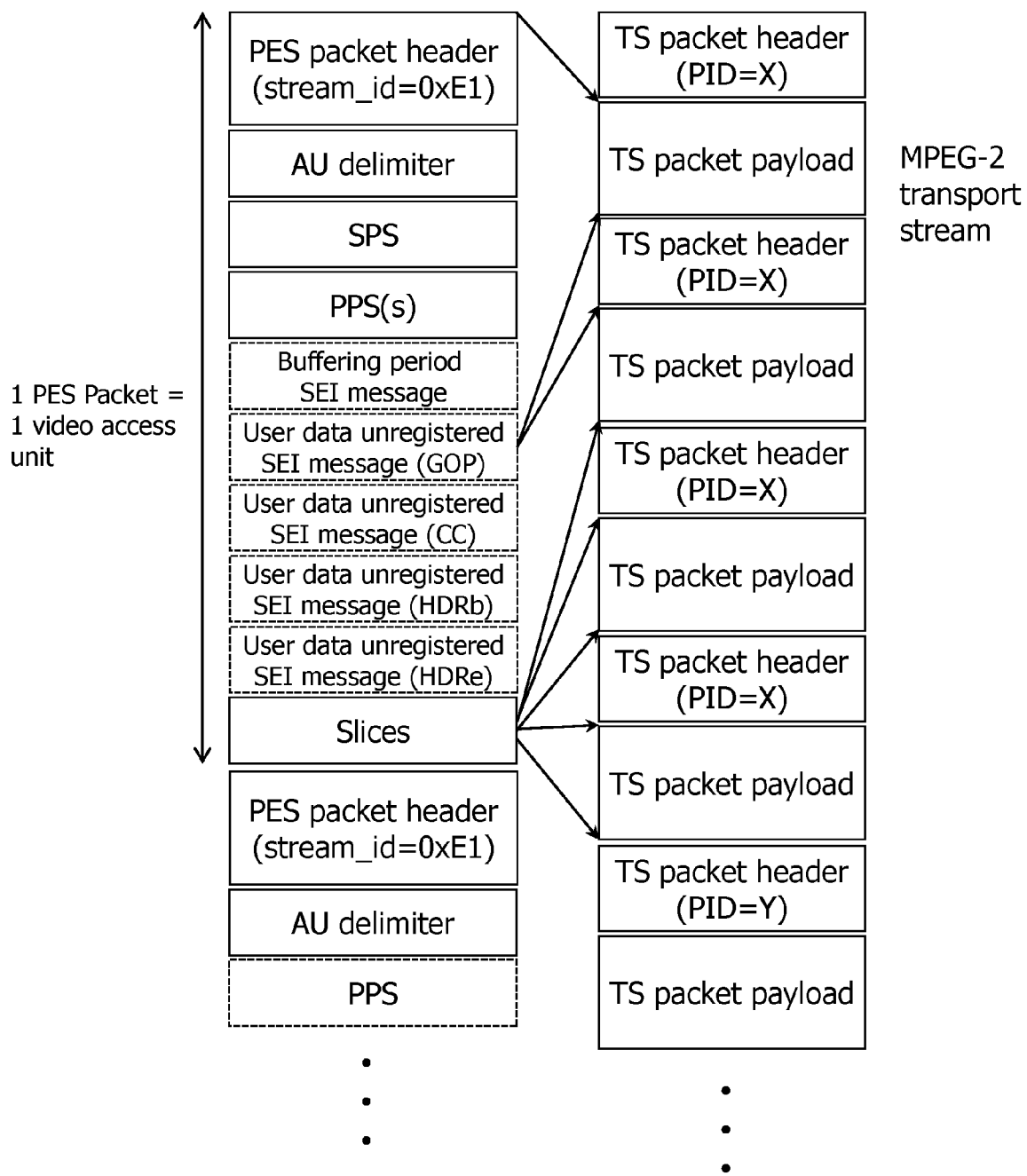
FIG. 32 is a diagram for describing an example of MPEG-2 TS multiplexing of an HDR video stream.

FIG. 32 is a diagram illustrating a method of multiplexing an HDR stream including up to an SEI message (HDRe) by MPEG-2 TS. Note that in the present embodiment, the term sequence may mean the same as a stream, or may be part of a stream. After storing one picture (one frame or one video access unit) in one packetized elementary stream (PES) packet to put the HDR video stream into a PES, data in the PES packets are divided and stored in order in the payload of packet identifier (PID)=X TS packets.

In the case of the method illustrated in FIG. 32, the HDR video sequence including up to the SEI message (HDRe) which is the PES packets of stream_id=0xE1 is divided and stored in order in the TS packets of the same PID (PID=X). Note that in a case of transmitting information of the SEI message (HDRe) at the time of outputting an HDR video sequence by HDMI (registered copyright) as in the method illustrated in FIG. 32, there are cases where the processing for searching for the SEI message (HDRe) from the entire video sequence may become sluggish.

Figure 33:
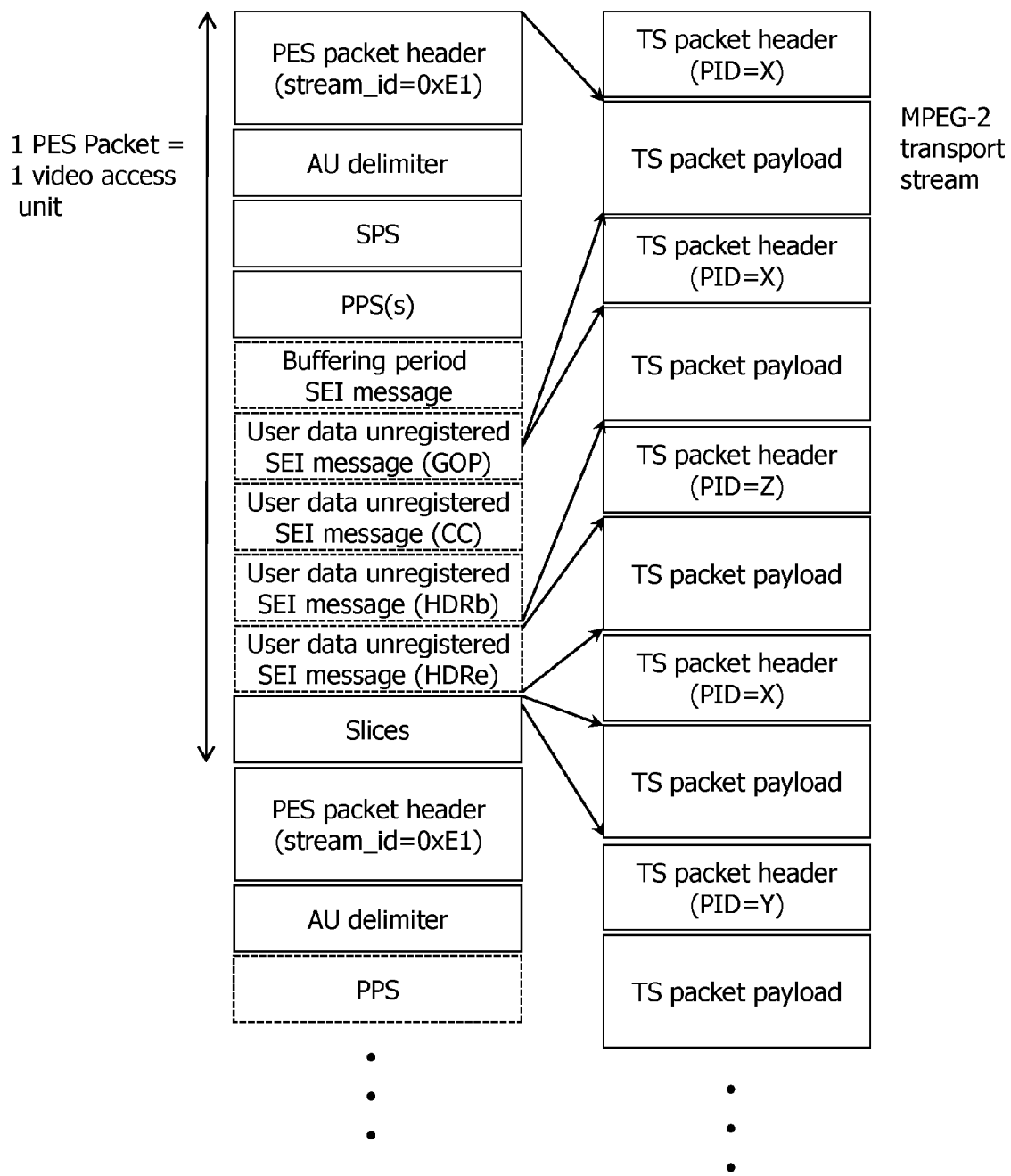
FIG. 33 is a diagram for describing an example of MPEG-2 TS multiplexing of an HDR video stream.

FIG. 33 is a diagram for describing another method for multiplexing an HDR video stream including up to an SEI message (HDRe) by MPEG-2 TS. One picture (one frame or one video access unit) is stored in one PES packet, to put the HDR video stream into a PES, and data in the PES packets is divided and stored in order in the payloads of the TS packets of both PID=X and Z.

In the case of the method illustrated in FIG. 33, the HDR video sequence which is the PES packets of stream_id=0xE1 is divided and stored in order in the TS packets of PID=X, and just the SEI message (HDRe) is stored alone in the TS packet of PID=Z. When the SEI message (HDRe) information is transmitted at the time of outputting HDR video by HDMI (registered trademark), only the SEI message (HDRe) is stored in the TS packet where PID=Z, as in the method illustrated in FIG. 33. Accordingly, the processing for searching for the SEI message (HDRe) is light.

Decoding just the HDR video sequence transmitted by TS packets of PID=X is easy. However, in order to perform even higher luminance video playback including up to the SEI message (HDRe) needs additional processing of transmitting the TS packets of both PID=X and Z to the same transport buffer (TB, an upstream buffer used in the T-STD model of the MPEG-2 system).

Figure 34:
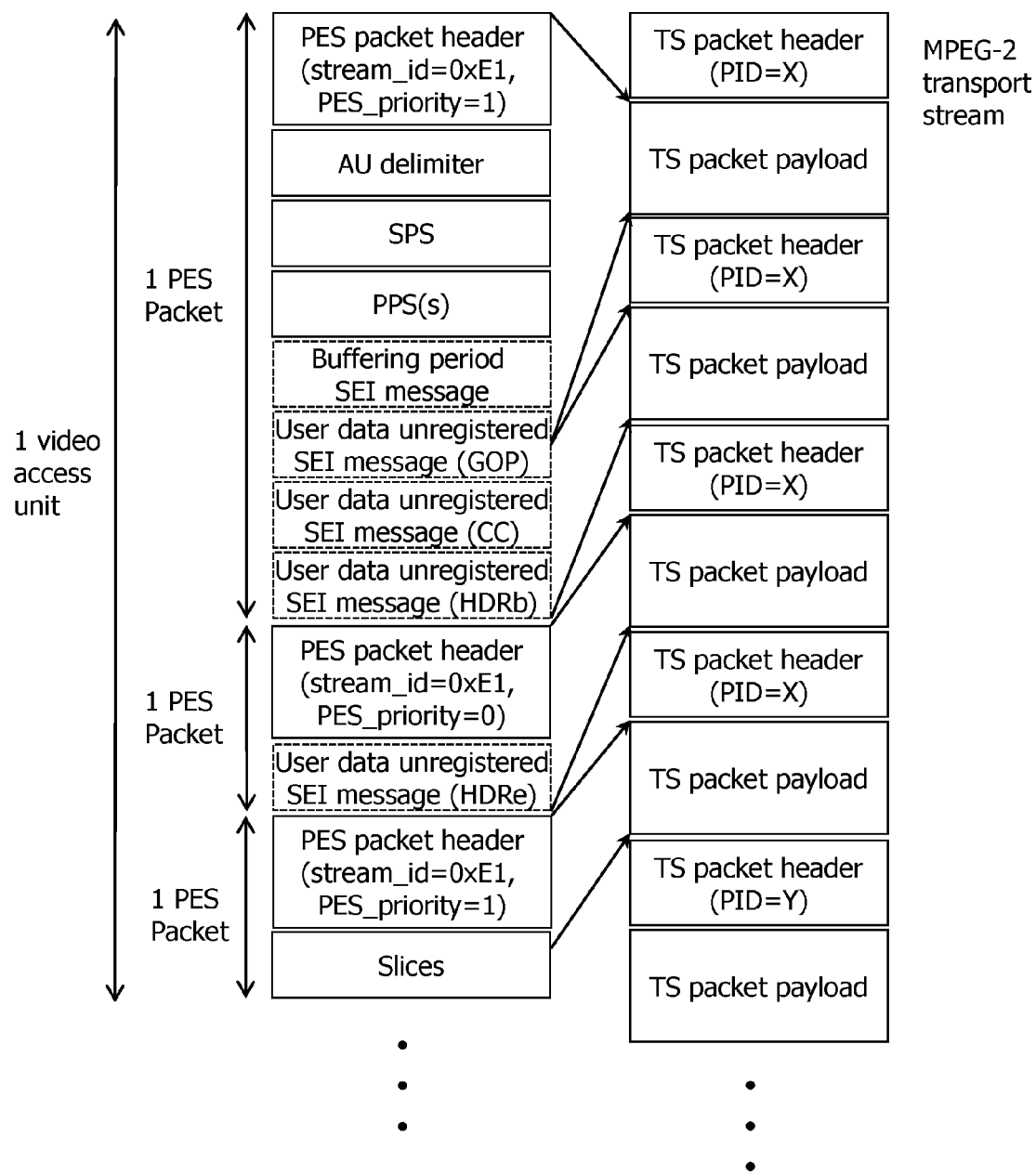
FIG. 34 is a diagram for describing an example of MPEG-2 TS multiplexing of an HDR video stream.

FIG. 34 is a diagram for describing another method for multiplexing an HDR video stream including up to an SEI message (HDRe) by MPEG-2 TS. One picture (one frame or one video access unit) is divided and stored in each of three PES packets, to put the video stream into a PES. Thereafter, each of the three PES packets are divided as necessary, and stored in order in the payload of the TS packets of PID=X.

In the case of the method illustrated in FIG. 34, the HDR video sequence which is two PES packets of stream_id=0xE1 is stored in the TS packets of PID=X. Just the SEI message (HDRe) is stored alone in a TS packet of the same PID=X in the same stream_id=0xE1 but as a PES packet where PES_priority=0.

At the time of outputting HDR video by HDMI (registered trademark), upon the information of the SEI message (HDRe) being transmitted according to the method illustrated in FIG. 34, the PES packet where stream_id=0xE1 and PES_priority=0 is searched from each TS packet of PID=X. Accordingly, the processing for searching for the SEI message (HDRe) is not as light as the method illustrated in FIG. 33.

However, there is little difference between decoding just the HDR video sequence transmitted by TS packets of PID=X and decoding not only the HDR video sequence but the SEI message (HDRe) included as well, so the method illustrated in FIG. 34 is realizable.

Note that the PES_priority value does not have to be this combination; the same effect can be yielded by an arrangement where only the PES packet storing the SEI message (HDRe) has a value of PES_priority=1.

Figure 35:
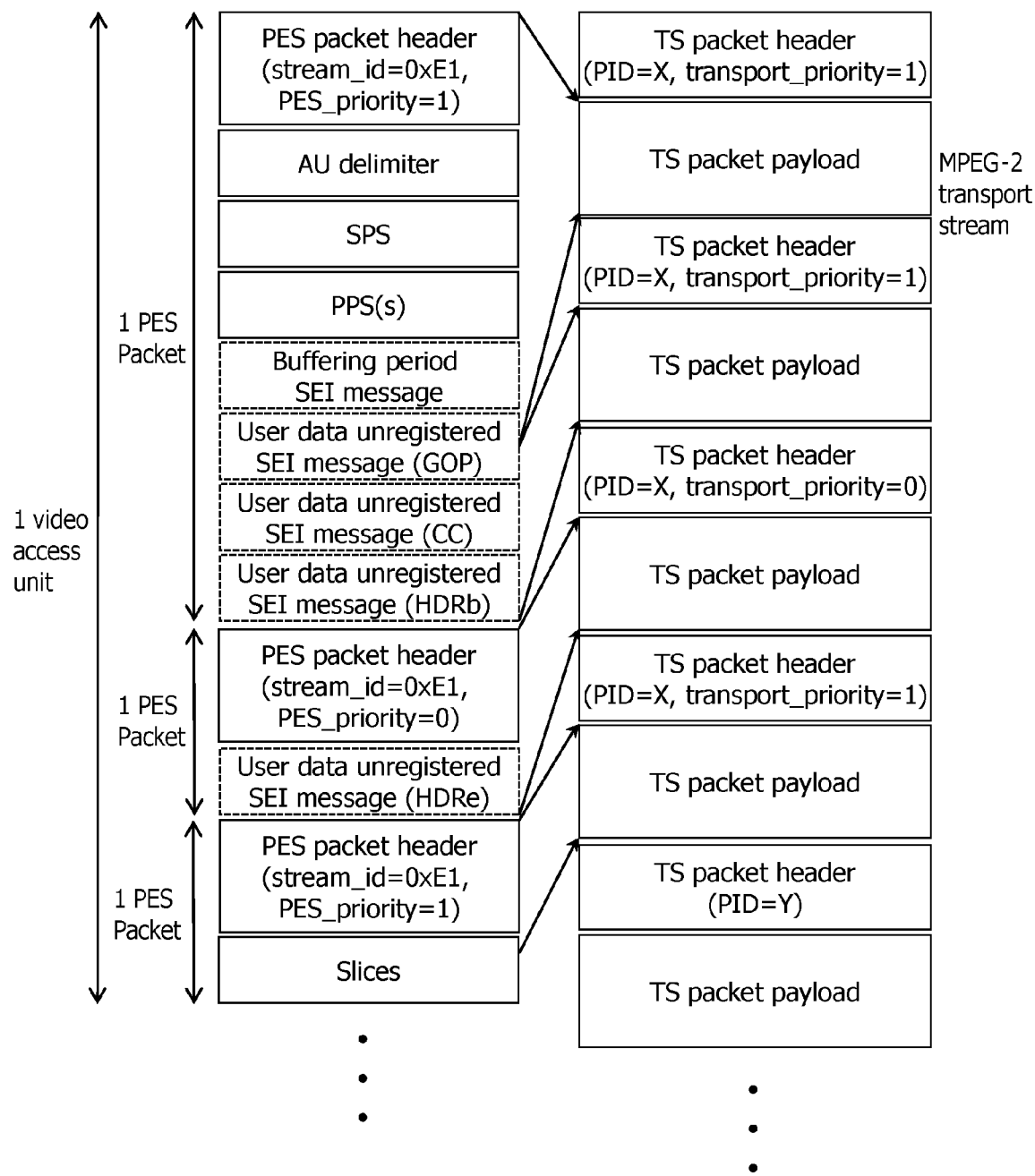
FIG. 35 is a diagram for describing an example of MPEG-2 TS multiplexing of an HDR video stream.

FIG. 35 is a diagram for describing another method for multiplexing an HDR stream including up to an SEI message (HDRe) by MPEG-2 TS. The difference as to the method illustrated in FIG. 34 is that the transport_priority of the TS packet storing the PES packet containing the SEI message (HDRe) is 0 in the method illustrated in FIG. 35.

At the time of outputting HDR video by HDMI (registered trademark), upon the information of the SEI message (HDRe) being transmitted according to the method illustrated in FIG. 35, the SEI message (HDRe) is analyzed from the TS packet where PID=X and transport_priority=0. Accordingly, the amount of processing to search for the SEI message (HDRe) is light in the same way as the method illustrated in FIG. 33, so the method illustrated in FIG. 35 is realizable.

Also, in this case, there is little difference between decoding just the HDR video sequence and decoding not only the HDR video sequence but also the SEI message (HDRe) included as well, so the method illustrated in FIG. 35 is realizable. For example, the PID demultiplexer of the TS decoder separates the stream based on the transport_priority value. Accordingly, a decoder that is not compatible with SEI message (HDRe) and makes the video high-luminance using information up to the SEI message (HDRb) can easily discard the TS packet including the SEI message (HDRe) by the aforementioned PID demultiplexer.

Note that the transport_priority value does not have to be this combination; the same effect can be yielded by an arrangement where only the TS packet storing the SEI message (HDRe) has a value of transport_priority=1.

Figure 36:
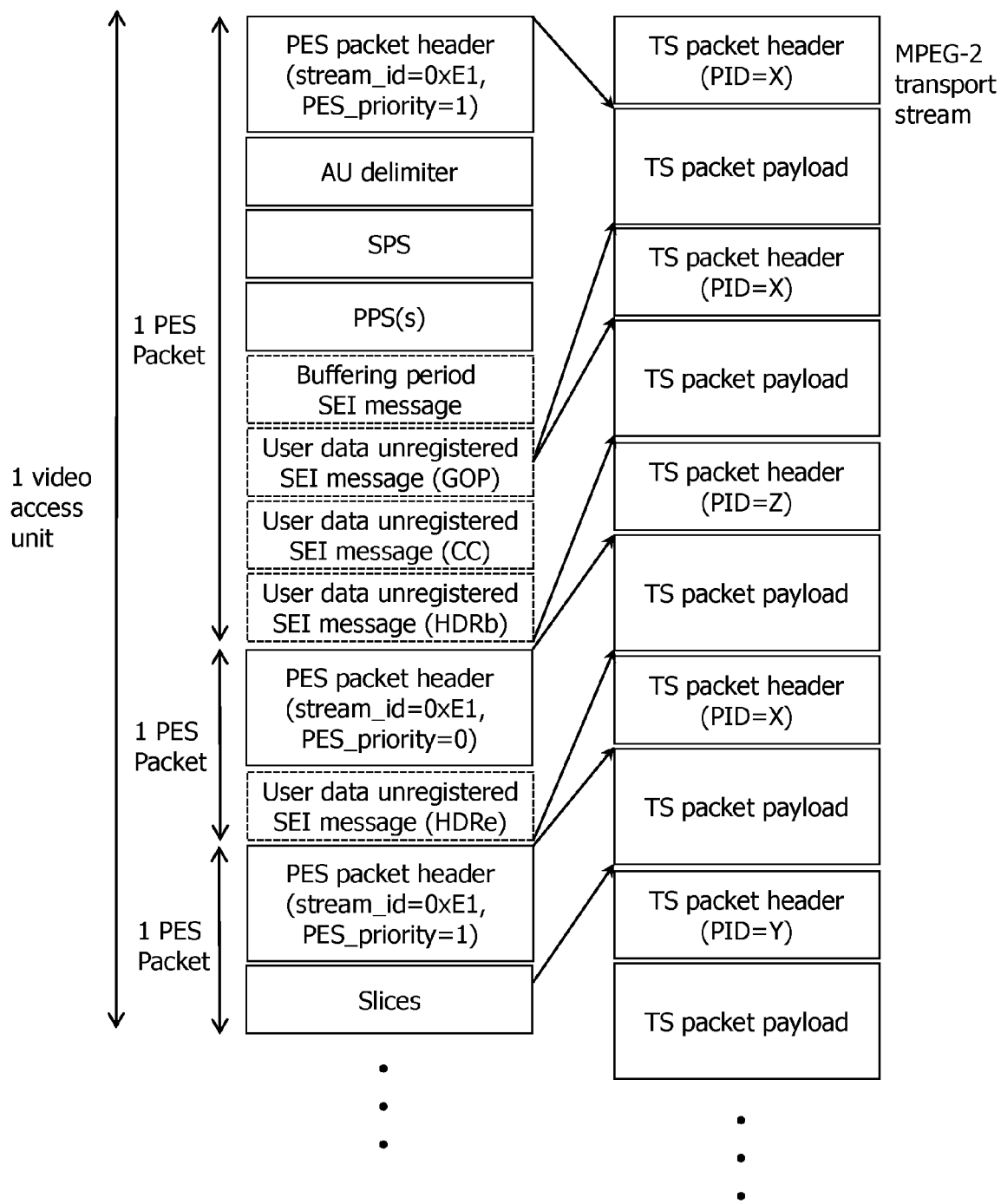
FIG. 36 is a diagram for describing an example of MPEG-2 TS multiplexing of an HDR video stream.

FIG. 36 is a diagram for describing another method for multiplexing an HDR stream including up to an SEI message (HDRe) by MPEG-2 TS. The method illustrated in FIG. 36 uses two types of PID as in the method illustrated in FIG. 33, and configures the PES packets as in the method illustrated in FIGS. 34 and 35. This method illustrated in FIG. 36 has both the same advantages and disadvantages as the method illustrated in FIG. 33.

Figure 37:
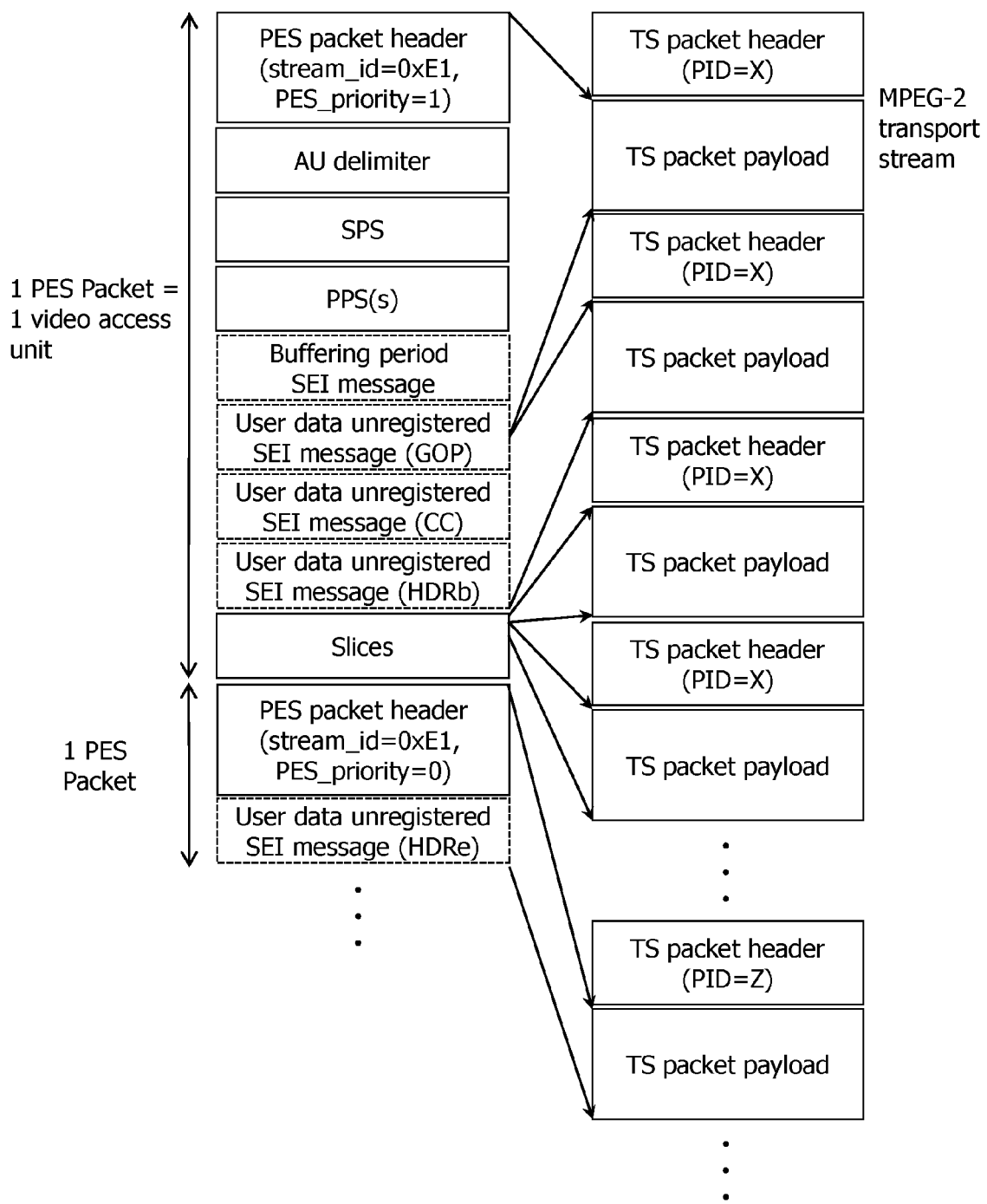
FIG. 37 is a diagram for describing an example of MPEG-2 TS multiplexing of an HDR video stream.

FIG. 37 is a diagram for describing another method for multiplexing an HDR stream including up to an SEI message (HDRe) by MPEG-2 TS. The method illustrated in FIG. 37 stores the SEI message (HDRe) in a PES packet where PES_priority=0, which is a separate PES packet from the PES packet storing the SEI message (HDRb) and so forth. After storing of the slice NAL units, the PES packet where PES_priority=0 is multiplexed at another TS packet where PID=Z, separate from the TS packet where PID=X. The position of multiplexing of the SEI message (HDRe) is immediately after the picture data. Accordingly, the method illustrated in FIG. 37 stores the HDR video sequence up to the SEI message (HDRb) in one RES packet. Other than this point, the method illustrated in FIG. 37 has both the same advantages and disadvantages as the method illustrated in FIG. 33.

Figure 38:
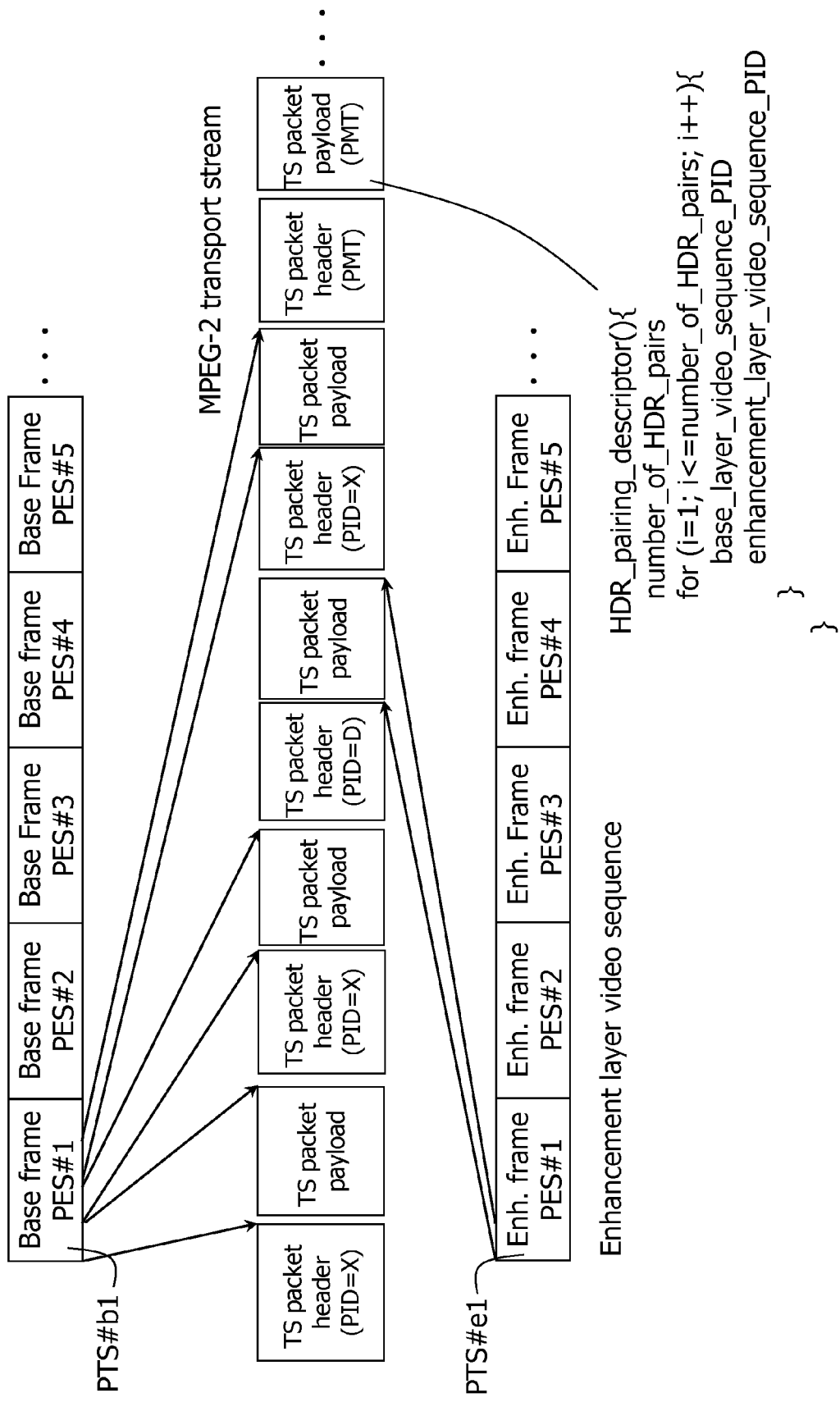
FIG. 38 is a diagram for describing an example of MPEG-2 TS multiplexing of an HDR video stream.

FIG. 38 is a diagram for describing a method for multiplexing an enhanced video sequence, which is a different video sequence from an HDR video sequence, by MPEG-2 TS, instead of an SEI message (HDRe). The method illustrated in FIG. 38 transmits an enhanced video sequence (Enhancement layer video sequence) as enhancement video information regarding an HDR video sequence (Base layer video sequence with user data unregistered SEI message (HDRb)), instead of transmitting high-luminance enhancement metadata by SEI message (HDRe).

For example, an enhanced picture of Enhancement frame PES#n included in the enhanced video sequence is added to the base picture of Base frame PES#n included in the above-described video sequence. Accordingly, high-luminance enhancement of the HDE video sequence can be performed more accurately while using even more data than the SEI message. Now, corresponding pictures may be correlated with each other by having the same PTS. For example, correlation indicating that "PTS#b1 of base picture"="PTS#e1 of enhanced picture" is illustrated.

The above-described base video sequence and enhanced video sequence are multiplied in the MPEG-2 TS as two entirely different video sequences in PES packets with different PIDs.

In order to correctly specify the pair of the base video sequence and enhanced video sequence, the program map table (PMT) packet may express the pair using descriptor( ). For example, this method illustrated in FIG. 38 describes HDR_pairing_descriptor( ) in the PMT packet. The HDR_pairing_descriptor( ) contains the number of pairs in this MPEG-2 TS (number_of_HDR_pairs), and the PID values that the base video sequence and enhanced video sequence use, for each pair. The PID value used by the base video sequence is indicated by base_layer_video_sequence_PID, and the PID value used by the enhanced video sequence is indicated by enhancement_layer_video_sequence_PID. Describing the HDR_pairing_descriptor( ) in this way enables a correct combination of pairs to be indicated.

Figure 39:
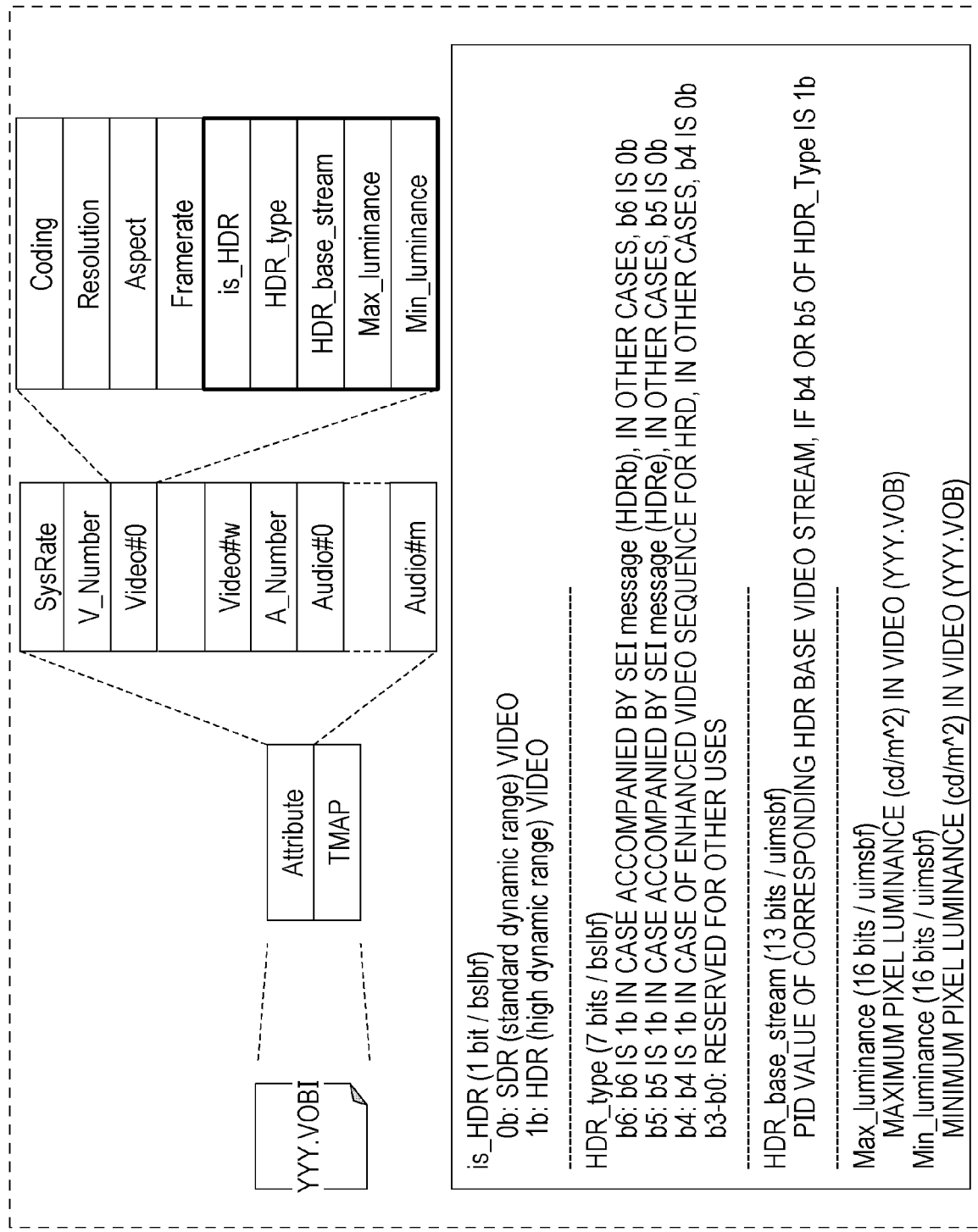
FIG. 39 is a diagram for describing management information of an HDR video stream.

FIG. 39 is a diagram for describing management information in a case of managing an HDR video stream by YYY.VOBI, which is management information of a video stream (YYY.VOB).

A number of attributes of Video, that is equal to the number of video streams included in YYY.VOB (V_Number), is recorded in "Attribute" of YYY.VOBI as video attribute information. Video attribute information in one video stream includes not only coding method (Coding), spatial resolution (Resolution), aspect ratio (Aspect), and frame rate (Framerate), but also the following attribute information.

Attribute information is_HDR is information for identifying whether the video stream corresponding to this attribute information is an HDR video stream, or a Standard Dynamic Range (SDR) video stream. In a case where description is made in is_HDR that the video stream is an HDR video stream (i.e., in a case where is_HDR=1b) the following attribute information relating to HDR is described.

Attribute information HDR_type indicates the type of video stream corresponding to this attribute information, i.e., the type of HDR. Of the seven bits in the HDR_type, if the lowest 1 bit (b6) is 1b, this means that the video stream is an HDR video stream including an SEI message (HDRb). In a case where the bit one order higher (b5) is 1b, this means that the video stream is a luminance-enhanced HDR video stream including an SEI message (HDRe). In a case where the bit one order higher (b4) is 1b, this means that the video stream is an enhanced video sequence corresponding to a base video stream that includes an SEI message (HDRb).

Attribute information HDR_base_stream is information that identifies an HDR video stream (base video stream) including a base SEI message (HDRb), in a case where the video stream corresponding to this attribute information is a SEI message (HDRe) luminance-enhanced HDR video stream or an enhanced video sequence. For example, the information indicates the PID value of a TS packet in an HDR video stream (base video stream) including a base SEI message (HDRb). Accordingly, which video stream is the base video stream paired with the video stream corresponding to the attribute information can be known without analyzing the stream, so setting of the PID demultiplexer of the TS decoder can be appropriately performed.

Attribute information Max_luminance represents the pixel luminance value (Y) of the maximum luminance (Max_luminance) of the HDR video stream within the video stream (YYY.VOB) corresponding to the attribute information, and further represents the luminance thereof in units of cd/m$^2$.

Attribute information Min_luminance represents the pixel luminance value (Y) of the minimum luminance (Min_luminance) of the HDR video stream within the video stream (YYY.VOB) corresponding to the attribute information, and further represents the luminance thereof in units of cd/m$^2$.

By analyzing this video attribute information, the player, which is the playback device, can determine whether the video stream to be played is HDR or not. Further, if the video stream is HDR, the player can determine what type of the HDR is, i.e., what encoding format the HDR video stream has. The player can also obtain the identification information (PID) of the base HDR video stream corresponding to the video stream to be played, and information indicating luminance range, such as maximum luminance and minimum luminance.

Figure 40:
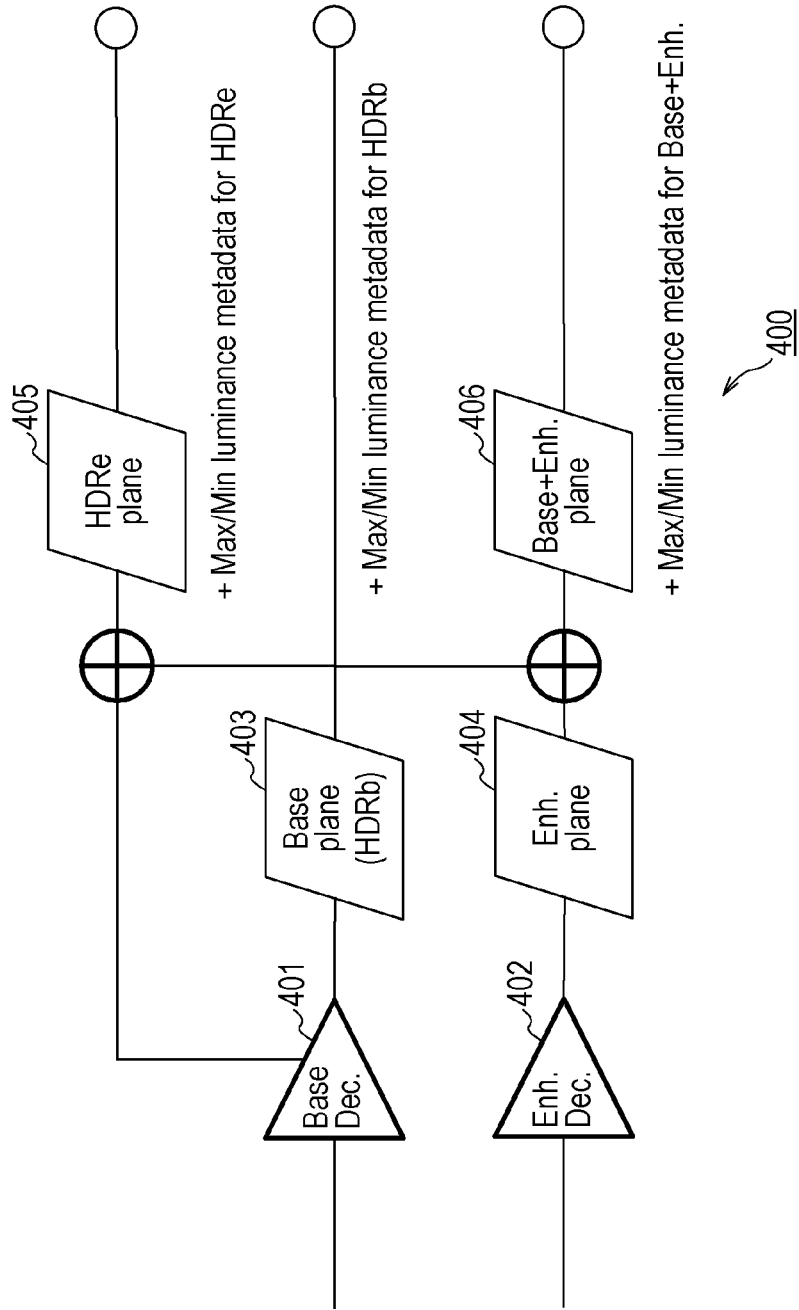
FIG. 40 is a diagram for describing a decoder model of an HDR video stream.

FIG. 40 is a diagram for describing a decoder model of an HDR video stream according to the present embodiment. An HDR video stream containing an SEI message (HDRb) is decoded at a base decoder (Base Dec) 401. The high-luminance video information generated y decoding the HDR video stream is rendered at a base plane (Base plane (HDRb)) 403. The basic luminance information (the luminance range defined by the maximum/minimum luminesce values of the overall contents) and so forth included in the SEI message (HDRb) is transmitted along with the high-luminance video information, and output to an external video output INTERFACE such as HDMI (registered trademark).

A decoder system 400 compatible with SEI messages (HDRe) adds luminance enhancement information of the SEI message (HDRe) to the high-luminance video information of the base plane (Base plane (HDRb)) 403, and renders the enhanced high-luminance video information on an HDRe plane 405. The enhanced high-luminance video information to which the SEI message (HDRe) is also added is output to an external video output INTERFACE such as HDMI (registered trademark), along with additional luminance information (luminance range defined by maximum luminance value and minimum luminance value in increments of scenes) included in the SEI message (HDRe).

The decoder system 400 compatible with the enhanced video sequence described above decodes the enhanced video sequence at an enhancement decoder (Enh. Decd) 402. The enhanced video information generated by this decoding is rendered to an enhancement plane (Enh. plane) 404. The decoder system 400 composites this enhanced video information with the high-luminance video information at the base plane (Base plane (HDRb)) 403, so as to composite videos that have the same PTS. The enhanced high-luminance video information obtained by this compositing is rendered to a Base+Enh. Plane 406. The decoder system 400 outputs this enhanced high-luminance video information to an external video output INTERFACE such as HDMI (registered trademark), along with basic luminance information transmitted by the SEI message (HDRb), luminance enhancement information stored in the enhanced video sequence, and so forth.

It should be noted that the above description is only an example, and that one skilled in the art would be able to make various applications.

Figure 41A:
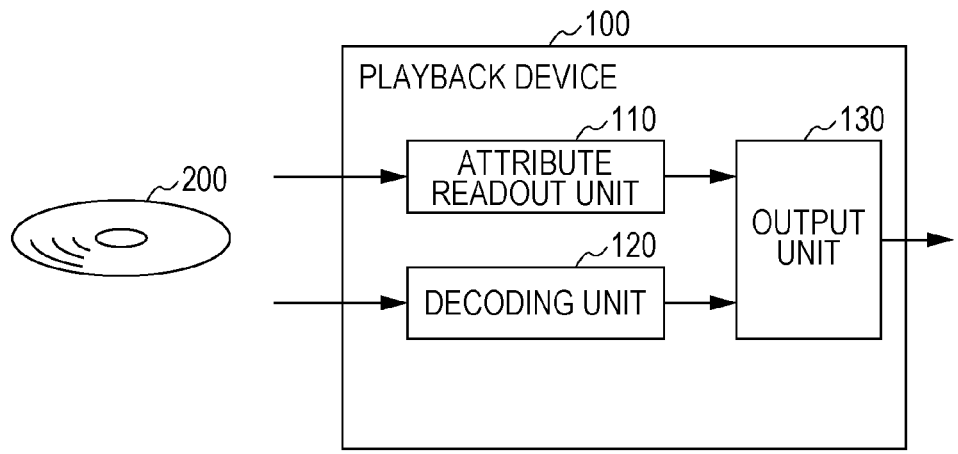
FIG. 41A is a block diagram illustrating an example of the configuration of a playback device.

FIG. 41A is a block diagram illustrating an example of the configuration of a playback device according to the present embodiment. A playback device 100 according to the present embodiment is a device that reads out video streams, which are encoded video information, from a recording medium 200 such as the above-described BD for example, and playing the video streams, including a readout unit 110, a decoding unit 120, and an output unit 130.

The readout unit 110 reads out first attribute information, indicating whether the dynamic range of luminance of that video stream is a first dynamic range or a second dynamic range, from a management information file recorded in the recording medium 200 in a manner correlated with the video stream. For example, the first dynamic range is SDR, and the second dynamic range is HDR, which is a dynamic range that is wider than SDR. The management information file is the above-described VOBI file, for example, and the first attribute information contained in the management information file is information made up of is_HDR and HDR_type. The is_HDR contained in the first attribute information indicates whether that video stream is SDR or HDR.

The decoding unit 120 generates decoded video information by reading the video stream out from the recording medium 200 and decoding the video stream. This decoding unit 120 includes, for example, the base decoder 401 and enhancement decoder 402 in FIG. 40, and so forth.

In a case where the first attribute information that has been read out indicates the second dynamic range the output unit 130 outputs the generated decoded video information, along with maximum luminance information indicating a maximum luminance of the video stream in accordance with the second dynamic range. This output unit 130 includes, of the components illustrated in FIG. 40 for example, the components other than the base decoder 401 and enhancement decoder 402. The maximum luminance information indicating a maximum luminance is information included in the above-described SEI message (HDRb), or information included in the SEI message (HDRb) and SEI message (HDRe).

Accordingly, the playback device 100 according to the present embodiment can appropriately express luminance corresponding to the type of video stream (dynamic range in particular) recorded in the recording medium 200.

In a case where the first attribute information indicates the second dynamic range, the first attribute information further indicates the type of the second dynamic range. That is to say, the HDR_type in the first attribute information indicates the type of HDR. In this case, the output unit 130 outputs the maximum luminance information and decoded video information in accordance with the type of the second dynamic range.

Specifically, in a case where the type indicated by the first attribute information is a type where the luminance range of the video stream is statically expressed (HDRb), the output unit 130 outputs the maximum luminance information where the maximum luminance is statically indicated and the decoded video information. Now, the maximum luminance information indicates the luminance range defined by the maximum luminance of all pictures in the video stream, thereby statically indicating the luminance range. That is to say, the output unit 130 outputs the information contained in the SEI message (HDRb) as the maximum luminance information.

Alternatively, in a case where the type indicated by the first attribute information is a type where the luminance range of the video stream is statically and dynamically expressed (type including HDRe), the output unit 130 outputs the maximum luminance information where the maximum luminance is statically and dynamically indicated, and the decoded video information. Now, the maximum luminance information dynamically indicates the luminance range by indicating a luminance range for each of groups made up of one or multiple pictures included in the video stream, the luminance range being defined by the maximum luminance of the group. A group made up of multiple pictures is a GOP, for example. That is to say, the output unit 130 outputs the information included in the SEI message (HDRb) and SEI message (HDRe) as maximum luminance information.

There is a type indicated by the first attribute information where luminance is expressed by a base video stream, and an enhanced video stream to enhance luminance of the base video stream, This type is a type that uses the above-described enhanced video sequence. In a case where the first attribute information indicates this type, the decoding unit 120 generates the decoded video information by decoding the video stream as the enhanced video stream. The decoding unit 120 further reads out the base video stream from the recording medium 200 and decodes the base video stream to generate the base video Information. In this case, the output unit 130 outputs the maximum luminance information and the decoded video information subjected to image processing (e.g., compositing) using the generated base video information. The maximum luminance information output at this time is the information contained in the above-described SEI message (HDRb).

Accordingly, luminance corresponding to the type of HDR video stream can be appropriately expressed, regardless of what type of HDR video stream is recorded in the recording medium 200.

The attribute readout 110 unit further reads out second attribute information indicating the maximum luminance of the video stream, from the management information file. The second attribute information is the above-described Max_luminance, for example. At this time, the output unit 130 further outputs the maximum luminance information including the second attribute information. Accordingly, luminance of the video stream can be expressed even more appropriately.

Also, recorded in the recording medium 200 is the above-described video stream, and a management information containing each of the above-described attribute information. A base video stream is also recorded in accordance with the type of video stream. Accordingly, the recording medium 200 according to the present embodiment can cause the playback device to appropriately express luminance corresponding to the type of video stream.

Although there have been various realization methods for HDR video streams, the HDR video streams of the multiple realization methods could not conventionally be efficiently recorded and managed in one recording medium. However, according to the present embodiment, attribute information indicating the above-described realization method is recorded for each of the multiple HDR video streams, so HDR video streams of multiple realization methods can be suitably recorded in the same recording medium. That is to say, HDR video streams of different realization methods can be effectively recorded and managed in the same media. Further, a video stream can be selected in accordance with the high-luminance image display capabilities of a TV, from a single recording medium.

Figure 41B:
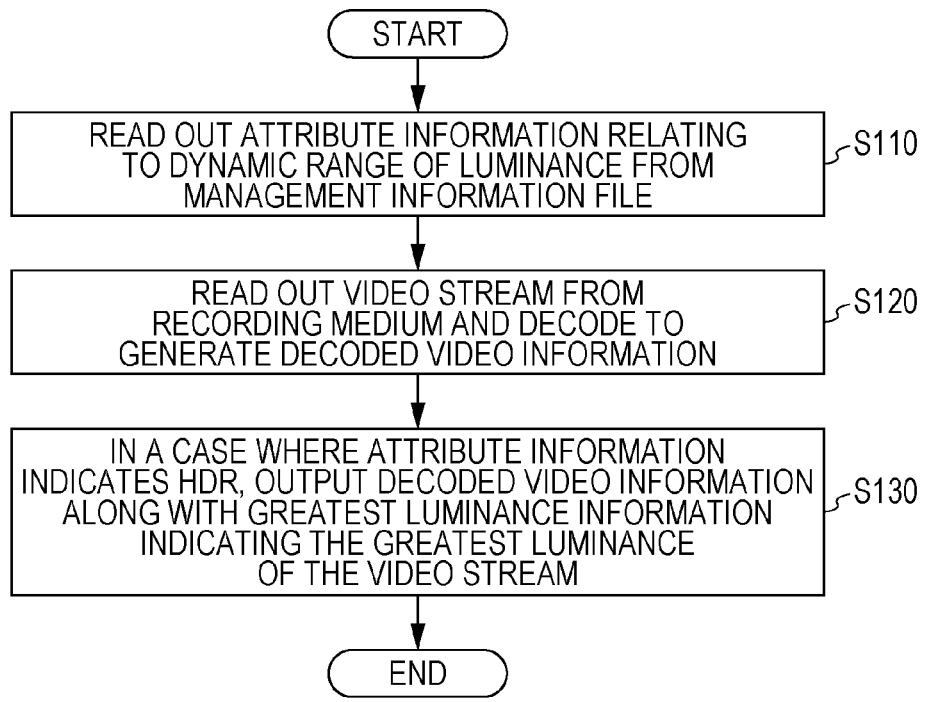
FIG. 41B is a flowchart illustrating an example of a playback method.

FIG. 41B is a flowchart illustrating an example of a playback method according to the present embodiment. The playback method according to the present embodiment is a method of reading out a video stream, which is encoded video information, from the recording medium 200, and playing the video stream, the playback method including a step S110, a step S120, and a step S130.

In step S110, first attribute information, indicating whether a dynamic range of luminance of the video stream is a first dynamic range or a second dynamic range that is wider than the first dynamic range, is read out from a management information file recorded in the recording medium 200 in a manner correlated with the video stream.

In step S120, decoded video information is generated by reading the video stream out from the recording medium 200 and decoding the video stream.

In step S130, in a case where the attribute information that has been read out indicates the second dynamic range (i.e., HDR), the decoded video information is output along with maximum luminance information indicating the maximum luminance of the video stream in accordance with the second dynamic range.

Thus, according to the playing method of the present embodiment, the luminance can be appropriately expressed in accordance with the type of video stream recorded in the recording medium 200 (dynamic range in particular) recorded in the recording medium 200.

In the above embodiments, the components may be realized by a dedicated hardware configuration, or by executing a software program suitable for the components. The components may be realized by a program executing unit such as a CPU or like processor reading out and executing a software program recorded in a recording medium such as a hard disk or semiconductor memory or the like. The software that realizes the playback device 100 and so forth in the above-described embodiments is a program that causes a computer to execute the steps included in the flowchart illustrated in FIG. 41B, for example.

Although the playback device and playback method according to one or multiple forms has been described by way of embodiments, the present disclosure is not restricted to these embodiments. Embodiments of various modifications conceivable by one skilled in the art, and forms configured by combining components in different embodiments, may be included in the scope of the present disclosure without departing from the essence of the present disclosure.

The present disclosure enables luminance to be appropriately expressed in accordance with the type of video stream recorded in a recording medium such as a BD for example, and is applicable to a playback device such as a BD player for example, and an optical disc such as a BD for example.

What is claimed is:

1. A non-transitory recording medium, reproduced by a playback device having an attribute reader, a decoder, and an outputter, in which is recorded:
    a video stream that is encoded video information; and
    a management information file correlated with the video stream,
    wherein the management information file includes
        first attribute information, indicating whether a dynamic range of luminance of the video stream recorded in the non-transitory recording medium is a first dynamic range or a second dynamic range that is wider than the first dynamic range, and
    wherein, in a case where the first attribute information indicates the second dynamic range, information that indicates a plurality of types of the second dynamic range is allocated to the first attribute information, and the first attribute information also indicates the type of the second dynamic range of the video stream recorded in the non-transitory recording medium.

2. The non-transitory recording medium according to claim 1,
    wherein the first attribute information indicates a first type where the luminance range of the video stream is statically expressed, as the type of the second dynamic range.

3. The non-transitory recording medium according to claim 1,
    wherein the first attribute information indicates a second type where the luminance range of the video stream is statically and dynamically expressed, as the type of the second dynamic range.

4. The non-transitory recording medium according to claim 3,
    wherein, in the second type,
        the luminance range of the video stream is statically expressed by including in the video stream first supplemental extension information indicating the maximum luminance of all pictures in the video stream, and
        the luminance range of the video stream is dynamically expressed by including in the video stream second supplemental extension information indicating, for each of groups made up of one or a plurality of pictures included in the video stream, the luminance range being defined by the maximum luminance of the group.

5. The non-transitory recording medium according to claim 1,
    wherein the first attribute information indicates a third type, where luminance is expressed by a base video stream, and an enhanced video stream which is a video stream to enhance luminance of the base video stream, as the type of the second dynamic range, and
    wherein the recording medium further has recorded therein the base video stream.

6. The non-transitory recording medium according to claim 1,
    wherein the management information file further includes second attribute information indicating the maximum luminance of the video stream.

* * * * *